(12) United States Patent
Watarai

(10) Patent No.: US 9,701,362 B2
(45) Date of Patent: Jul. 11, 2017

(54) BICYCLE BRAKE DEVICE

(71) Applicant: SHIMANO INC., Sakai (JP)

(72) Inventor: Etsuyoshi Watarai, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 14/633,910

(22) Filed: Feb. 27, 2015

(65) Prior Publication Data

US 2016/0251054 A1 Sep. 1, 2016

(51) Int. Cl.
| | | |
|---|---|---|
| *B62L 3/02* | (2006.01) | |
| *B62L 1/00* | (2006.01) | |
| *B62L 1/10* | (2006.01) | |
| *B62L 1/14* | (2006.01) | |
| *B62K 19/38* | (2006.01) | |
| *B62K 21/02* | (2006.01) | |
| *B62K 21/04* | (2006.01) | |

(52) U.S. Cl.
CPC ............ *B62L 3/023* (2013.01); *B62K 19/38* (2013.01); *B62K 21/02* (2013.01); *B62K 21/04* (2013.01); *B62L 1/005* (2013.01); *B62L 1/10* (2013.01); *B62L 1/14* (2013.01)

(58) Field of Classification Search
CPC .................................................. B62L 3/023
USPC ....... 188/24.11, 24.12, 24.13, 24.22, 26, 344
See application file for complete search history.

(56) References Cited

U.S. PATENT DOCUMENTS

| 532,298 | A | * | 1/1895 | Wallace | ................... B62L 3/023 |
|---|---|---|---|---|---|
| | | | | | 188/344 |
| 3,338,337 | A | * | 8/1967 | Freeland | ................. B62L 3/023 |
| | | | | | 188/344 |
| 3,554,334 | A | | 1/1971 | Shimano et al. | |
| 3,776,333 | A | | 12/1973 | Mathauser | |
| 3,899,057 | A | * | 8/1975 | Carre | ..................... B60T 11/16 |
| | | | | | 188/196 C |
| 3,921,764 | A | | 11/1975 | Mathauser | |
| 3,993,174 | A | * | 11/1976 | Williams | .................. B62L 1/14 |
| | | | | | 188/344 |
| 4,036,333 | A | | 7/1977 | Mathauser | |
| 4,585,094 | A | | 4/1986 | Rottenkolber et al. | |
| 4,632,225 | A | | 12/1986 | Mathauser | |
| 5,368,136 | A | * | 11/1994 | Walte | ........................ B62L 1/14 |
| | | | | | 188/2 D |

(Continued)

FOREIGN PATENT DOCUMENTS

| CH | | 618931 A5 | * | 8/1980 | ............. B62L 3/023 |
|---|---|---|---|---|---|
| DE | 10 2011 003 274 | | | 8/2012 | |

(Continued)

OTHER PUBLICATIONS

Office Action with Form PTO-892 Notice of References Cited issued by the United States Patent and Trademark Office for the co-pending U.S. Appl. No. 14/633,948, Sep. 13, 2016.

*Primary Examiner* — Thomas J Williams
(74) *Attorney, Agent, or Firm* — Mori & Ward, LLP

(57) ABSTRACT

A bicycle brake device comprises a friction member, a base member, and a piston. The base member includes a hydraulic cylinder. The piston is movable in the hydraulic cylinder in a movement direction so as to move the friction member toward a rotatable member. The piston is at least partially provided in a frame area defined by an outline of a bicycle frame when viewed from the movement direction in an attachment state where the base member is attached to the bicycle frame.

19 Claims, 43 Drawing Sheets

(56) References Cited

U.S. PATENT DOCUMENTS

| | | | |
|---|---|---|---|
| 5,425,434 A | 6/1995 | Romano | |
| 5,443,134 A | 8/1995 | Gajek et al. | |
| 5,678,665 A * | 10/1997 | Debreczeni | B60T 11/16 188/196 M |
| 5,803,207 A * | 9/1998 | Nielsen | B62L 1/16 188/24.12 |
| 6,119,818 A * | 9/2000 | Krumbeck | B62L 3/023 188/24.12 |
| 6,125,973 A * | 10/2000 | Irvine | F16D 65/092 188/24.22 |
| 6,220,399 B1 | 4/2001 | Phillips et al. | |
| 7,318,502 B2 * | 1/2008 | Costa | B62L 1/005 188/24.22 |
| 7,464,798 B2 | 12/2008 | Sandro et al. | |
| 8,069,391 B1 * | 11/2011 | Wu | H03M 13/2906 714/758 |
| 8,096,391 B2 | 1/2012 | White | B62K 19/38 188/24.12 |
| 8,651,244 B2 * | 2/2014 | Moore | B62L 3/023 188/24.22 |
| 8,678,144 B2 * | 3/2014 | Tetsuka | B60T 1/06 188/24.22 |
| 2005/0061587 A1 | 3/2005 | Tsai | |
| 2007/0068744 A1 * | 3/2007 | Tsai | B62L 1/10 188/24.12 |
| 2007/0251780 A1 * | 11/2007 | Lyons | B60T 7/102 188/344 |
| 2010/0230215 A1 | 9/2010 | Ginster | |
| 2011/0011683 A1 * | 1/2011 | Tetsuka | B60T 1/06 188/24.19 |
| 2011/0011684 A1 | 1/2011 | Tetsuka et al. | |
| 2011/0290595 A1 | 12/2011 | Nago | |
| 2012/0222921 A1 | 9/2012 | Nago et al. | |
| 2013/0009380 A1 | 1/2013 | Servet | |
| 2013/0112510 A1 | 5/2013 | Jordan et al. | |
| 2013/0341128 A1 | 12/2013 | Jordan et al. | |
| 2014/0265221 A1 | 9/2014 | D'Aluisio et al. | |
| 2014/0265222 A1 * | 9/2014 | D'Aluisio | B62L 3/023 280/264 |
| 2016/0031522 A1 * | 2/2016 | Nago | B62L 3/023 188/24.14 |
| 2016/0251055 A1 | 9/2016 | Watarai et al. | |

FOREIGN PATENT DOCUMENTS

| | | | |
|---|---|---|---|
| DE | 10 2014 204 781 | 9/2014 | |
| EP | 2316719 | 5/2011 | |
| EP | 2495160 | 9/2012 | |
| EP | 2543583 | 1/2013 | |
| FR | WO 2008009817 A1 * | 1/2008 | B62L 1/14 |
| GB | 2493063 | 1/2013 | |
| IT | WO 2007031967 A2 * | 3/2007 | B62K 21/02 |

* cited by examiner

BICYCLE BRAKE DEVICE

BACKGROUND OF THE INVENTION

Field of the Invention

The present invention relates to a bicycle brake device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle brake device.

SUMMARY OF THE INVENTION

In accordance with a first aspect of the present invention, a bicycle brake device comprises a friction member, a base member, and a piston. The base member includes a hydraulic cylinder. The piston is movable in the hydraulic cylinder in a movement direction so as to move the friction member toward a rotatable member. The piston is at least partially provided in a frame area defined by an outline of a bicycle frame when viewed from the movement direction in an attachment state where the base member is attached to the bicycle frame.

In accordance with a second aspect of the present invention, the bicycle brake device according to the first aspect is configured so that the piston has a center axis which is arranged in the frame area when viewed from the movement direction in the attachment state.

In accordance with a third aspect of the present invention, the bicycle brake device according to the second aspect is configured so that the piston is entirely provided in the frame area when viewed from the movement direction in the attachment state.

In accordance with a fourth aspect of the present invention, the bicycle brake device according to the first aspect is configured so that the piston is at least partially provided in an arrangement recess of the bicycle frame in the attachment state.

In accordance with a fifth aspect of the present invention, the bicycle brake device according to the fourth aspect is configured so that the piston is entirely provided in an internal space of the bicycle frame when viewed from the movement direction in the attachment state.

In accordance with a sixth aspect of the present invention, the bicycle brake device according to the first aspect is configured so that the hydraulic cylinder is at least partially provided in an arrangement recess of the bicycle frame in the attachment state.

In accordance with a seventh aspect of the present invention, the bicycle brake device according to the sixth aspect is configured so that the hydraulic cylinder is entirely provided in the internal space of the bicycle frame when viewed from the movement direction in the attachment state.

In accordance with an eighth aspect of the present invention, the bicycle brake device according to the first aspect is configured so that the hydraulic cylinder is at least partially provided between the friction member and the bicycle frame in the movement direction in the attachment state.

In accordance with a ninth aspect of the present invention, the bicycle brake device according to the first aspect further comprises a clearance adjustment member configured to adjust a rest position of the friction member relative to the hydraulic cylinder.

In accordance with a tenth aspect of the present invention, the bicycle brake device according to the ninth aspect is configured so that the clearance adjustment member includes an operating portion configured to be operated by the user to adjust the rest position of the friction member. The operating portion is at least partially provided in the frame area when viewed from the movement direction in the attachment state.

In accordance with an eleventh aspect of the present invention, the bicycle brake device according to the first aspect is configured so that the piston is coupled to the friction member without being fixed to the friction member.

In accordance with a twelfth aspect of the present invention, the bicycle brake device according to the eleventh aspect further comprises an intermediate member provided between the piston and the friction member such that the intermediate member moves the friction member in response to movement of the piston.

In accordance with a thirteenth aspect of the present invention, the bicycle brake device according to the first aspect is configured so that the frame area is defined by an outline of a front fork of the bicycle frame when viewed from the movement direction in the attachment state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
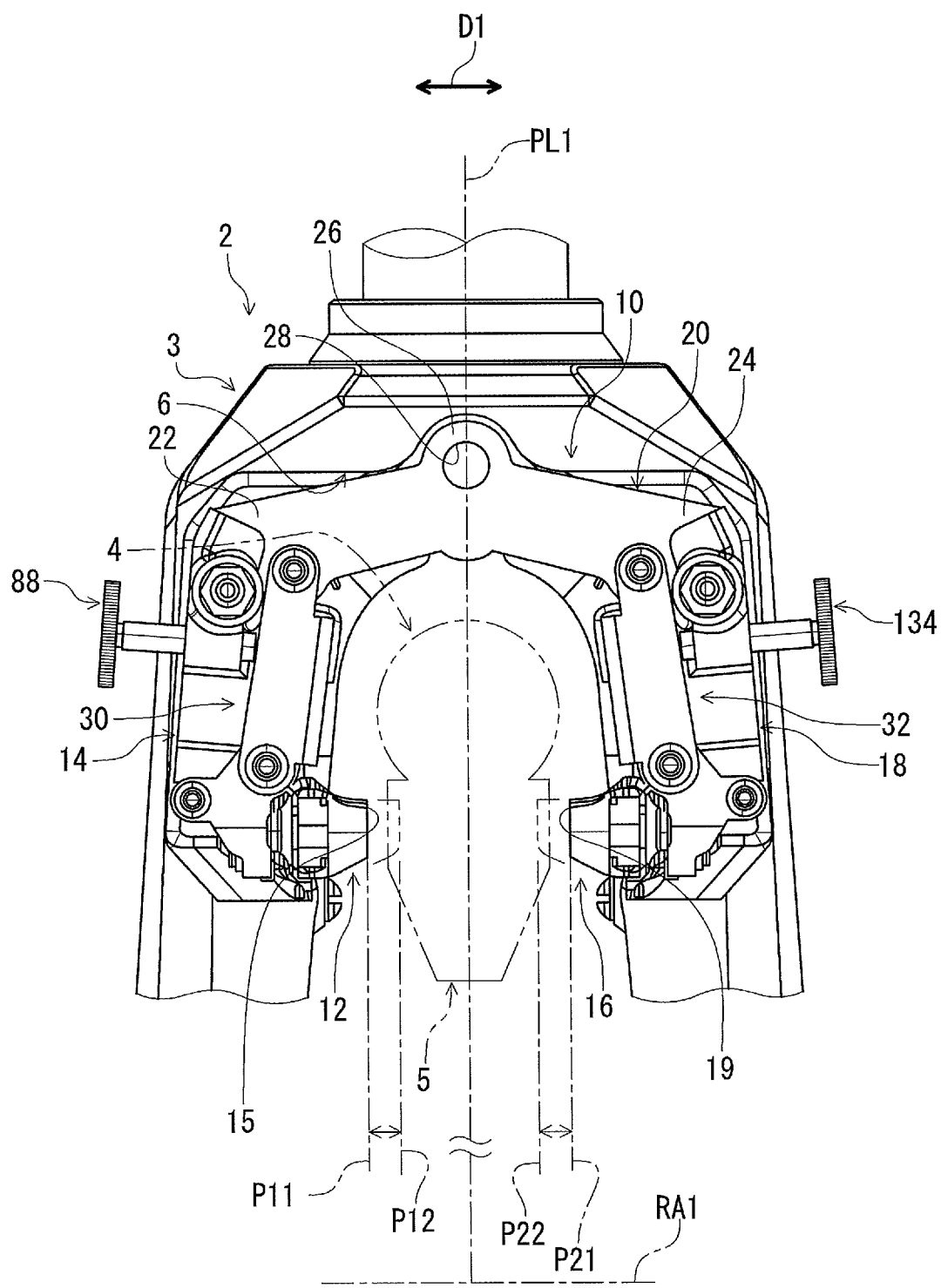
FIG. 1 is a rear elevational view of a bicycle frame provided with a bicycle brake device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle brake device 10 in accordance with a first embodiment is configured to be mounted to a bicycle frame 2. While the bicycle brake device 10 is a front brake device in the illustrated embodiment, structures of the bicycle brake device 10 can be applied to a rear brake device if needed and/or desired.

The bicycle brake device 10 is mounted to a front fork 3 of the bicycle frame 2 and is configured to apply a braking force to a rotatable member 4 such as a bicycle wheel rotatably attached to the front fork 3. The rotatable member 4 can also be referred to as the bicycle wheel 4. The bicycle brake device 10 is configured as a bicycle rim brake device in the illustrated embodiment. The structures of the bicycle brake device 10 can be applied to a bicycle click brake device if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle brake device 10, should be interpreted relative to the bicycle equipped with the bicycle brake device 10 as used in an upright riding position on a horizontal surface.

As seen in FIG. 1, the bicycle brake device 10 comprises a friction member 12 and a base member 14. The friction member 12 is movable relative to the base member 14 and is slidable with a bicycle rim 5 of the bicycle wheel 4. The friction member 12 has a friction surface 15 which faces the rotatable member 4. The base member 14 is configured to be attached to the bicycle frame 2.

Figure 2:
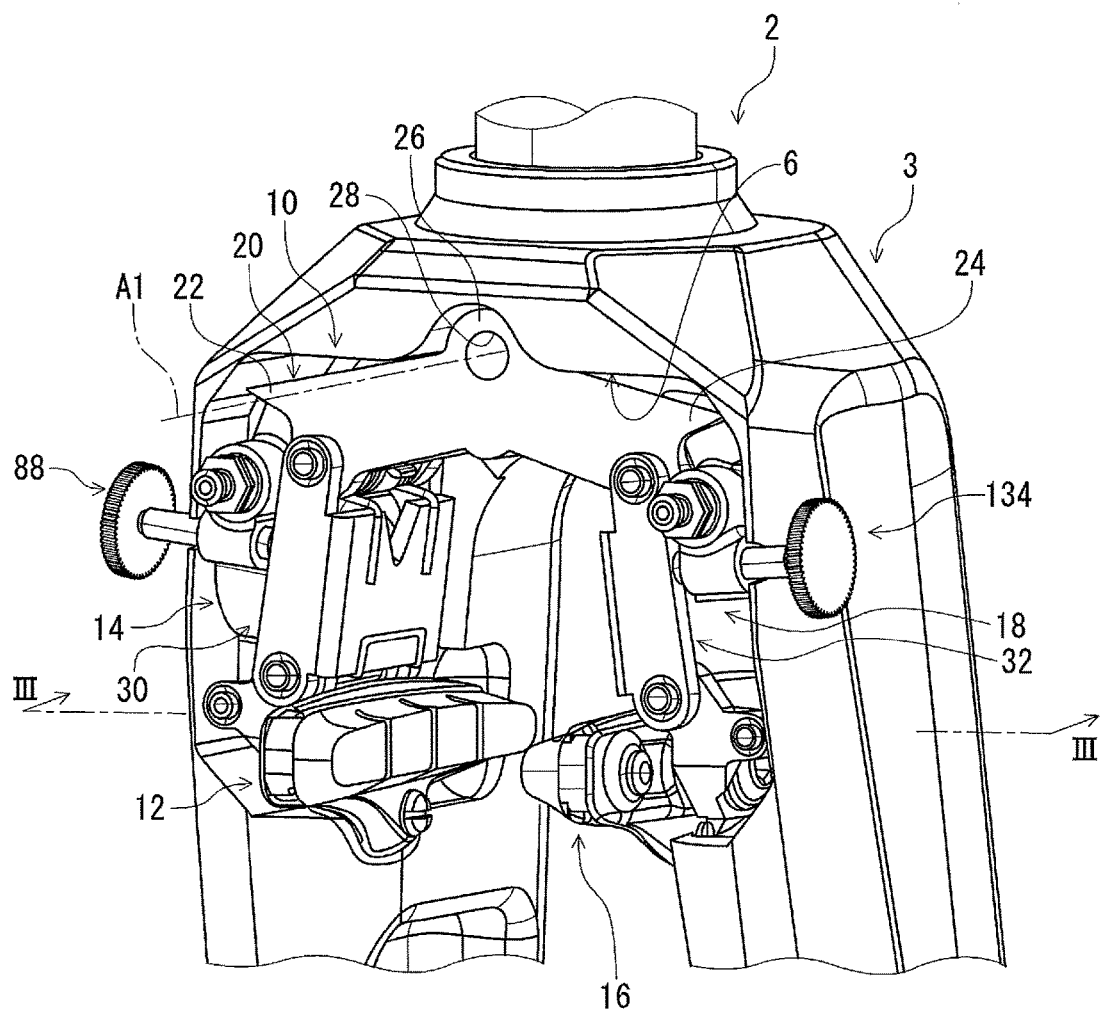
FIG. 2 is a perspective view of the bicycle brake device illustrated in FIG. 1.

As seen in FIG. 2, the bicycle brake device 10 is at least partially provided in an arrangement recess 6 of the bicycle frame 2 in an attachment state where the base member 14 is attached to the bicycle frame 2. When the friction member 12 is disposed at a rest position P11 (FIG. 1), the bicycle brake device 10 is at least partially provided in the arrangement recess 6 in the attachment state. In the illustrated embodiment, the bicycle brake device 10 is partially provided in the arrangement recess 6 of the bicycle frame 2 in the attachment state.

As seen in FIG. 1, the bicycle brake device 10 further comprises an additional friction member 16 and an additional base member 18. The additional friction member 16 can also be referred to as the friction member 16. The additional base member 18 can also be referred to as the base member 18. The additional friction member 16 is movable relative to the additional base member 18 and is slidable with the bicycle rim 5 of the bicycle wheel 4. The additional friction member 16 is spaced apart from the friction member 12 in a transverse direction D1 parallel to a rotational axis RA1 of the bicycle wheel 4. The additional friction member 16 has an additional friction surface 19 which faces the rotatable member 4. The additional base member 18 is configured to be attached to the bicycle frame 2. The friction member 12 and the additional friction member 16 are symmetrical with respect to a center virtual plane PL1 perpendicular to the rotational axis RA1. The bicycle brake device 10 has a symmetrical structure about the center virtual plane PL1.

The bicycle brake device 10 further comprises a coupling member 20 configured to couple the base member 14 to the additional base member 18. The additional base member 18 is spaced apart from the base member 14 in the transverse direction D1. In the illustrated embodiment, the coupling member 20 is configured to be attached to the bicycle frame 2. The coupling member 20 includes a first coupling end 22 and a second coupling end 24 opposite to the first coupling end 22. The base member 14 is secured to the first coupling end 22 of the coupling member 20. The additional base member 18 is secured to the second coupling end 24 of the coupling member 20. Namely, the base member 14 is attached to the bicycle frame 2 via the coupling member 20. The additional base member 18 is attached to the bicycle frame 2 via the coupling member 20.

As seen in FIG. 2, the coupling member 20 has a mounting structure 26 configured to mount the coupling member 20 to the bicycle frame 2. The mounting structure 26 has a mounting opening 28 extending along a mounting axis A1. In the illustrated embodiment, the mounting opening 28 is provided between the first coupling end 22 and the second coupling end 24 in the transverse direction D1. A mounting bolt (not shown) extends through the mounting opening 28. The coupling member 20 is attached to the bicycle frame 2 via the mounting structure 26 and the mounting bolt.

As seen in FIG. 1, the bicycle brake device 10 comprises a link structure 30. The link structure 30 is configured to couple the friction member 12 to the base member 14 so as to move the friction member 12 relative to the base member 14 between the rest position P11 and a braking position P12. The bicycle brake device 10 is configured to be operated via a brake operating device (not shown). The friction member 12 is disposed at the rest position P11 when the bicycle brake device 10 is not operated via the brake operating device.

The bicycle brake device 10 further comprises an additional link structure 32. The additional link structure 32 configured to couple the additional friction member 16 to the additional base member 18 so as to move the additional friction member 16 relative to the additional base member 18 between an additional rest position P21 and an additional braking position P22. The additional link structure 32 can also be referred to as the link structure 32. The additional rest position P21 can also be referred to as the rest position P21. The additional braking position P22 can also be referred to as the braking position P22. The friction member 16 is disposed at the rest position P21 when the bicycle brake device 10 is not operated via the brake operating device.

Figure 3:
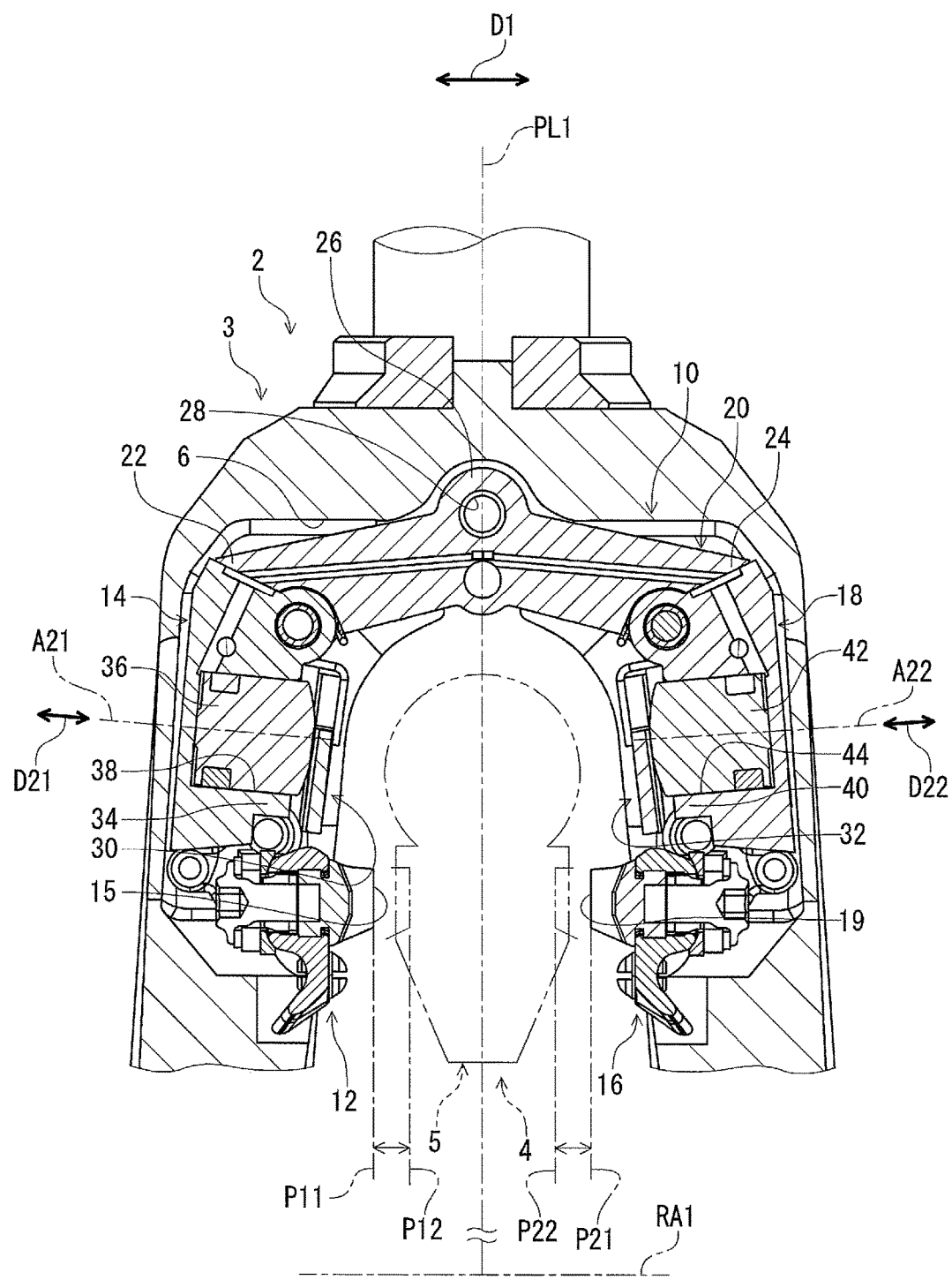
FIG. 3 is a cross-sectional view of the bicycle brake device taken along line III-III of FIG. 2.

As seen in FIG. 3, the base member 14 including a hydraulic cylinder 34. The bicycle brake device 10 comprises a piston 36 movable in the hydraulic cylinder 34 in a movement direction D21 so as to move the friction member 12 toward the rotatable member 4. The hydraulic cylinder 34 includes a cylinder bore 38 extending in the movement direction D21. The piston 36 is movably provided in the cylinder bore 38. The piston 36 has a center axis A21 parallel to the movement direction D21.

The additional base member 18 including an additional hydraulic cylinder 40. The bicycle brake device 10 comprises an additional piston 42 movable in the additional hydraulic cylinder 40 in an additional movement direction D22 so as to move the additional friction member 16 toward the rotatable member 4. The additional hydraulic cylinder 40 includes an additional cylinder bore 44 extending in the additional movement direction D22. The additional piston 42 is movably provided in the additional cylinder bore 44. The additional piston 42 has an additional center axis A22 parallel to the additional movement direction D22. The additional hydraulic cylinder 40 can also be referred to as the hydraulic cylinder 40. The additional piston 42 can also be referred to as the piston 42. The additional center axis A22 can also be referred to as the center axis A22.

Figure 4:
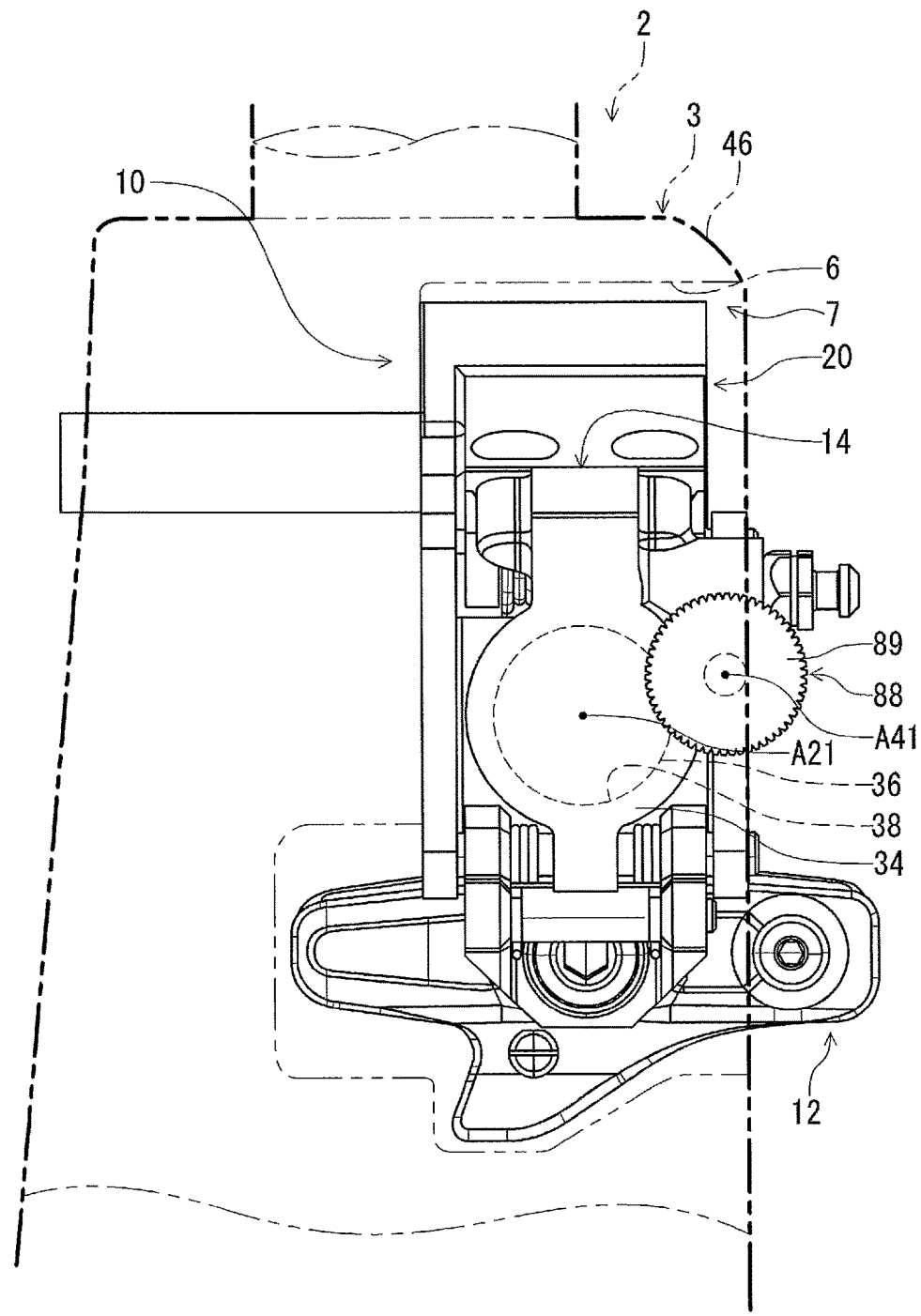
FIG. 4 is a side elevational view of the bicycle frame provided with the bicycle brake device illustrated in FIG. 1.

As seen in FIG. 4, the piston 36 is at least partially provided in a frame area 46 defined by an outline of the bicycle frame 2 when viewed from the movement direction D21 (FIG. 3) in the attachment state where the base member 14 is attached to the bicycle frame 2. In the illustrated embodiment, the piston 36 is entirely provided in the frame area 46 when viewed from the movement direction D21 in the attachment state. However, the piston 36 can be partially provided in the frame area 46 when viewed from the movement direction D21. In the illustrated embodiment, the frame area 46 is defined by an outline of the front fork 3 of the bicycle frame 2 when viewed from the movement direction D21 in the attachment state. The center axis A21 of the piston 36 is arranged in the frame area 46 when viewed from the movement direction D21 in the attachment state.

The hydraulic cylinder 34 is at least partially provided in the frame area 46 where viewed from the movement direction D21 in the attachment state. In the illustrated embodiment, the hydraulic cylinder 34 is entirely provided in the frame area 46 where viewed from the movement direction D21 in the attachment state. However, the hydraulic cylinder 34 can be partially provided in the frame area 46 where viewed from the movement direction D21 in the attachment state.

The base member 14 is at least partially provided in the frame area 46 where viewed from the movement direction D21 in the attachment state. In the illustrated embodiment, the base member 14 is entirely provided in the frame area 46 where viewed from the movement direction D21 in the attachment state. However, the base member 14 can be partially provided in the frame area 46 where viewed from the movement direction D21 in the attachment state.

As seen in FIG. 4, the piston 36 is at least partially provided in the arrangement recess 6 of the bicycle frame 2 in the attachment state. In the illustrated embodiment, the piston 36 is entirely provided in the arrangement recess 6 of the bicycle frame 2 in the attachment state. However, the piston 36 is partially provided in the arrangement recess 6 of the bicycle frame 2 in the attachment state. The piston 36 is entirely provided in an internal space 7 of the bicycle frame 2 when viewed from the movement direction D21 in the attachment state. However, the piston 36 can be at least partially provided in the internal space 7 of the bicycle frame 2 when viewed from the movement direction D21 in the attachment state. The internal space 7 is defined between a first fork arm or blade 3a and a second fork arm or blade 3b of the front fork 3 and includes the arrangement recess 6.

The hydraulic cylinder 34 is at least partially provided in the arrangement recess 6 of the bicycle frame 2 in the attachment state. In the illustrated embodiment, the hydraulic cylinder 34 is entirely provided in the arrangement recess 6 of the bicycle frame 2 in the attachment state. However, the hydraulic cylinder 34 can be partially provided in the arrangement recess 6 of the bicycle frame 2 in the attachment state. The hydraulic cylinder 34 is entirely provided in the internal space 7 of the bicycle frame 2 when viewed from the movement direction D21 in the attachment state. However, the hydraulic cylinder 34 can at least partially provided in the internal space 7 of the bicycle frame 2 when viewed from the movement direction D21 in the attachment state.

The base member 14 is at least partially provided in the arrangement recess 6 of the bicycle frame 2 in the attachment state. In the illustrated embodiment, the base member 14 is entirely provided in the arrangement recess 6 of the bicycle frame 2 in the attachment state. However, the base member 14 can be partially provided in the arrangement recess 6 of the bicycle frame 2 in the attachment state. The base member 14 is entirely provided in the internal space 7 of the bicycle frame 2 when viewed from the movement direction D21 in the attachment state. However, the base member 14 can at least partially provided in the internal space 7 of the bicycle frame 2 when viewed from the movement direction D21 in the attachment state.

Figure 5:
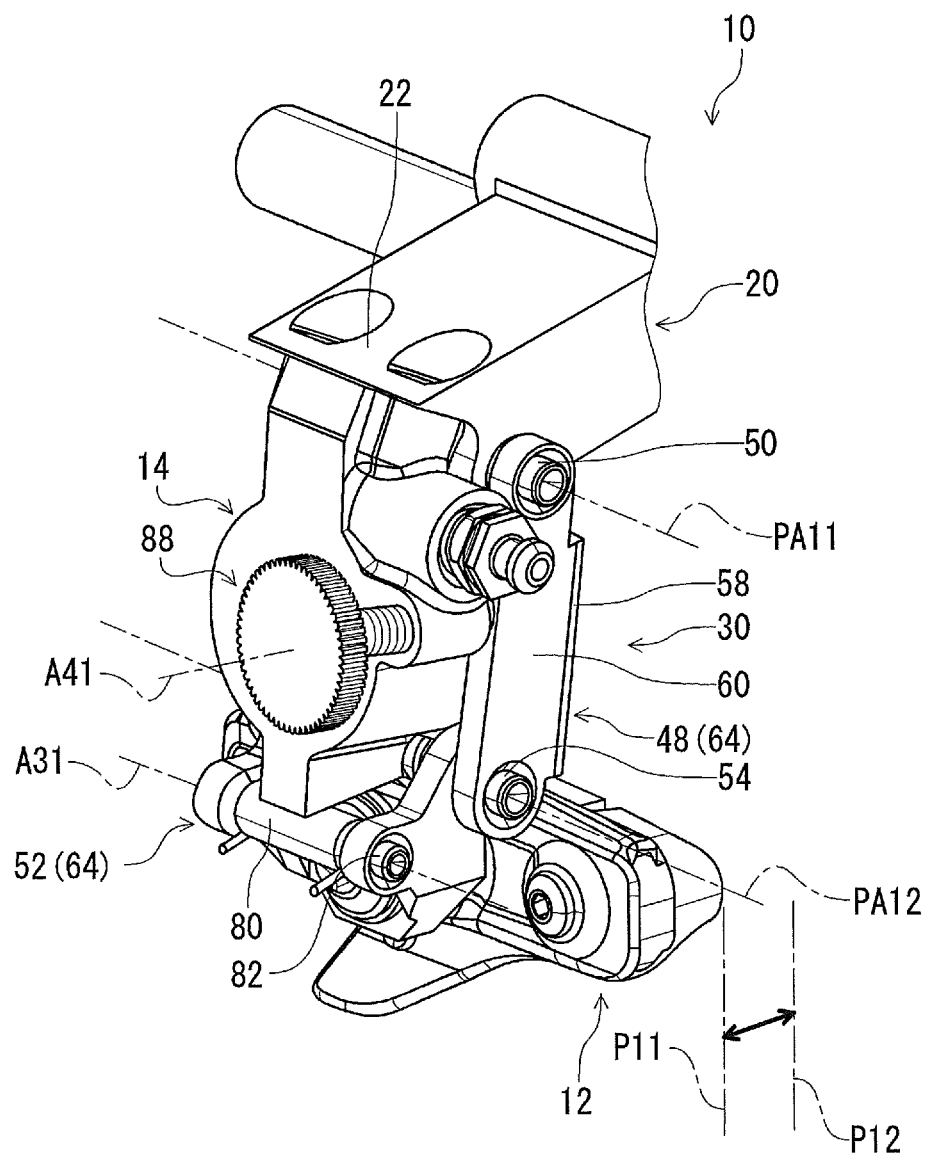
FIG. 5 is a partial perspective view of the bicycle brake device illustrated in FIG. 1.

As seen in FIG. 3, the piston 36 is configured to push the link structure 30 to move the friction member 12 from the rest position P11 toward the braking position P12. As seen in FIG. 5, the link structure 30 is configured to pivotably couple the friction member 12 to the base member 14 about a first pivot axis PA11. The link structure 30 includes a first link member 48 pivotably coupled to the base member 14 about the first pivot axis PA11. The piston 36 is configured to push the first link member 48 to move the friction member 12 from the rest position P11 toward the braking position P12.

As seen in FIG. 5, the link structure 30 includes a first link pin 50 configured to pivotably couple the first link member 48 to the base member 14 about the first pivot axis PA11. In the illustrated embodiment, the first link pin 50 is configured to pivotably couple the first link member 48 to the base member 14 and the coupling member 20 about the first pivot axis PA11.

As seen in FIG. 5, the link structure 30 includes a second link member 52 pivotably coupled to the first link member 48 about a second pivot axis PA12 parallel to the first pivot axis PA11. The friction member 12 is attached to the second link member 52. The link structure 30 includes a second link pin 54 configured to pivotably couple the second link member 52 to the first link member 48 about the second pivot axis PA12. The bicycle brake device 10 includes a coupling bolt 56 (FIG. 6) configured to couple the friction member 12 to the second link member 52. The friction member 12 is movable together with the second link member 52 relative to the base member 14.

Figure 6:
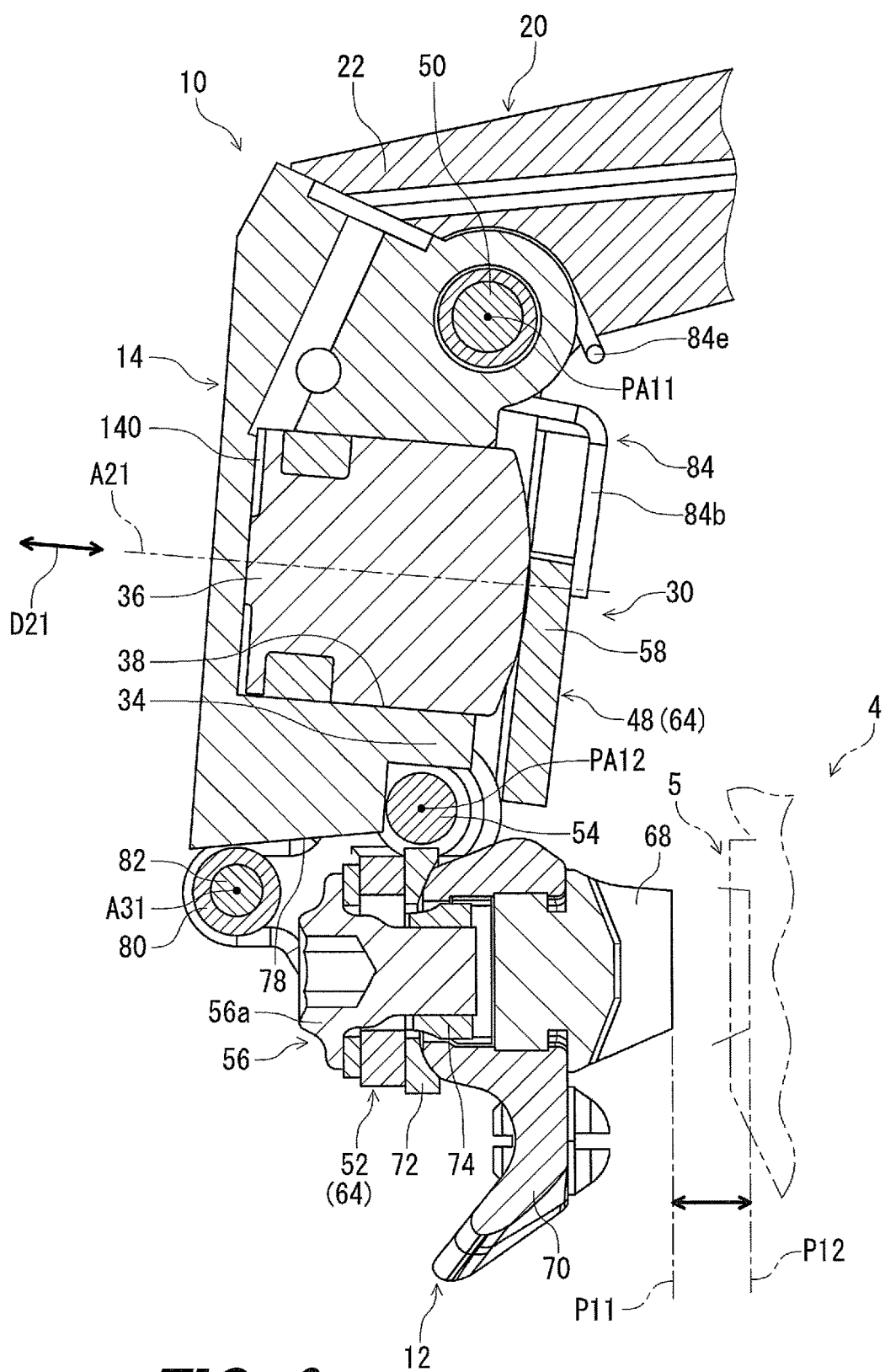
FIG. 6 is a partial cross-sectional view of the bicycle brake device illustrated in FIG. 1.

As seen in FIG. 6, the piston 36 is configured to be operatively coupled to the friction member 12. Specifically, the first link member 48 includes a receiving portion 58 contactable with the piston 36. The piston 36 is configured to push the receiving portion 58 of the first link member 48. The piston 36 is coupled to the first link member 48 without being fixed to the first link member 48. In the illustrated embodiment, the piston 36 is not secured to the first link member 48 and is merely contactable with the receiving portion 58 of the link member. Namely, the piston 36 is coupled to the friction member 12 without being fixed to the friction member 12. The piston 36 is provided between the first pivot axis PA11 and the friction member 12. The piston 36 is provided between the first pivot axis PA11 and the second pivot axis PA12.

As seen in FIG. 5, the first link member 48 includes a first frame portion 60 pivotably coupled to the base member 14 about the first pivot axis PA11. The receiving portion 58 is secured to the first frame portion 60. The first frame portion 60 is pivotably coupled to the base member 14 about the first pivot axis PA11 via the first link pin 50. The first frame portion 60 is pivotably coupled to the second link member 52 about the second pivot axis PA12 via the second link pin 54. The first frame portion 60 extends from the first pivot axis PA11 to the second pivot axis PA12.

Figure 7:
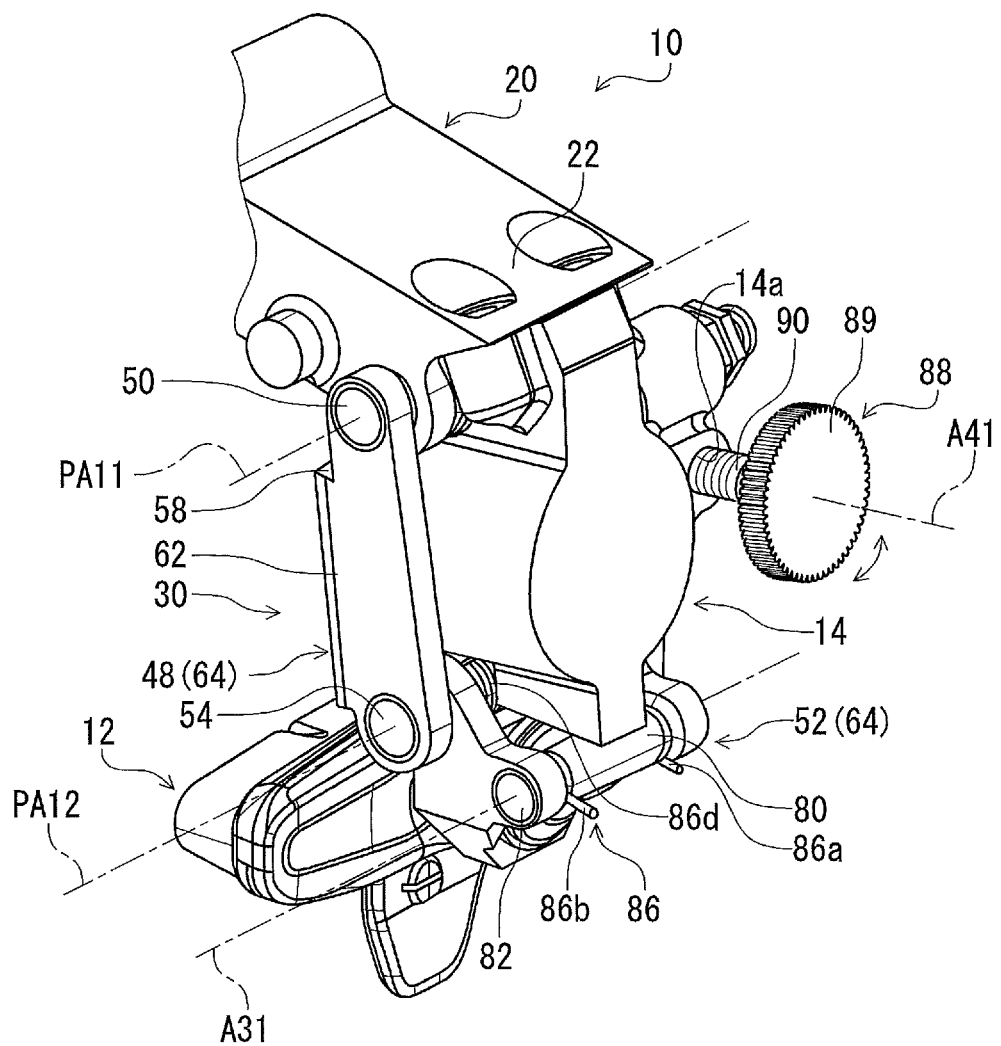
FIG. 7 is a partial perspective view of the bicycle brake device illustrated in FIG. 1.

As seen in FIG. 7, the first link member 48 includes a second frame portion 62 pivotably coupled to the base member 14 about the first pivot axis PA11. The receiving portion 58 is secured to the second frame portion 62. The second frame portion 62 is pivotably coupled to the base member 14 about the first pivot axis PA11 via the first link pin 50. The second frame portion 62 is pivotably coupled to the second link member 52 about the second pivot axis PA12 via the second link pin 54. The second frame portion 62 extends from the first pivot axis PA11 to the second pivot axis PA12.

Namely, as seen in FIG. 6, the bicycle brake device 10 further comprises an intermediate member 64 provided between the piston 36 and the friction member 12 such that the intermediate member 64 moves the friction member 12 in response to movement of the piston 36. In the illustrated embodiment, the intermediate member 64 can also be referred to as at least one of the first link member 48 and the second link member 52.

Figure 8:
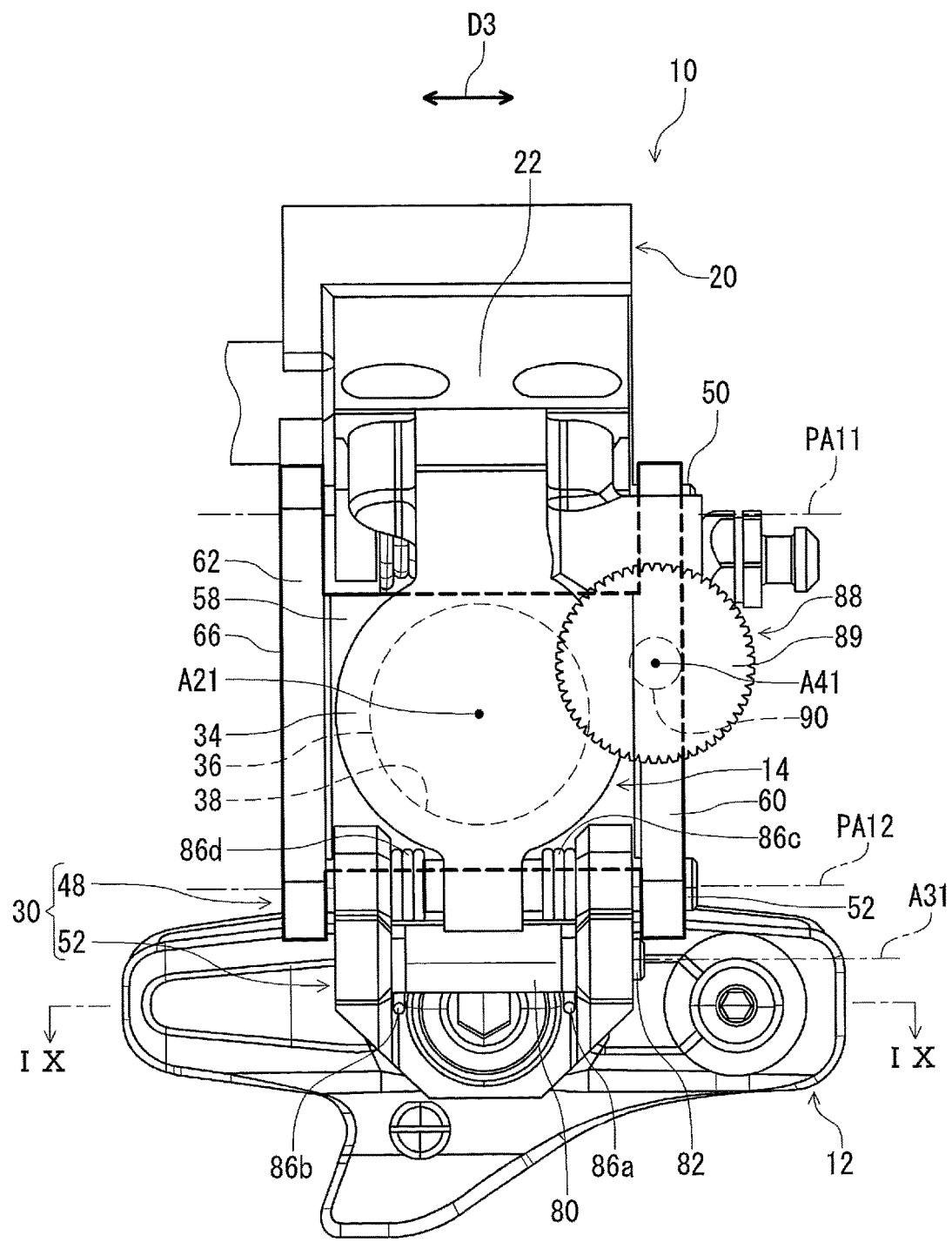
FIG. 8 is a side elevational view of the bicycle brake device illustrated in FIG. 1.

As seen in FIG. 8, the first frame portion 60 is spaced apart from the second frame portion 62 in an axial direction D3 parallel to the first pivot axis PA11. The receiving portion 58 is provided between the first frame portion 60 and the second frame portion 62 in the axial direction D3 and couples the first frame portion 60 to the second frame portion 62.

As seen in FIG. 8, the piston 36 is at least partially provided in a link area 66 defined by an outline of the first link member 48 when viewed from the movement direction D21. In FIG. 8, the link area 66 is indicated with a thick line. In the illustrated embodiment, the piston 36 is entirely provided in the link area 66 when viewed from the movement direction D21. The center axis A21 is provided in the link area 66 when viewed from the movement direction D21. The link area 66 is defined by the receiving portion 58, the first frame portion 60, and the second frame portion 62.

Figure 9:
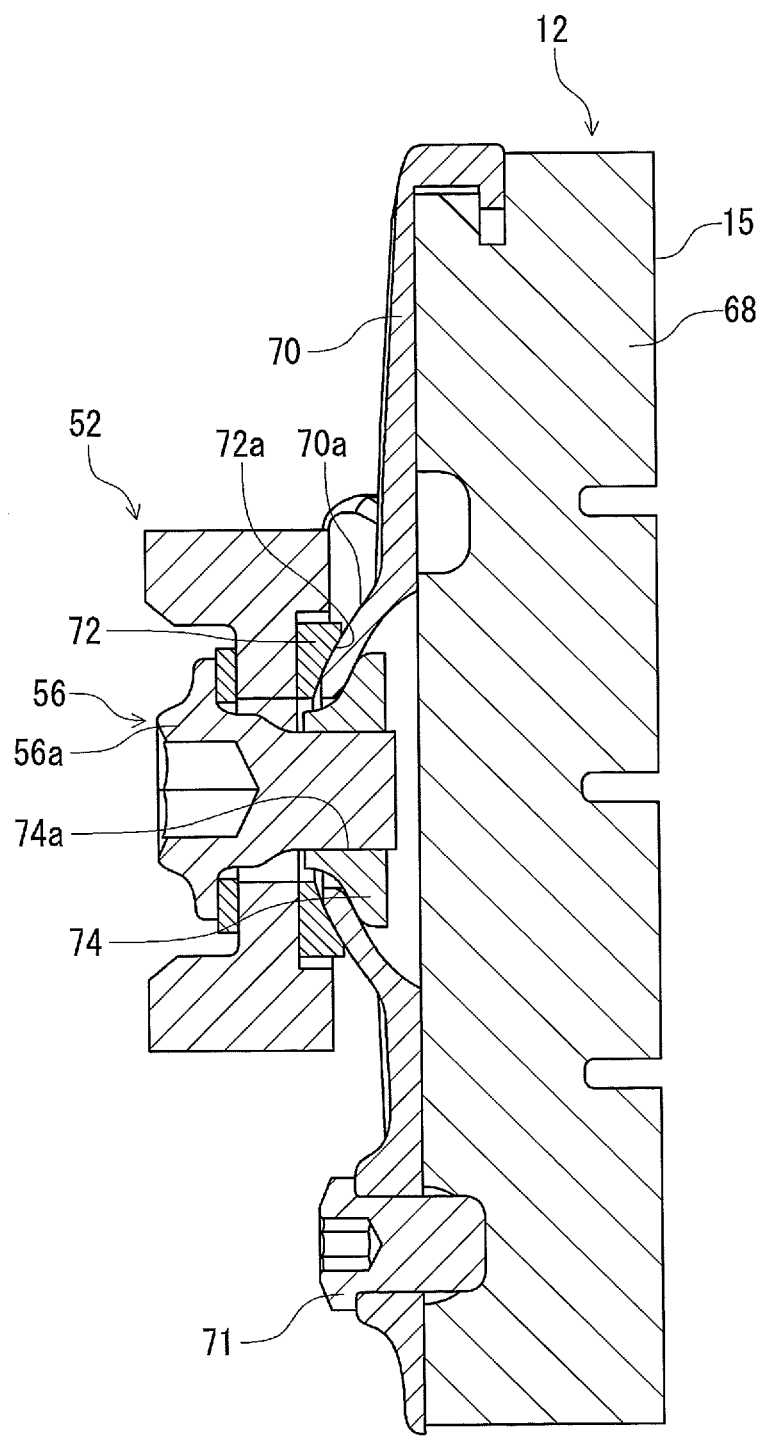
FIG. 9 is a cross-sectional view of the bicycle brake device taken along line IX-IX of FIG. 8.

As seen in FIG. 9, the friction member 12 is attached to the second link member 52 so that an orientation of the friction member 12 is adjustable relative to the second link member 52. In the illustrated embodiment, the friction member 12 includes a brake shoe 68, a shoe attachment member 70, a fastener 71, an adjustment washer 72, and a nut element 74. The brake shoe 68 includes the friction surface 15 and is attached to the shoe attachment member 70. The shoe attachment member 70 includes a first curved surface 70a opposite to the friction surface 15. The fastener 71 is attached to the shoe attachment member 70 to position the brake shoe 68 with respect to the shoe attachment member 70.

The adjustment washer 72 is provided between the shoe attachment member 70 and the second link member 52 and includes a second curved surface 72a. The second curved surface 72a has a complementary shape relative to the first curved surface 70a. In the illustrated embodiment, the first curved surface 70a is a convex surface, and the second curved surface 72a is a concave surface.

The nut element 74 includes an attachment hole 74a having an internal thread. The coupling bolt 56 is threadedly engaged with the attachment hole 74a of the nut element 74. The second link member 52 is sandwiched between the adjustment washer 72 and a head portion 56a of the coupling bolt 56. Orientation of the brake shoe 68 is adjustable relative to the second link member 52 along the first curved surface 70a and the second curved surface 72a.

Figure 10:
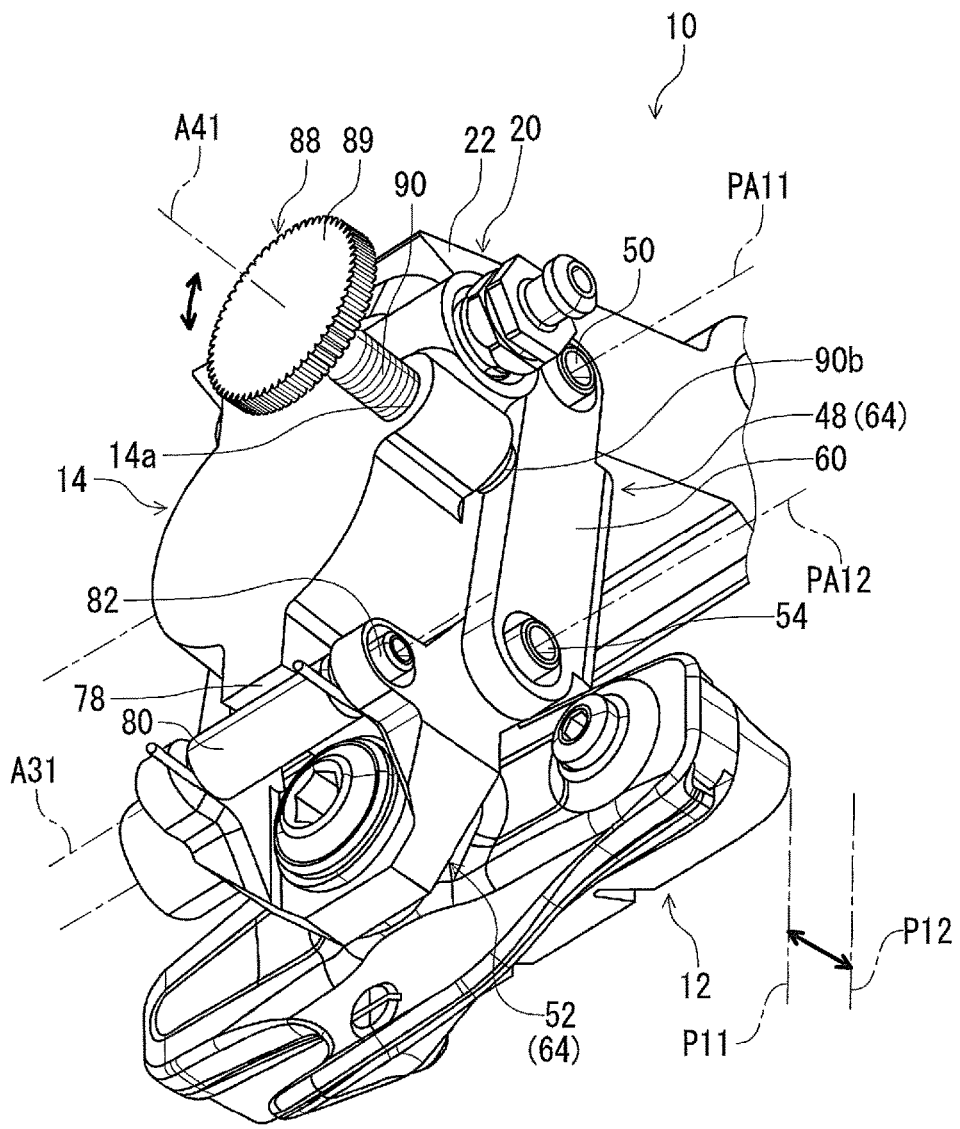
FIG. 10 is a partial perspective view of the bicycle brake device illustrated in FIG. 1.

As seen in FIGS. 6 and 10, the base member 14 is configured to guide the second link member 52 to maintain an orientation of the friction surface 15 of the friction member 12 between the rest position P11 and the braking position P12. The base member 14 includes a guide surface 78. The link structure 30 includes a guide member 80 mounted on the second link member 52. The guide member 80 is rotatably mounted on the second link member 52. In the illustrated embodiment, the second link member 52 includes a support rod 82. The guide member 80 is rotatably mounted on the support rod 82 about a guide rotational axis A31. The guide member 80 is in contact with the guide surface 78 to maintain an orientation of the friction surface 15 of the friction member 12 between the rest position P11 and the braking position P12.

Figure 11:
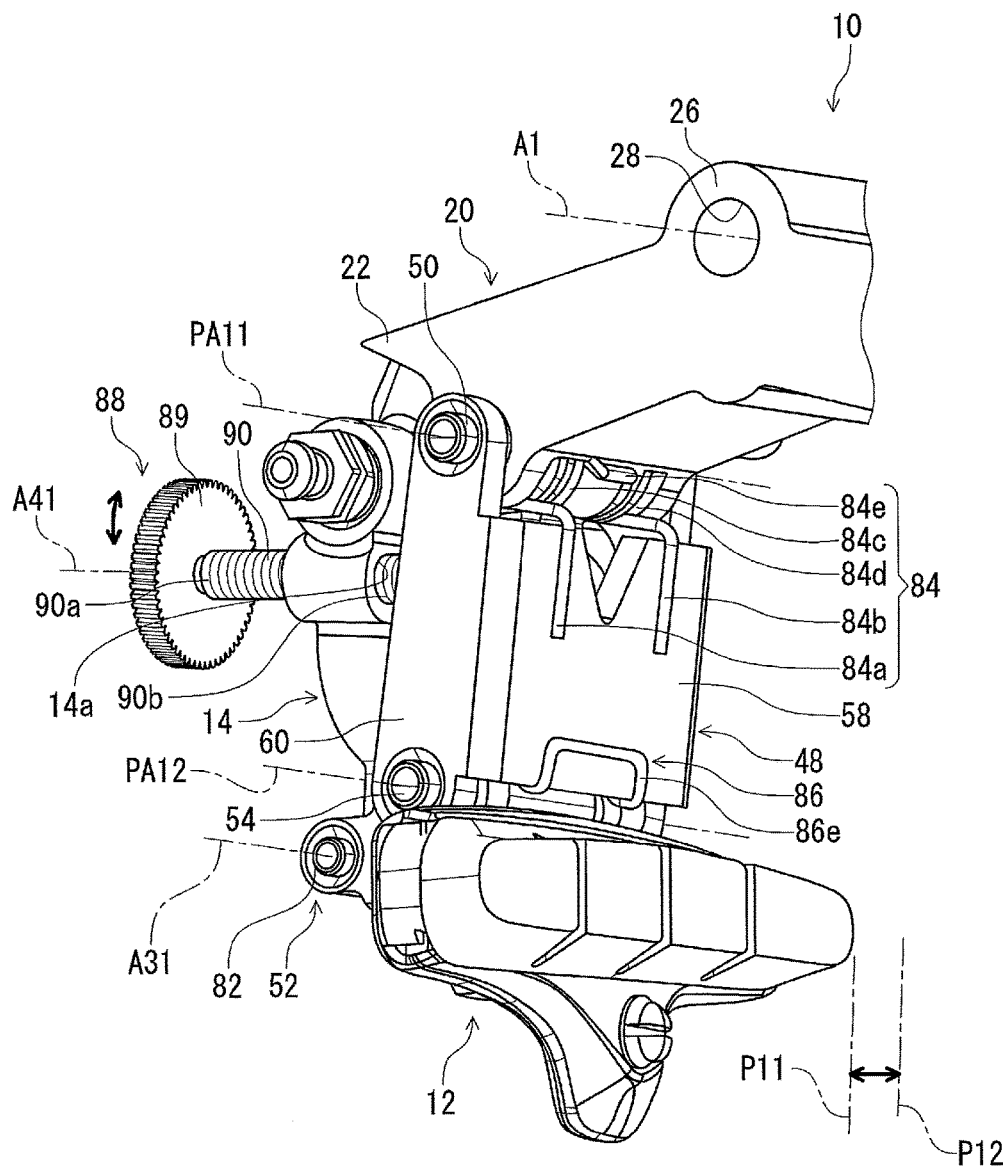
FIG. 11 is a partial perspective view of the bicycle brake device illustrated in FIG. 1.

As seen in FIG. 11, the bicycle brake device 10 further comprises a first biasing member 84 configured to bias the first link member 48 relative to the base member 14 toward the piston 36. In the illustrated embodiment, the first biasing member 84 is a torsion spring and is mounted to the first link pin 50. The first biasing member 84 includes a first end 84a, a second end 84b, a first coiled body 84c, a second coiled body 84d, and a first intermediate portion 84e. The first end 84a extends from the first coiled body 84c. The second end 84b extends from the second coiled body 84d. The first intermediate portion 84e is provided between the first coiled body 84c and the second coiled body 84d and couples the first coiled body 84c to the second coiled body 84d. The first link pin 50 extends through the first coiled body 84c and the second coiled body 84d. The first end 84a and the second end 84b are engaged with the receiving portion 58 of the first link member 48. The first intermediate portion 84e are engaged with the coupling member 20.

As seen in FIGS. 8, 9, and 11, the bicycle brake device 10 further comprises a second biasing member 86 configured to bias the second link member 52 relative to the first link member 48 toward the base member 14. In the illustrated embodiment, the second biasing member 86 is a torsion spring and is mounted to the second link pin 54. The second biasing member 86 includes a third end 86a, a fourth end 86b, a third coiled body 86c, a fourth coiled body 86d, and a second intermediate portion 86e (FIG. 11). The third end 86a extends from the third coiled body 86c. The fourth end 86b extends from the fourth coiled body 86d. The second link pin 54 extends through the third coiled body 86c and the fourth coiled body 86d. The third end 86a and the fourth end 86b are engaged with the support rod 82 of the second link member 52.

As seen in FIG. 11, the second intermediate portion 86e is provided between the third coiled body 86c and the fourth coiled body 86d and couples the third coiled body 86c and the fourth coiled body 86d. The second intermediate portion 86e are engaged with the receiving portion 58 of the first link member 48.

As seen in FIG. 10, the bicycle brake device 10 further comprises a clearance adjustment member 88 configured to adjust the rest position P11 of the friction member 12 relative to the hydraulic cylinder 34. The clearance adjustment member 88 includes an operating portion 89 configured to be operated by the user to adjust the rest position P11 of the friction member 12. In the illustrated embodiment, the operating portion 89 has a disk shape such that the operating portion 89 can be operated without any tools. In other words, the adjustment member 88 is configured as a tool-less adjustment member.

As seen in FIGS. 10 and 11, the clearance adjustment member 88 includes an adjustment rod 90 rotatably mounted to the base member 14 about an adjustment rotational axis A41. The adjustment rod 90 includes a first rod end 90a and a second rod end 90b opposite to the first rod end 90a along the adjustment rotational axis A41. The operating portion 89 is provided at the first rod end 90a. The second rod end 90b is in contact with the first link member 48. In the illustrated embodiment, the second rod end 90b is in contact with the first frame portion 60 of the first link member 48.

As seen in FIG. 11, the adjustment rod 90 includes an external thread. The base member 14 includes a threaded hole 14a. The adjustment rod 90 is threadedly engaged with the threaded hole 14a via the external thread. Rotation of the clearance adjustment member 88 relative to the base member 14 moves the clearance adjustment member 88 relative to the base member 14 along the adjustment rotational axis A41, changing a position of the first link member 48 relative the base member 14. This can change the rest position P11 of the friction member 12. The first biasing member 84 is configured to push the first link member 48 against the second rod end 90b of the adjustment rod 90.

As seen in FIG. 4, the operating portion 89 is at least partially provided in the frame area 46 when viewed from the movement direction D21 in the attachment state. In the illustrated embodiment, the operating portion 89 is partially provided in the frame area 46 when viewed from the movement direction D21 in the attachment state. However, the operating portion 89 can be entirely provided in the frame area 46 when viewed from the movement direction D21 in the attachment state.

The adjustment rod 90 is at least partially provided in the frame area 46 when viewed from the movement direction D21 in the attachment state. In the illustrated embodiment, the adjustment rod 90 is entirely provided in the frame area 46 when viewed from the movement direction D21 in the attachment state. However, the adjustment rod 90 can be partially provided in the frame area 46 or entirely provided outside the frame area 46 when viewed from the movement direction D21 in the attachment state. While the adjustment rotational axis A41 is provided in the frame area 46 when viewed from the movement direction D21 in the attachment state, the adjustment rotational axis A41 can be provided outside the frame area 46 when viewed from the movement direction D21 in the attachment state.

As seen in FIG. 8, the operating portion 89 is at least partially provided in the link area 66 when viewed from the movement direction D21 in the attachment state. In the illustrated embodiment, the operating portion 89 is partially provided in the link area 66 when viewed from the movement direction D21 in the attachment state. However, the operating portion 89 can be entirely provided in the link area 66 when viewed from the movement direction D21 in the attachment state.

The adjustment rod 90 is at least partially provided in the link area 66 when viewed from the movement direction D21 in the attachment state. In the illustrated embodiment, the adjustment rod 90 is entirely provided in the link area 66 when viewed from the movement direction D21 in the attachment state. However, the adjustment rod 90 can be partially provided in the link area 66 or entirely provided outside the link area 66 when viewed from the movement direction D21 in the attachment state. While the adjustment rotational axis A41 is provided in the link area 66 when viewed from the movement direction D21 in the attachment state, the adjustment rotational axis A41 can be provided outside the link area 66 when viewed from the movement direction D21 in the attachment state.

Figure 12:
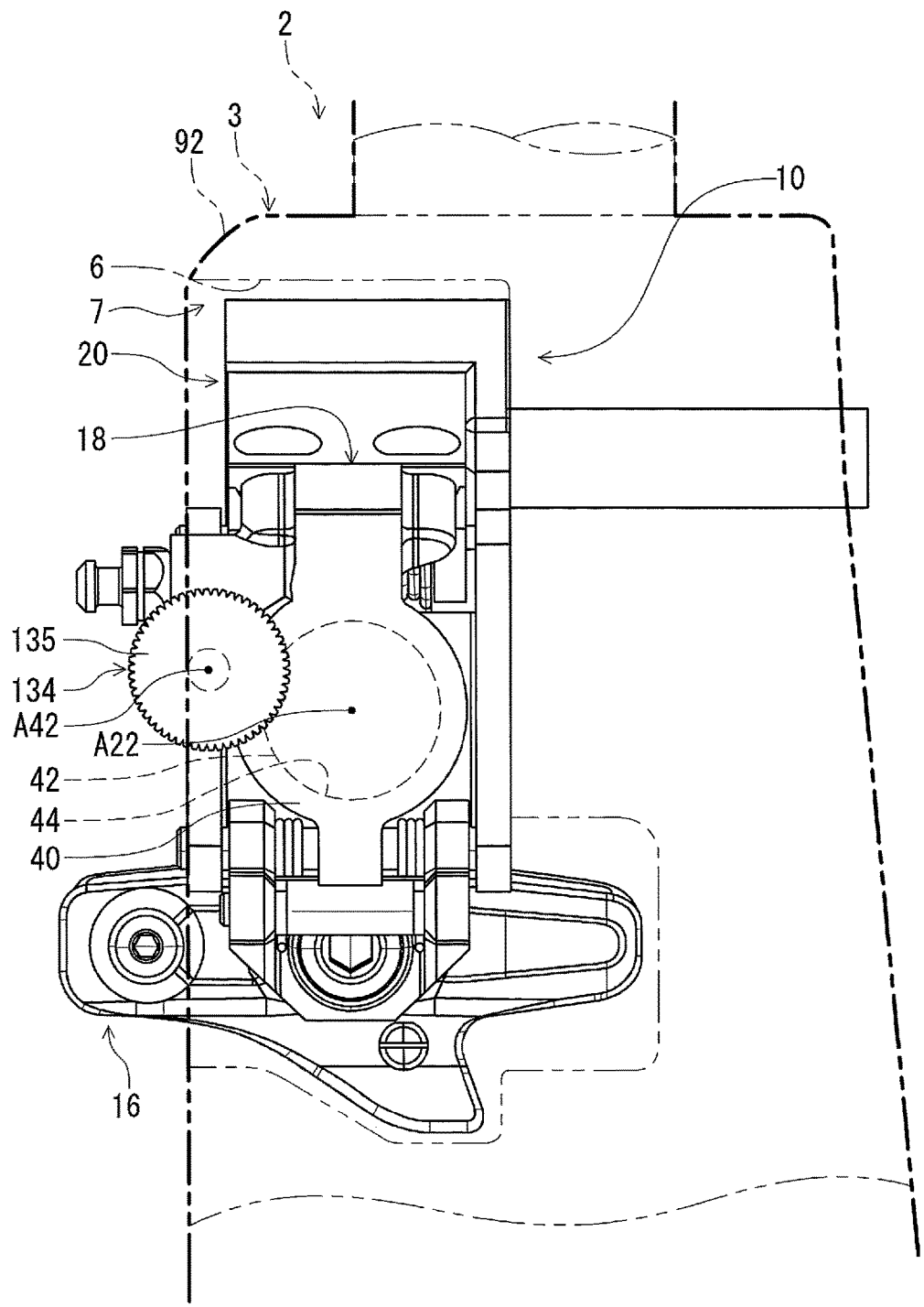
FIG. 12 is a side elevational view of the bicycle frame provided with the bicycle brake device illustrated in FIG. 1.

As seen in FIG. 12, the piston 42 is at least partially provided in a frame area 92 defined by the outline of the bicycle frame 2 when viewed from the movement direction D22 (FIG. 3) in the attachment state where the base member 18 is attached to the bicycle frame 2. In the illustrated embodiment, the piston 42 is entirely provided in the frame area 92 when viewed from the movement direction D22 in the attachment state. However, the piston 42 can be partially provided in the frame area 92 when viewed from the movement direction D22. In the illustrated embodiment, the frame area 92 is defined by an outline of the front fork 3 of the bicycle frame 2 when viewed from the movement direction D22 in the attachment state. The center axis A22 of the piston 42 is arranged in the frame area 92 when viewed from the movement direction D22 in the attachment state.

The hydraulic cylinder 40 is at least partially provided in the frame area 92 where viewed from the movement direction D22 in the attachment state. In the illustrated embodiment, the hydraulic cylinder 40 is entirely provided in the frame area 92 where viewed from the movement direction D22 in the attachment state. However, the hydraulic cylinder 40 can be partially provided in the frame area 92 where viewed from the movement direction D22 in the attachment state.

The base member 18 is at least partially provided in the frame area 92 where viewed from the movement direction D22 in the attachment state. In the illustrated embodiment, the base member 18 is entirely provided in the frame area 92 where viewed from the movement direction D22 in the attachment state. However, the base member 18 can be partially provided in the frame area 92 where viewed from the movement direction D22 in the attachment state.

As seen in FIG. 12, the piston 42 is at least partially provided in the arrangement recess 6 of the bicycle frame 2 in the attachment state. In the illustrated embodiment, the piston 42 is entirely provided in the arrangement recess 6 of the bicycle frame 2 in the attachment state. However, the piston 42 is partially provided in the arrangement recess 6 of the bicycle frame 2 in the attachment state. The piston 42 is entirely provided in the internal space 7 of the bicycle frame 2 when viewed from the movement direction D22 in the attachment state. However, the piston 42 can be at least partially provided in the internal space 7 of the bicycle frame 2 when viewed from the movement direction D22 in the attachment state.

The hydraulic cylinder 40 is at least partially provided in the arrangement recess 6 of the bicycle frame 2 in the attachment state. In the illustrated embodiment, the hydraulic cylinder 40 is entirely provided in the arrangement recess 6 of the bicycle frame 2 in the attachment state. However, the hydraulic cylinder 40 can be partially provided in the arrangement recess 6 of the bicycle frame 2 in the attachment state. The hydraulic cylinder 40 is entirely provided in the internal space 7 of the bicycle frame 2 when viewed from the movement direction D22 in the attachment state. However, the hydraulic cylinder 40 can at least partially provided in the internal space 7 of the bicycle frame 2 when viewed from the movement direction D22 in the attachment state.

The base member 18 is at least partially provided in the arrangement recess 6 of the bicycle frame 2 in the attachment state. In the illustrated embodiment, the base member 18 is entirely provided in the arrangement recess 6 of the bicycle frame 2 in the attachment state. However, the base member 18 can be partially provided in the arrangement recess 6 of the bicycle frame 2 in the attachment state. The base member 18 is entirely provided in the internal space 7 of the bicycle frame 2 when viewed from the movement direction D22 in the attachment state. However, the base member 18 can at least partially provided in the internal space 7 of the bicycle frame 2 when viewed from the movement direction D22 in the attachment state.

Figure 13:
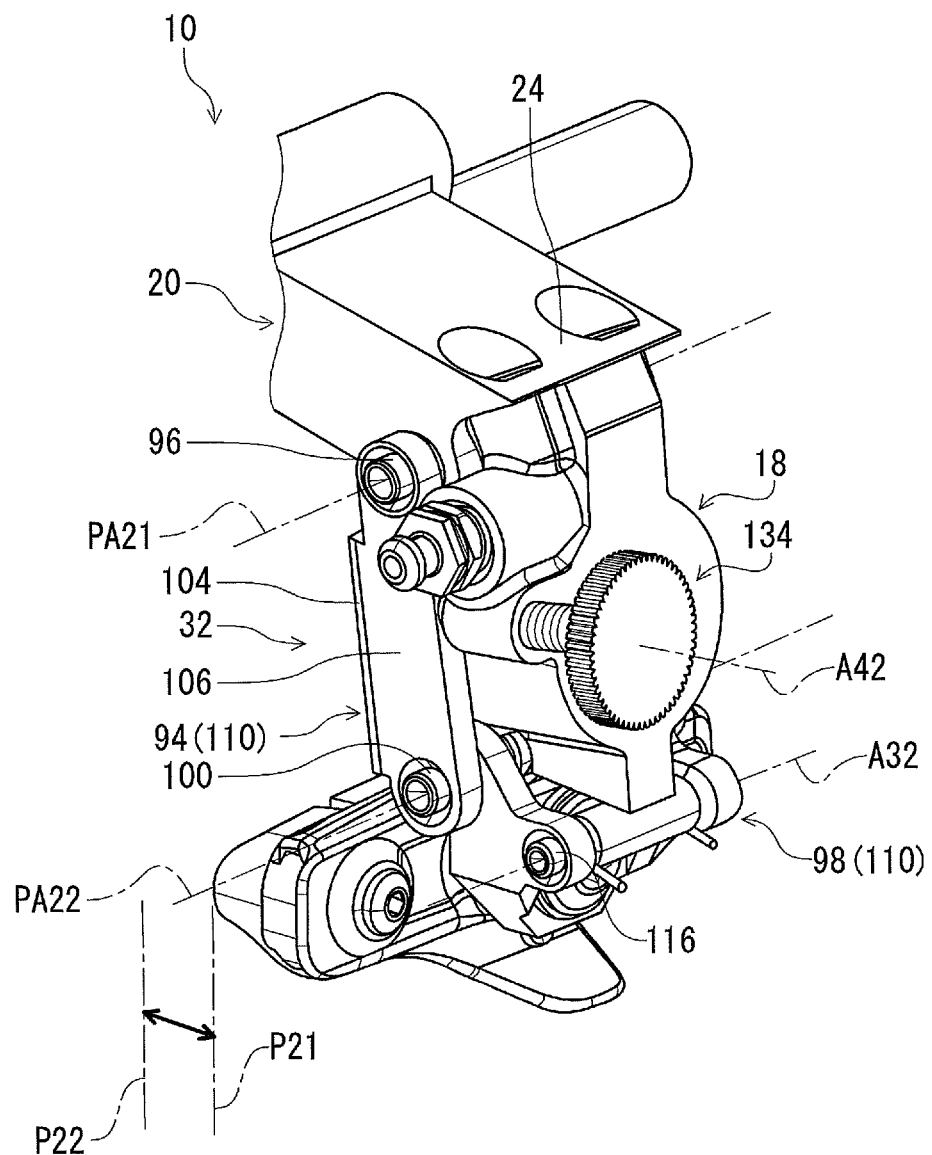
FIG. 13 is a partial perspective view of the bicycle brake device illustrated in FIG. 1.

As seen in FIG. 3, the additional piston 42 is configured to push the additional link structure 32 to move the additional friction member 16 from the additional rest position P21 toward the additional braking position P22. As seen in FIG. 13, the link structure 32 is configured to pivotably couple the friction member 16 to the base member 18 about a first pivot axis PA21. The link structure 32 includes a first link member 94 pivotably coupled to the base member 18 about the first pivot axis PA21. The piston 42 is configured to push the first link member 94 to move the friction member 16 from the rest position P21 toward the braking position P22.

As seen in FIG. 13, the link structure 32 includes a first link pin 96 configured to pivotably couple the first link member 94 to the base member 18 about the first pivot axis PA21. In the illustrated embodiment, the first link pin 96 is configured to pivotably couple the first link member 94 to the base member 18 and the coupling member 20 about the first pivot axis PA21.

As seen in FIG. 13, the link structure 32 includes a second link member 98 pivotably coupled to the first link member 94 about a second pivot axis PA22 parallel to the first pivot axis PA21. The friction member 16 is attached to the second link member 98. The link structure 32 includes a second link pin 100 configured to pivotably couple the second link member 98 to the first link member 94 about the second pivot axis PA22. The bicycle brake device 10 includes a coupling bolt 102 configured to couple the friction member 16 to the second link member 98. The friction member 16 is movable together with the second link member 98 relative to the base member 18.

Figure 14:
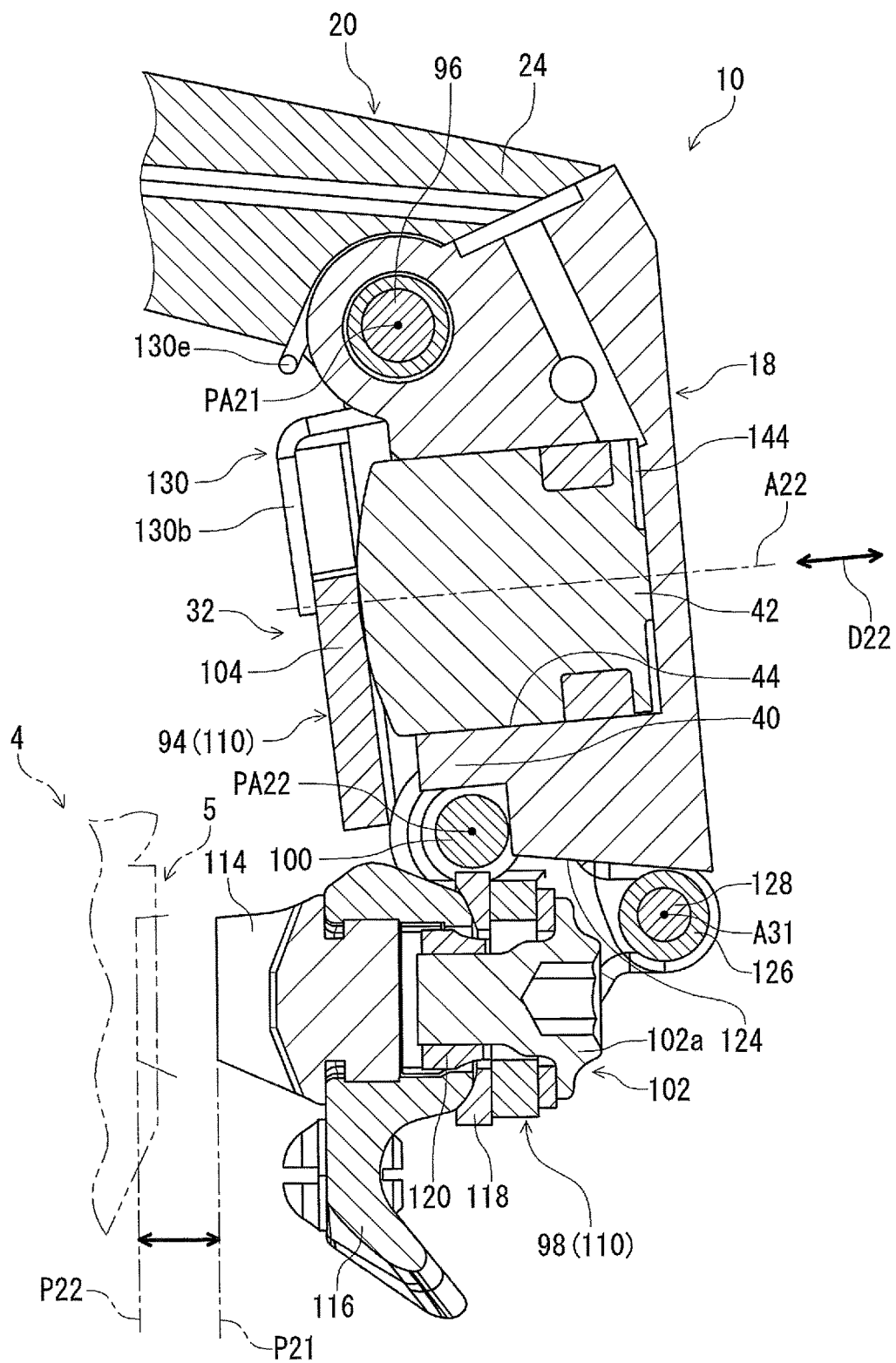
FIG. 14 is a partial cross-sectional view of the bicycle brake device illustrated in FIG. 1.

As seen in FIG. 14, the additional piston 42 is configured to be operatively coupled to the additional friction member 16. Specifically, the first link member 94 includes a receiving portion 104 contactable with the piston 42. The piston 42 is configured to push the receiving portion 104 of the first link member 94. The piston 42 is coupled to the first link member 94 without being fixed to the first link member 94. In the illustrated embodiment, the piston 42 is not secured to the first link member 94 and is merely contactable with the receiving portion 104 of the link member. Namely, the piston 42 is coupled to the friction member 16 without being fixed to the friction member 16. The piston 42 is provided between the first pivot axis PA21 and the friction member 16. The piston 42 is provided between the first pivot axis PA21 and the second pivot axis PA22.

As seen in FIG. 13, the first link member 94 includes a first frame portion 106 pivotably coupled to the base member 18 about the first pivot axis PA21. The receiving portion 104 is secured to the first frame portion 106. The first frame portion 106 is pivotably coupled to the base member 18 about the first pivot axis PA21 via the first link pin 96. The first frame portion 106 is pivotably coupled to the second link member 98 about the second pivot axis PA22 via the second link pin 100. The first frame portion 106 extends from the first pivot axis PA21 to the second pivot axis PA22.

Figure 15:
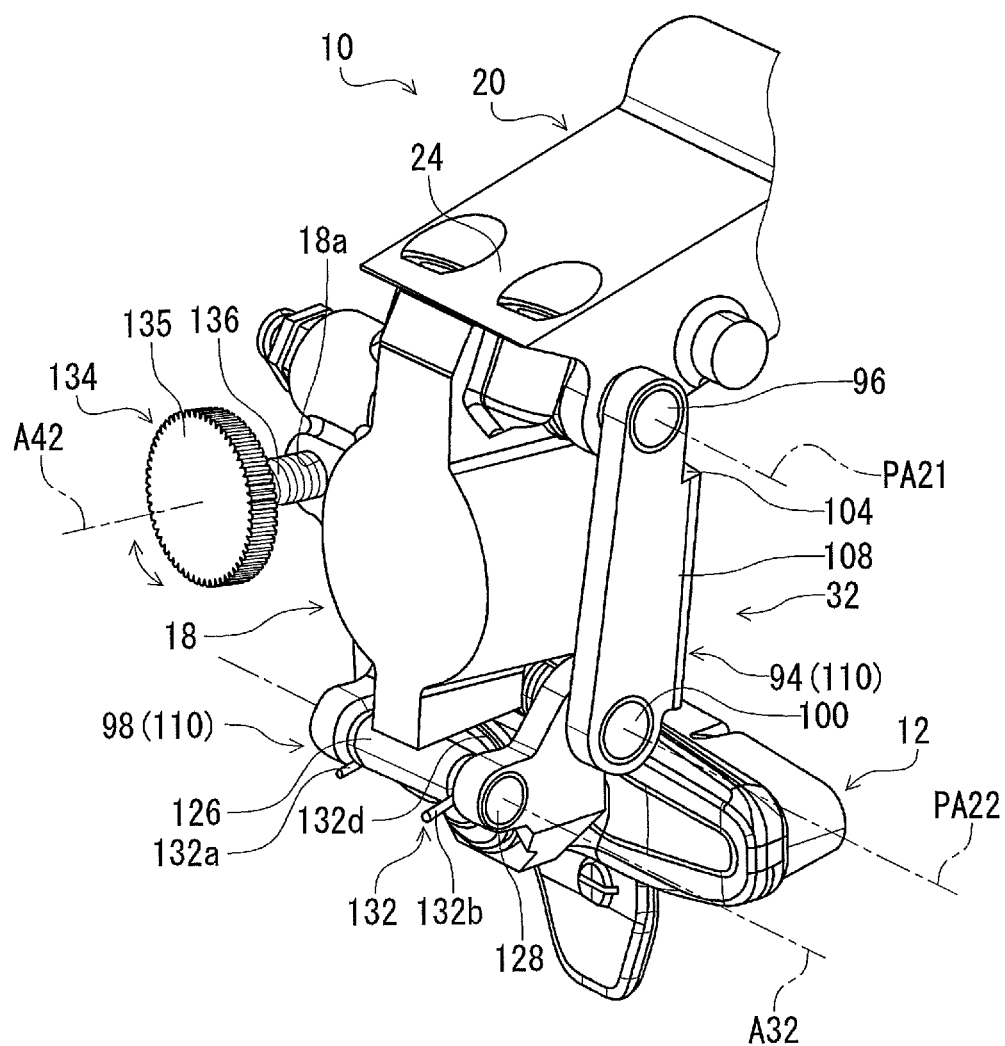
FIG. 15 is a partial perspective view of the bicycle brake device illustrated in FIG. 1.

As seen in FIG. 15, the first link member 94 includes a second frame portion 108 pivotably coupled to the base member 18 about the first pivot axis PA21. The receiving portion 104 is secured to the second frame portion 108. The second frame portion 108 is pivotably coupled to the base member 18 about the first pivot axis PA21 via the first link pin 96. The second frame portion 108 is pivotably coupled to the second link member 98 about the second pivot axis PA22 via the second link pin 54. The second frame portion 108 extends from the first pivot axis PA21 to the second pivot axis PA22.

Namely, as seen in FIG. 14, the bicycle brake device 10 further comprises an intermediate member 110 provided between the piston 42 and the friction member 16 such that the intermediate member 110 moves the friction member 16 in response to movement of the piston 42. In the illustrated embodiment, the intermediate member 110 can also be referred to as at least one of the first link member 94 and the second link member 98.

Figure 16:
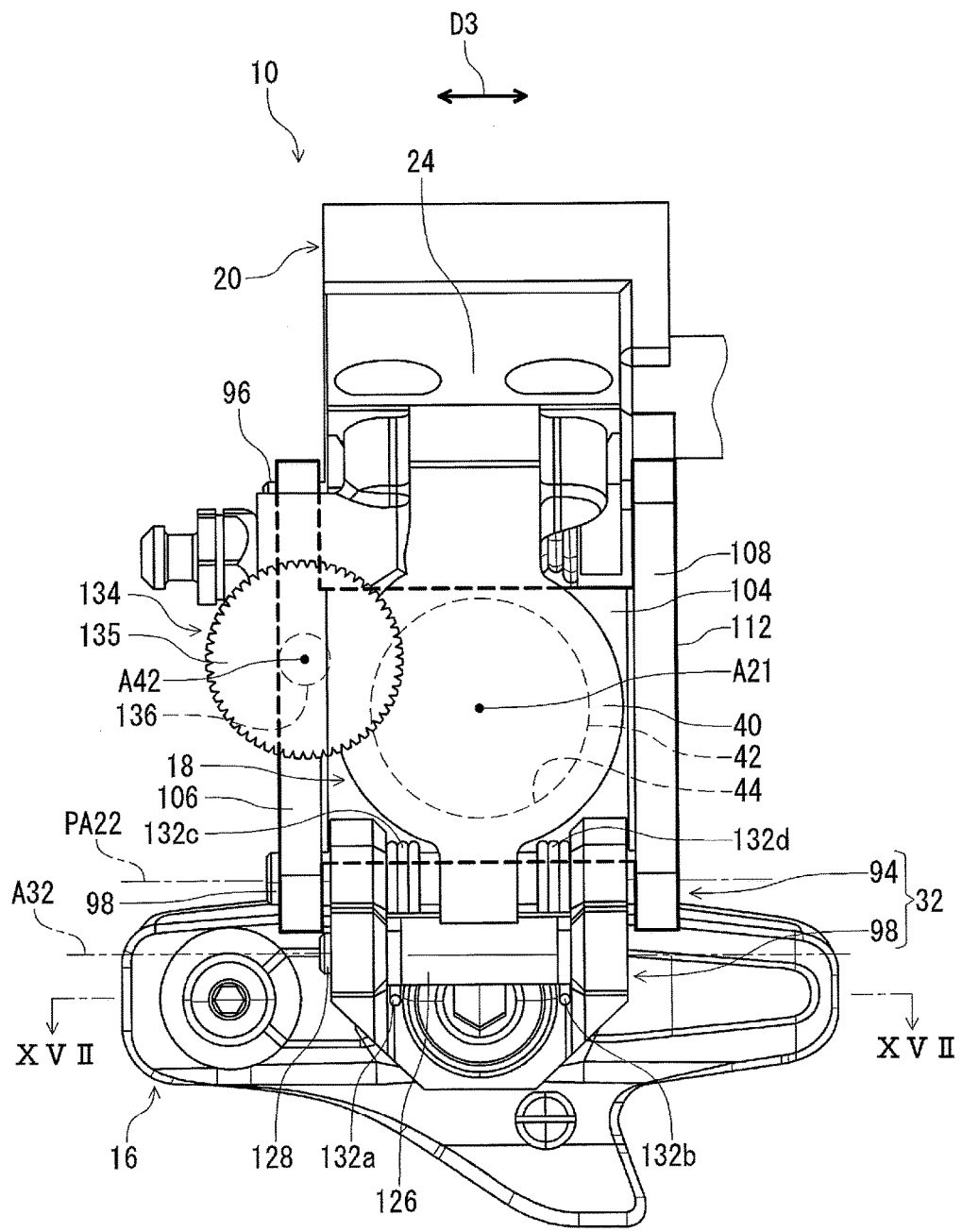
FIG. 16 is a side elevational view of the bicycle brake device illustrated in FIG. 1.

As seen in FIG. 16, the first frame portion 106 is spaced apart from the second frame portion 108 in the axial direction D3 parallel to the first pivot axis PA21. The receiving portion 104 is provided between the first frame portion 106 and the second frame portion 108 in the axial direction D3 and couples the first frame portion 106 to the second frame portion 108.

As seen in FIG. 16, the piston 42 is at least partially provided in a link area 112 defined by an outline of the first link member 94 when viewed from the movement direction D22. In FIG. 16, the link area 112 is indicated with a thick line. In the illustrated embodiment, the piston 42 is entirely provided in the link area 112 when viewed from the movement direction D22. The center axis A22 is provided in the link area 112 when viewed from the movement direction D22. The link area 112 is defined by the receiving portion 104, the first frame portion 106, and the second frame portion 108.

Figure 17:
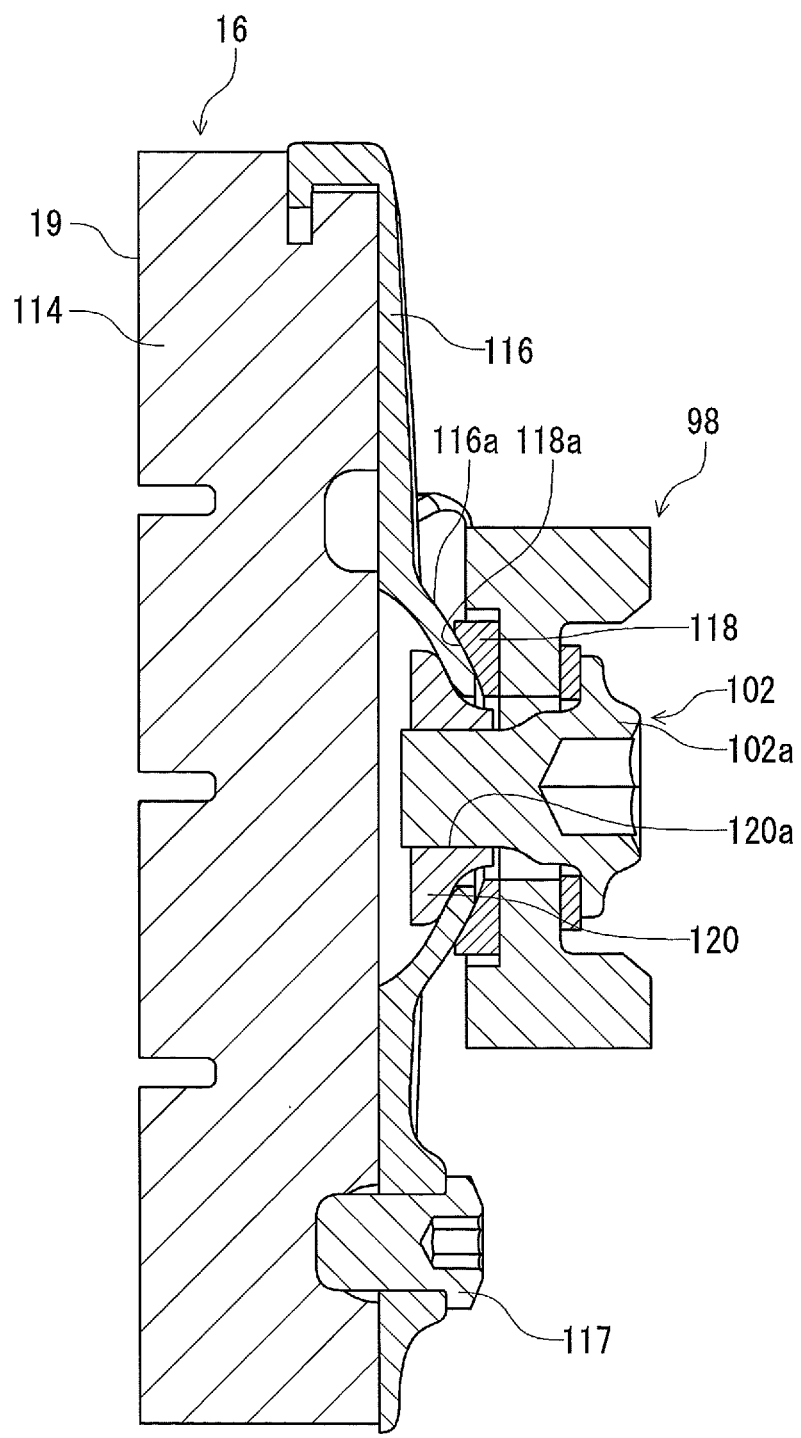
FIG. 17 is a cross-sectional view of the bicycle brake device taken along line XVII-XVII of FIG. 16.

As seen in FIG. 17, the friction member 16 is attached to the second link member 98 so that an orientation of the friction member 16 is adjustable relative to the second link member 98. In the illustrated embodiment, the friction member 16 includes a brake shoe 114, a shoe attachment member 116, a fastener 117, an adjustment washer 118, and a nut element 120. The brake shoe 114 includes the friction surface 19 and is attached to the shoe attachment member 116. The shoe attachment member 116 includes a first curved surface 116a opposite to the friction surface 15. The fastener 117 is attached to the shoe attachment member 116 to position the brake shoe 114 with respect to the shoe attachment member 116.

The adjustment washer 118 is provided between the shoe attachment member 116 and the second link member 98 and includes a second curved surface 118a. The second curved surface 118a has a complementary shape relative to the first curved surface 116a. In the illustrated embodiment, the first curved surface 116a is a convex surface, and the second curved surface 118a is a concave surface.

The nut element 120 includes an attachment hole 120a having an internal thread. The coupling bolt 102 is threadedly engaged with the attachment hole 120a of the nut element 120. The second link member 98 is sandwiched between the adjustment washer 118 and a head portion 102a of the coupling bolt 102. Orientation of the brake shoe 114 is adjustable relative to the second link member 98 along the first curved surface 116a and the second curved surface 118a.

Figure 18:
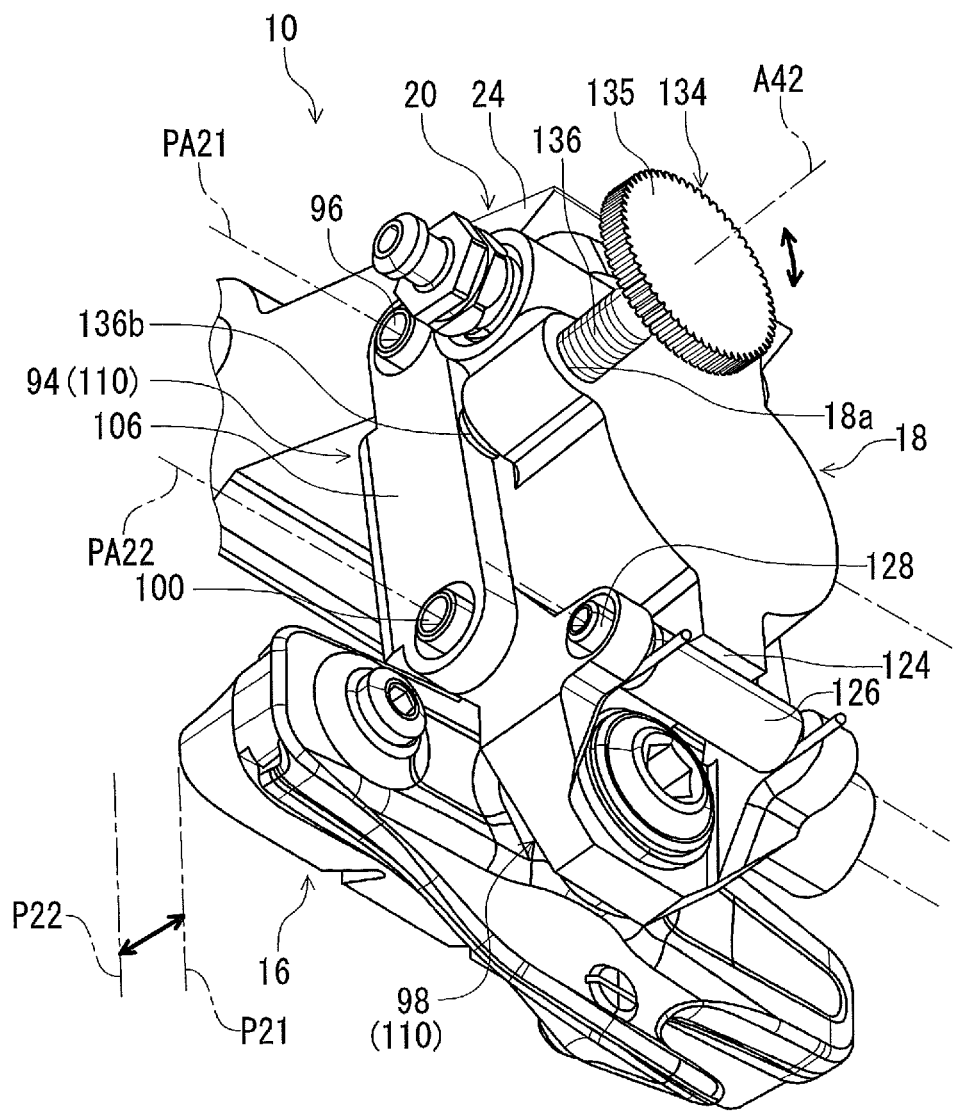
FIG. 18 is a partial perspective view of the bicycle brake device illustrated in FIG. 1.

As seen in FIGS. 14 and 18, the base member 18 is configured to guide the second link member 98 to maintain an orientation of the friction surface 15 of the friction member 16 between the rest position P21 and the braking position P22. The base member 18 includes a guide surface 124. The link structure 32 includes a guide member 126 mounted on the second link member 98. The guide member 126 is rotatably mounted on the second link member 98. In the illustrated embodiment, the second link member 98 includes a support rod 128. The guide member 126 is rotatably mounted on the support rod 128 about a guide rotational axis A32. The guide member 126 is in contact with the guide surface 124 to maintain an orientation of the friction surface 15 of the friction member 16 between the rest position P21 and the braking position P22.

Figure 19:
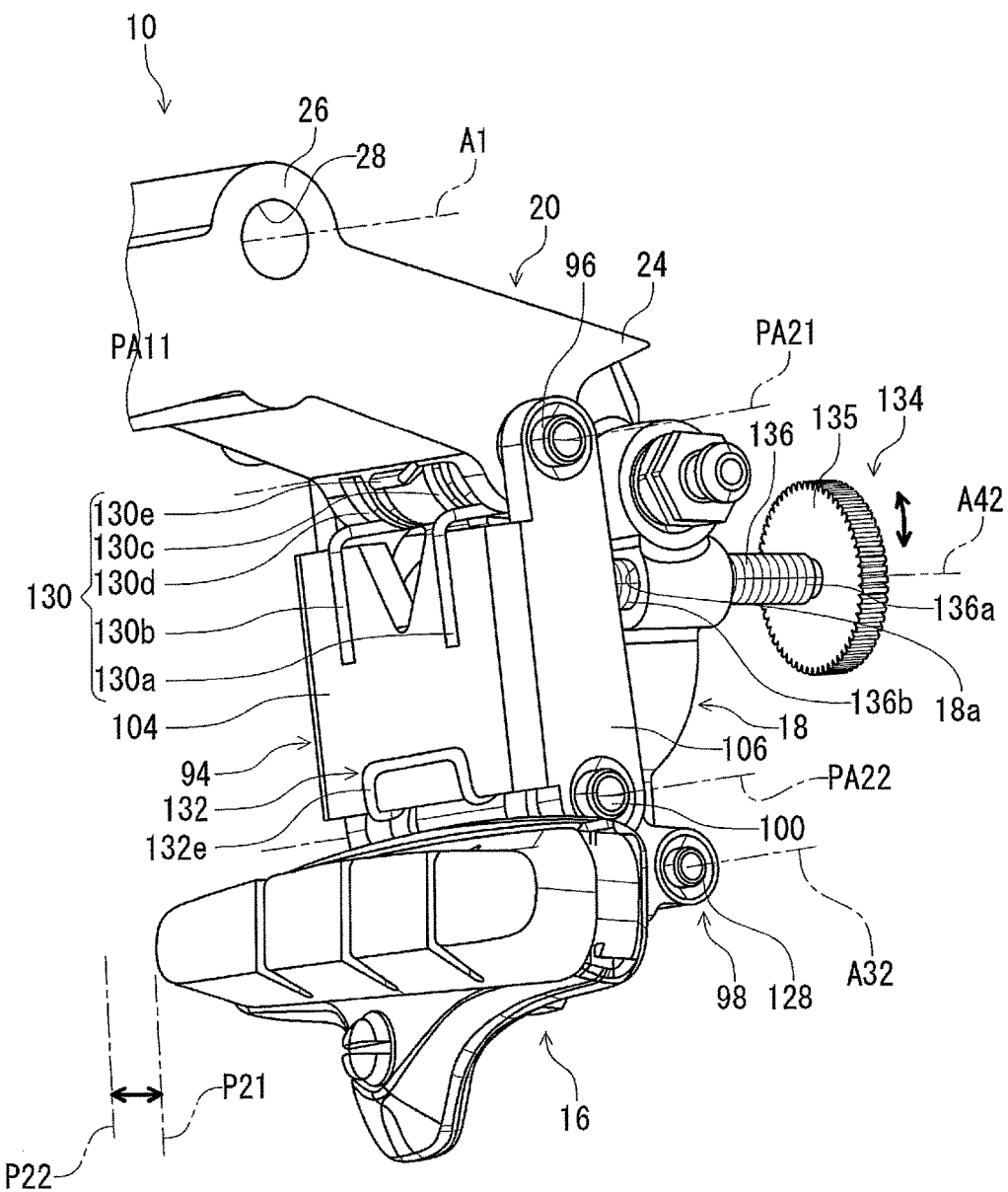
FIG. 19 is a partial perspective view of the bicycle brake device illustrated in FIG. 1.

As seen in FIG. 19, the bicycle brake device 10 further comprises a first biasing member 130 configured to bias the first link member 94 relative to the base member 18 toward the piston 42. In the illustrated embodiment, the first biasing member 130 is a torsion spring and is mounted to the first link pin 96. The first biasing member 130 includes a first end 130a, a second end 130b, a first coiled body 130c, a second coiled body 130d, and a first intermediate portion 130e. The first end 130a extends from the first coiled body 130c. The second end 130b extends from the second coiled body 130d. The first intermediate portion 130e is provided between the first coiled body 130c and the second coiled body 130d and couples the first coiled body 130c to the second coiled body 130d. The first link pin 96 extends through the first coiled body 130c and the second coiled body 130d. The first end 130a and the second end 130b are engaged with the receiving portion 104 of the first link member 94. The first intermediate portion 130e are engaged with the coupling member 20.

As seen in FIGS. 16, 17, and 19, the bicycle brake device 10 further comprises a second biasing member 132 configured to bias the second link member 98 relative to the first link member 94 toward the base member 18. In the illustrated embodiment, the second biasing member 132 is a torsion spring and is mounted to the second link pin 100. The second biasing member 132 includes a third end 132a, a fourth end 132b, a third coiled body 132c, a fourth coiled body 132d, and a second intermediate portion 132e (FIG. 19). The third end 132a extends from the third coiled body 132c. The fourth end 132b extends from the fourth coiled body 132d. The second link pin 100 extends through the third coiled body 132c and the fourth coiled body 132d. The third end 132a and the fourth end 132b are engaged with the support rod 128 of the second link member 98.

As seen in FIG. 19, the second intermediate portion 132e is provided between the third coiled body 132c and the fourth coiled body 132d and couples the third coiled body 132c and the fourth coiled body 132d. The second intermediate portion 132e are engaged with the receiving portion 104 of the first link member 94.

As seen in FIG. 18, the bicycle brake device 10 further comprises a clearance adjustment member 134 configured to adjust the rest position P21 of the friction member 16 relative to the hydraulic cylinder 40. The clearance adjustment member 134 includes an operating portion 135 configured to be operated by the user to adjust the rest position P21 of the friction member 16. In the illustrated embodiment, the operating portion 135 has a disk shape such that the operating portion 135 can be operated without any tools. In other words, the adjustment member 134 is configured as a tool-less adjustment member.

As seen in FIGS. 18 and 19, the clearance adjustment member 134 includes an adjustment rod 136 rotatably mounted to the base member 18 about an adjustment rotational axis A42. The adjustment rod 136 includes a first rod end 136a and a second rod end 136b opposite to the first rod end 136a along the adjustment rotational axis A42. The operating portion 135 is provided at the first rod end 136a. The second rod end 136b is in contact with the first link member 94. In the illustrated embodiment, the second rod end 136b is in contact with the first frame portion 106 of the first link member 94.

As seen in FIG. 19, the adjustment rod 136 includes an external thread. The base member 18 includes a threaded hole 18a. The adjustment rod 136 is threadedly engaged with the threaded hole 18a via the external thread. Rotation of the clearance adjustment member 134 relative to the base member 18 moves the clearance adjustment member 134 relative to the base member 18 along the adjustment rotational axis A42, changing a position of the first link member 94 relative the base member 18. This can change the rest position P21 of the friction member 16. The first biasing member 130 is configured to push the first link member 94 against the second rod end 136b of the adjustment rod 136.

As seen in FIG. 12, the operating portion 135 is at least partially provided in the frame area 92 when viewed from the movement direction D22 in the attachment state. In the illustrated embodiment, the operating portion 135 is partially provided in the frame area 92 when viewed from the movement direction D22 in the attachment state. However, the operating portion 135 can be entirely provided in the frame area 92 when viewed from the movement direction D22 in the attachment state.

The adjustment rod 136 is at least partially provided in the frame area 92 when viewed from the movement direction D22 in the attachment state. In the illustrated embodiment, the adjustment rod 136 is entirely provided in the frame area 92 when viewed from the movement direction D22 in the attachment state. However, the adjustment rod 136 can be partially provided in the frame area 92 or entirely provided outside the frame area 92 when viewed from the movement direction D22 in the attachment state. While the adjustment rotational axis A42 is provided in the frame area 92 when viewed from the movement direction D22 in the attachment state, the adjustment rotational axis A42 can be provided outside the frame area 92 when viewed from the movement direction D22 in the attachment state.

As seen in FIG. 16, the operating portion 135 is at least partially provided in the link area 112 when viewed from the movement direction D22 in the attachment state. In the illustrated embodiment, the operating portion 135 is partially provided in the link area 112 when viewed from the movement direction D22 in the attachment state. However, the operating portion 135 can be entirely provided in the link area 112 when viewed from the movement direction D22 in the attachment state.

The adjustment rod 136 is at least partially provided in the link area 112 when viewed from the movement direction D22 in the attachment state. In the illustrated embodiment, the adjustment rod 136 is entirely provided in the link area 112 when viewed from the movement direction D22 in the attachment state. However, the adjustment rod 136 can be partially provided in the link area 112 or entirely provided outside the link area 112 when viewed from the movement direction D22 in the attachment state. While the adjustment rotational axis A42 is provided in the link area 112 when viewed from the movement direction D22 in the attachment state, the adjustment rotational axis A42 can be provided outside the link area 112 when viewed from the movement direction D22 in the attachment state.

Figure 20:
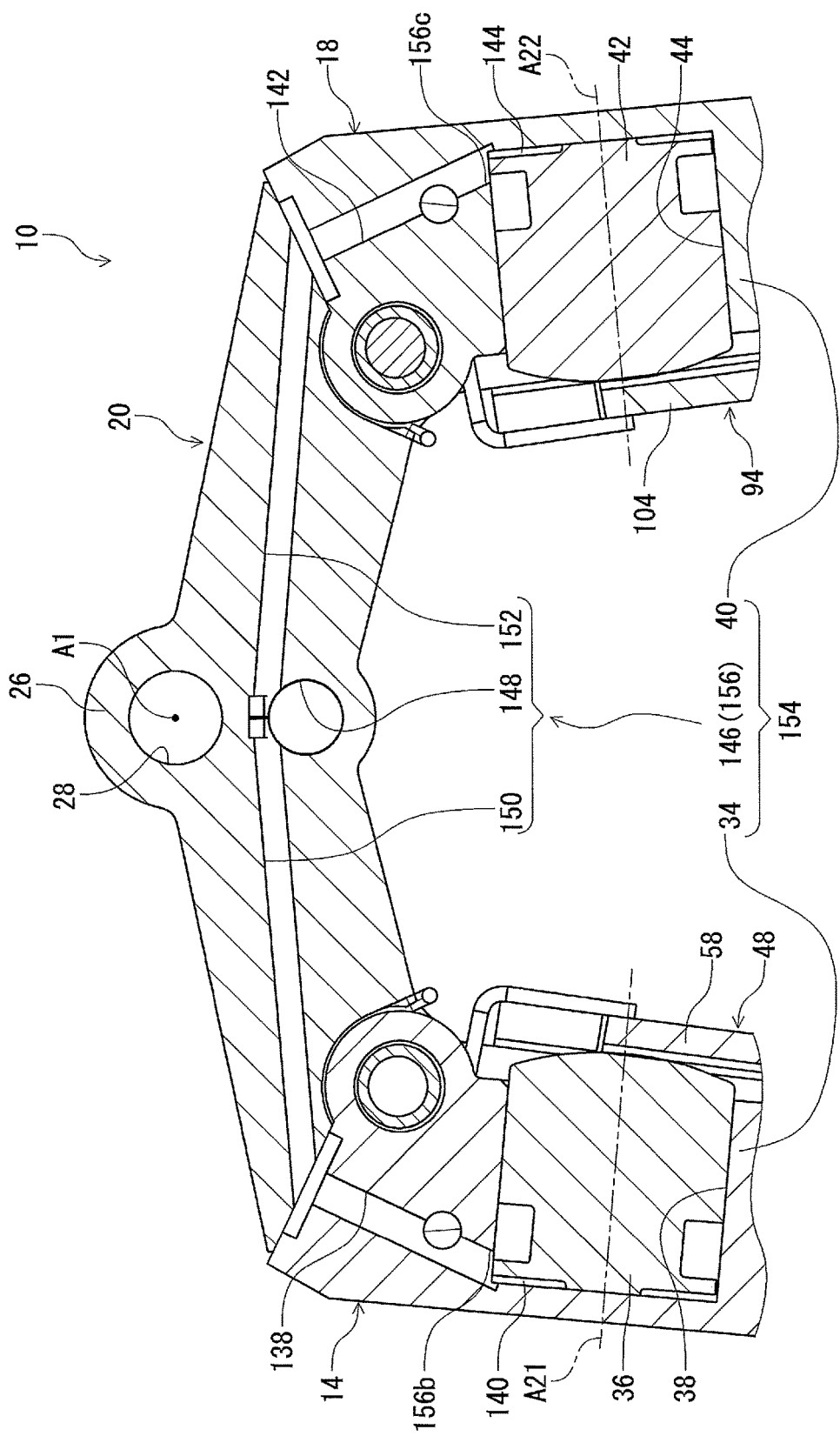
FIG. 20 is a partial cross-sectional view of the bicycle brake device illustrated in FIG. 1.

As seen in FIG. 20, the hydraulic cylinder 34 includes a fluid passageway 138 connected to a hydraulic chamber 140 defined by the hydraulic cylinder 34 and the piston 36. The additional hydraulic cylinder 40 includes an additional fluid passageway 142 connected to an additional hydraulic chamber 144 defined by the additional hydraulic cylinder 40 and the additional piston 42. The coupling member 20 includes an intermediate fluid passageway 146 configured to connect the fluid passageway 138 to the additional fluid passageway 142.

In the illustrated embodiment, the intermediate fluid passageway 146 includes an inlet passageway 148, a first connecting passageway 150, and a second connecting passageway 152. The first connecting passageway 150 connects the inlet passageway 148 to the fluid passageway 138 of the base member 14. The second connecting passageway 152 connects the inlet passageway 148 to the additional fluid passageway 142 of the base member 18.

Figure 21:
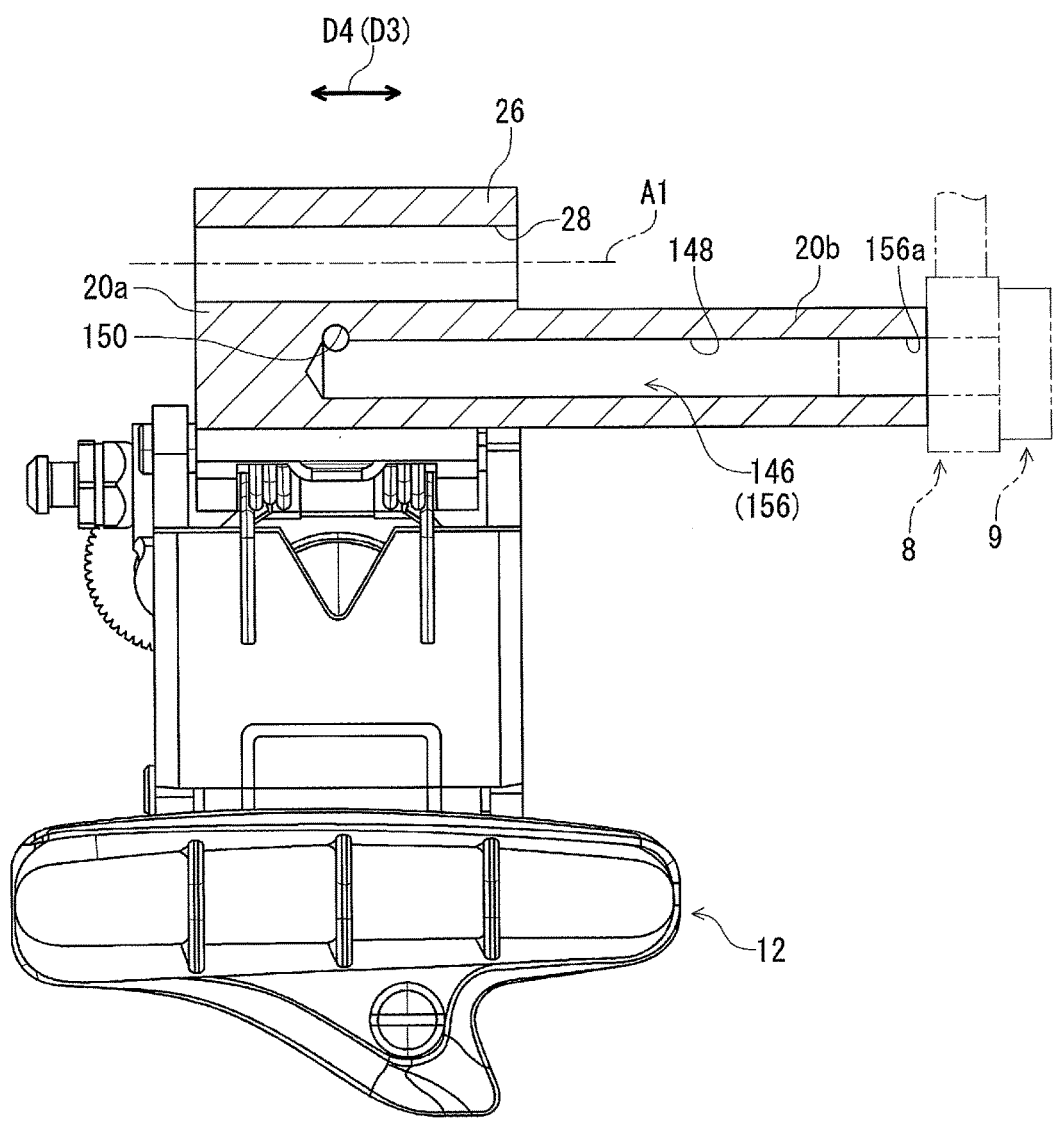
FIG. 21 is a cross-sectional view of the bicycle brake device illustrated in FIG. 1.

As seen in FIG. 21, the intermediate fluid passageway 146 at least partially extends in a mounting direction D4 parallel to the mounting axis A1. In the illustrated embodiment, the inlet passageway 148 extends in the mounting direction D4. As seen in FIG. 11, the mounting axis A1 is parallel to the first pivot axis PA11 and the second pivot axis PA12. As seen in FIG. 19, the mounting axis A1 is parallel to the first pivot axis PA21 and the second pivot axis PA22. The coupling member 20 includes a main body 20a and a connecting pipe 20b extending from the main body 20a in the mounting direction D4. The inlet passageway 148 is partially provided in the connecting pipe 20b.

In other words, as seen in FIG. 20, the bicycle brake device 10 comprises a base structure 154. The base structure 154 includes the hydraulic cylinder 34, the additional hydraulic cylinder 40, and an internal fluid passageway 156. As seen in FIGS. 20 and 21, the internal fluid passageway 156 includes a single inlet port 156a, an outlet port 156b, and an additional outlet port 156c. The outlet port 156b is connected to the hydraulic cylinder 34. The additional outlet port 156c is connected to the additional hydraulic cylinder 40. A banjo 8 is connected to the inlet port 156a via a banjo attachment bolt 9.

As seen in FIGS. 20 and 21, when a brake operating device (not shown) is operated by a user, hydraulic pressure is transmitted from a master cylinder (not shown) of the brake operating device to the hydraulic chamber 140 and the additional hydraulic chamber 144 via the intermediate fluid passageway 146 of the coupling member 20.

As seen in FIG. 6, the hydraulic pressure moves the piston 36 relative to the base member 14 toward the receiving portion 58 of the link structure 30 in the movement direction D21 against the biasing force of the first biasing member 84. This moves the piston 36 relative to the base member 14 from the rest position P11 toward the braking position P12.

Similarly, as seen in FIG. 14, the hydraulic pressure moves the piston 42 relative to the base member 18 toward the receiving portion 104 of the link structure 32 in the movement direction D22 against the biasing force of the first biasing member 130. This moves the piston 42 relative to the base member 18 from the rest position P21 toward the braking position P22. Thus, the bicycle rim 5 is sandwiched between the friction members 12 and 16, applying the braking force from each of the friction members 12 and 16 to the bicycle rim 5 of the bicycle wheel 4.

Since the guide member 80 is guided along the guide surface 78 of the base member 14, the orientation of the friction member 12 is maintained while the friction member 12 moves from the rest position P11 toward the braking position P12. Similarly, since the guide member 126 is guided along the guide surface 124 of the base member 18, the orientation of the friction member 12 is maintained while the friction member 12 moves from the rest position P21 toward the braking position P22.

With the bicycle brake device 10, as seen in FIG. 4, the piston 36 is at least partially provided in the frame area 46 defined by the outline of the bicycle frame 2 when viewed from the movement direction D21 in the attachment state where the base member 14 is attached to the bicycle frame 2. Accordingly, it is possible to make the bicycle brake device 10 more compact.

Similarly, as seen in FIG. 12, the piston 42 is at least partially provided in the frame area 92 defined by the outline of the bicycle frame 2 when viewed from the movement direction D22 in the attachment state where the base member 18 is attached to the bicycle frame 2. Accordingly, it is possible to make the bicycle brake device 10 more compact.

Second Embodiment

A bicycle brake device 210 in accordance with a second embodiment will be described below referring to FIGS. 22 to 38. Elements having substantially the same function as those in the first embodiment will be numbered the same here, and will not be described and/or illustrated again in detail here for the sake of brevity.

Figure 22:
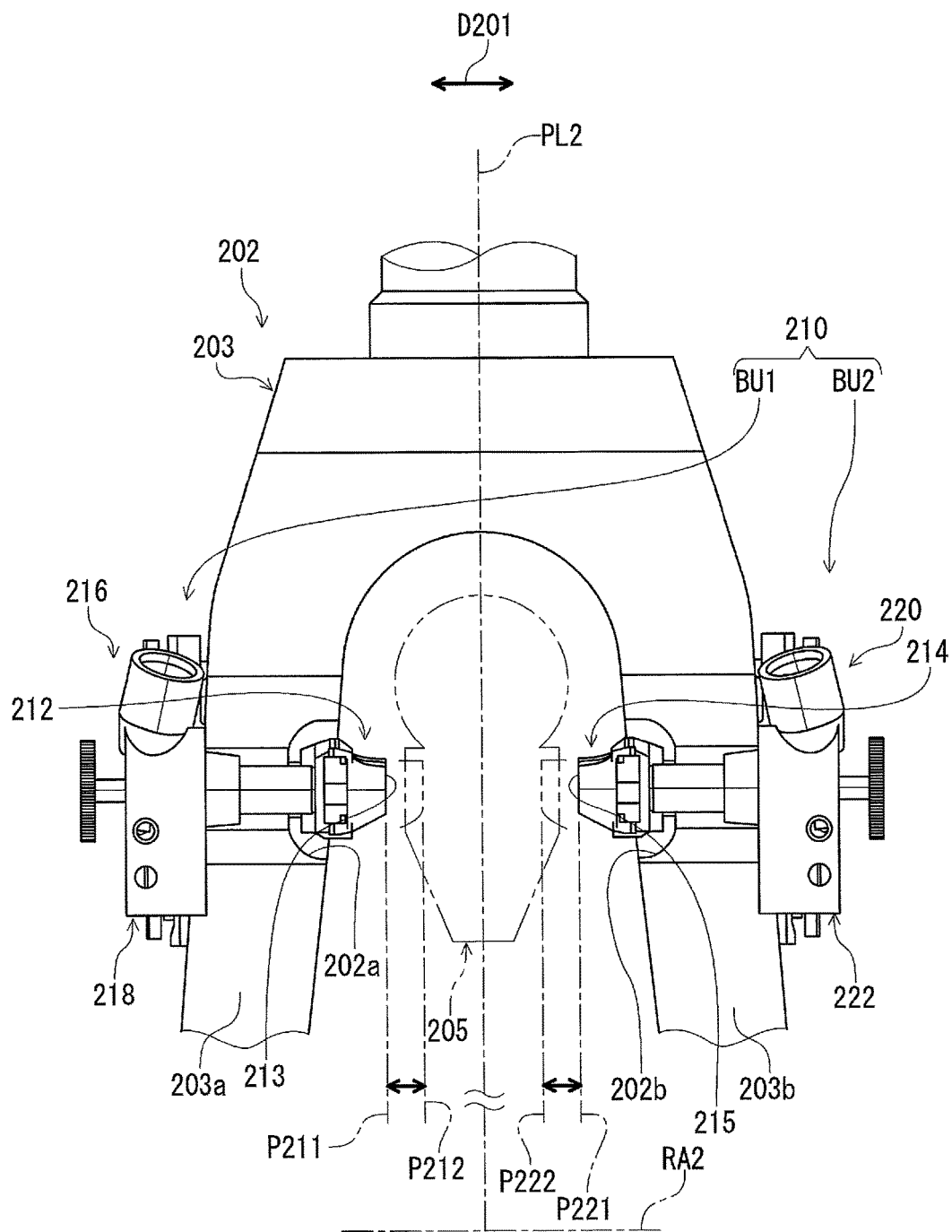
FIG. 22 is a rear elevational view of a bicycle frame provided with a bicycle brake device in accordance with a second embodiment.

Referring initially to FIG. 22, the bicycle brake device 210 in accordance with a second embodiment is configured to be mounted to a bicycle frame 202. In the illustrated embodiment, the bicycle brake device 210 includes a first brake unit BU1 and a second brake unit BU2. While the first brake unit BU1 is separate from the second brake unit BU2 in the illustrated embodiment, the first brake unit BU1 and the second brake unit BU2 are integrally provided with each other if needed and/or desired. While the bicycle brake device 210 is a front brake device in the illustrated embodiment, structures of the bicycle brake device 210 can be applied to a rear brake device if needed and/or desired.

The bicycle brake device 210 is mounted to a front fork 203 of the bicycle frame 202 and is configured to apply a braking force to the rotatable member 204 such as a bicycle wheel rotatably attached to the front fork 203. The rotatable member 204 can also be referred to as the bicycle wheel 204. The bicycle brake device 210 is configured as a bicycle rim brake device in the illustrated embodiment. The structures of the bicycle brake device 210 can be applied to a bicycle click brake device if needed and/or desired.

As seen in FIG. 22, the bicycle brake device 210 comprises a friction member 212. The friction member 212 is configured to face a bicycle rim 205 of the bicycle wheel 204. The friction member 212 is slidable with the bicycle rim 205 of the bicycle wheel 204. The friction member 212 has a friction surface 213 which faces the rotatable member 204. The friction member 212 is provided between the bicycle rim 205 and the bicycle frame 202. In the illustrated embodiment, the front fork 203 includes a first fork arm 203a and a second fork arm 203b. The friction member 212 is provided between the bicycle rim 205 and the first fork arm 203a. The friction member 212 is at least partially provided in a recess 202a of the bicycle frame 202.

As seen in FIG. 22, the bicycle brake device 210 comprises a friction member 214. The friction member 214 is configured to face the bicycle rim 205. The friction member 214 is slidable with the bicycle rim 205 of the bicycle wheel 204. The friction member 214 is slidable with the bicycle rim 205 of the bicycle wheel 204. The friction member 214 has a friction surface 215 which faces the rotatable member 204. The friction member 214 is spaced apart from the friction member 212 in a transverse direction D201 parallel to a rotational axis RA2 of the bicycle wheel 204. The friction member 214 is provided between the bicycle rim 205 of the bicycle wheel 204 and the bicycle frame 202. In the illustrated embodiment, the friction member 214 is provided between the bicycle rim 205 and the second fork arm 203b. The friction member 214 is at least partially provided in a recess 202b of the bicycle frame 202.

The friction member 212 and the friction member 214 are symmetrical with respect to the center virtual plane PL2 perpendicular to the rotational axis RA2. The bicycle brake device 210 has a symmetrical structure relative to the center virtual plane PL2.

As seen in FIG. 22, the bicycle brake device 210 comprises a pushing structure 216. The pushing structure 216 is configured to push the friction member 212 against the bicycle rim 205 of the bicycle wheel 204. The pushing structure 216 is mounted to the bicycle frame 202. In the illustrated embodiment, the pushing structure 216 is mounted to the first fork arm 203a of the front fork 203. Specifically, the pushing structure 216 includes a base member 218. The base member 218 is configured to be attached to the bicycle frame 202. In the illustrated embodiment, the base member 218 is configured to be attached to the front fork 203 (e.g., the first fork arm 203a) of the bicycle frame 202.

As seen in FIG. 22, the bicycle brake device 210 comprises a pushing structure 220. The pushing structure 220 is configured to push the friction member 212 against the bicycle rim 205 of the bicycle wheel 204. The pushing structure 220 is mounted to the bicycle frame 202. In the illustrated embodiment, the pushing structure 220 is mounted to the first fork arm 203a of the front fork 203. Specifically, the pushing structure 220 includes a base member 222. The base member 222 is configured to be attached to the bicycle frame 202. In the illustrated embodiment, the base member 222 is configured to be attached to the front fork 203 (e.g., the second fork arm 203b) of the bicycle frame 202.

Figure 23:
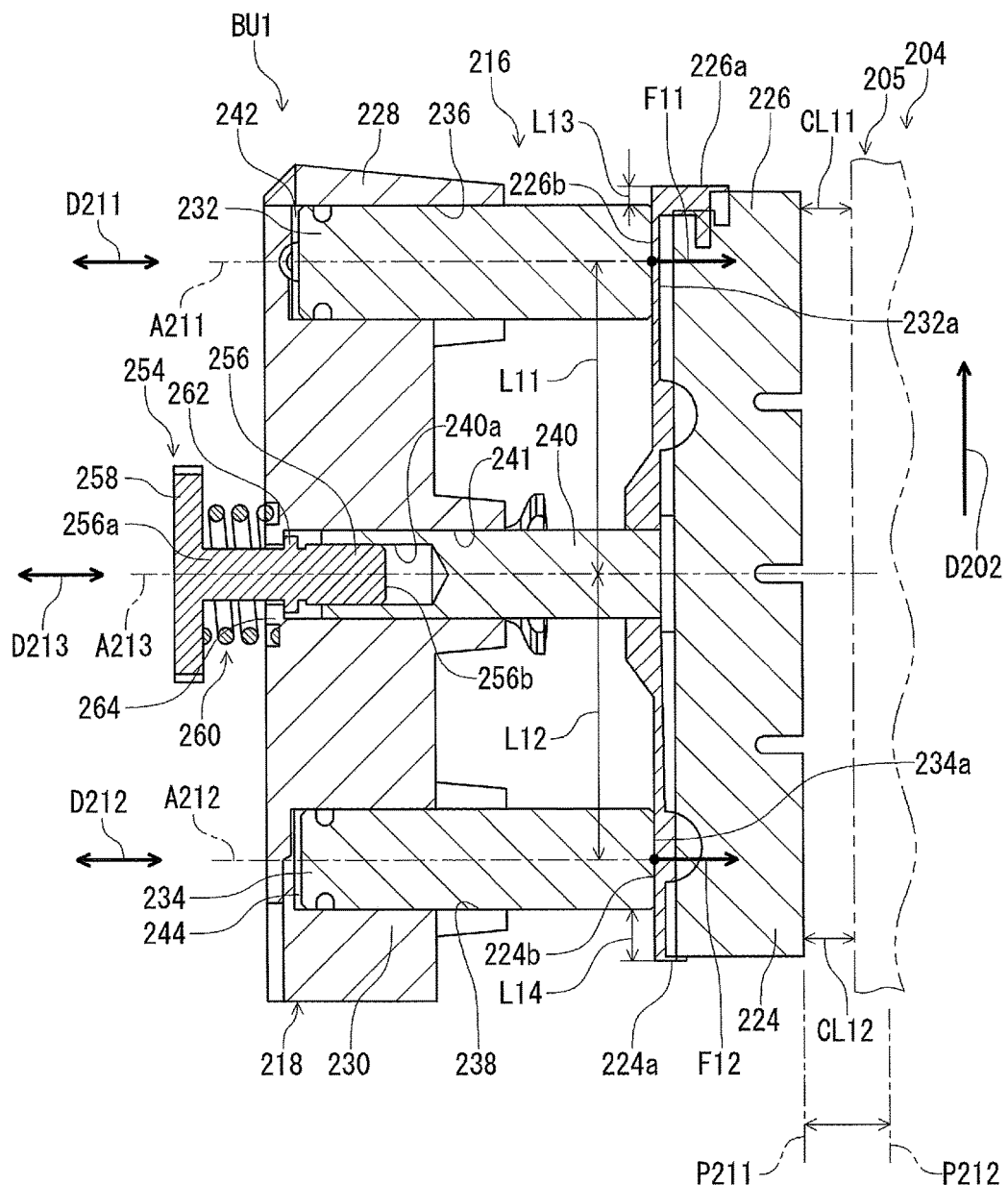
FIG. 23 is a cross-sectional view of the bicycle brake device illustrated in FIG. 22.

As seen in FIG. 23, the friction member 212 includes an upstream portion 224 and a downstream portion 226. The downstream portion 226 is opposite to the upstream portion 224 in a driving rotational direction D202 in which the bicycle rim 205 rotates when a bicycle forwardly moves.

In the illustrated embodiment, the upstream portion 224 is an upstream half portion of the friction member 212, and the downstream portion 226 is a downstream half portion of the friction member 212.

As seen in FIG. 23, the pushing structure 216 is configured to apply a first pushing force F11 to the downstream portion 226. The pushing structure 216 is configured to apply a second pushing force F12 to the upstream portion 224. The pushing structure 216 is configured to push the friction member 212 against the rotatable member 204 so that the first pushing force F11 is larger than the second pushing force F12.

As seen in FIG. 23, the base member 218 includes a first hydraulic cylinder 228 and a second hydraulic cylinder 230. Namely, the bicycle brake device 210 comprises the base member 218. The first hydraulic cylinder 228 can also be referred to as the hydraulic cylinder 228. The second hydraulic cylinder 230 can also be referred to as the hydraulic cylinder 230. The base member 218 includes the hydraulic cylinder 228 and the hydraulic cylinder 230.

The pushing structure 216 includes a first piston 232 and a second piston 234. The first piston 232 can also be referred to as the piston 232. The second piston 234 can also be referred to as the piston 234. Namely, the bicycle brake device 210 comprises the piston 232 and the piston 234. The pushing structure 216 is configured to apply the first pushing force F11 to the downstream portion 226 via the first piston 232. The pushing structure 216 is configured to apply the second pushing force F12 to the upstream portion 224 via the second piston 234.

As seen in FIG. 23, the first piston 232 is movable in the first hydraulic cylinder 228 and is closer to the downstream portion 226 than the upstream portion 224. The first piston 232 is provided to push the downstream portion 226 to the rotatable member 204. The piston 232 is movable in the hydraulic cylinder 228 in a movement direction D211 so as to move the friction member 212 toward the rotatable member 204. The first hydraulic cylinder 228 includes a first cylinder bore 236 extending in the movement direction D211. The first piston 232 is movably provided in the first cylinder bore 236.

The second piston 234 is movable in the second hydraulic cylinder 230 and is closer to the upstream portion 224 than the downstream portion 226. The second piston 234 is provided to push the upstream portion 224 to the rotatable member 204. The piston 234 is movable in the hydraulic cylinder 230 in a movement direction D212 so as to move the friction member 212 toward the rotatable member 204. The second hydraulic cylinder 230 includes a second cylinder bore 238 extending in the movement direction D212. The second piston 234 is movably provided in the second cylinder bore 238.

As seen in FIG. 23, the bicycle brake device 210 further comprises a support member 240. The support member 240 is movably mounted to the base member 218. The support member 240 is coupled to the friction member 212 to movably support the friction member 212 relative to the base member 218. The support member 240 is provided between the first piston 232 and the second piston 234.

As seen in FIG. 23, the support member 240 is movable relative to the base member 218 in a movement direction D213 parallel to the support center axis A213. Specifically, the base member 218 includes a support hole 241. The support member 240 is movably provided in the support hole 241. The base member 218 is configured to prevent the support member 240 from rotating relative to the base member 218. For example, the support hole 241 includes a guide groove (not shown). The support member 240 includes a follower (not shown) provided in the guide groove. The guide groove and the follower allow the support member 240 to move relative to the base member 218 in the movement direction with preventing the support member 240 from rotating relative to the base member 218.

The first piston 232 includes a first center axis A211. The second piston 234 includes a second center axis A212 parallel to the first center axis A211. The first center axis A211 can also be referred to as the center axis A211. The second center axis A212 can also be referred to as the center axis A212. The support member 240 includes a support center axis A213 parallel to the first and second center axes A211 and A212. A first distance L11 between the first center axis A211 and the support center axis A213 is different from a second distance L12 between the second center axis A212 and the support center axis A213. The first distance L11 is longer than the second distance L12. The first center axis A211, the second center axis A212, and the support center axis A213 can be substantially parallel to each other.

The upstream portion 224 includes an upstream end 224a. The downstream portion 226 includes a downstream end 224b opposite to the upstream end 224a in the driving rotational direction D202. A third distance L13 between the first piston 232 and the downstream end 224b is different from a fourth distance L14 between the second piston 234 and the upstream end 224a. In the illustrated embodiment, the third distance L13 is shorter than the fourth distance L14.

As seen in FIG. 23, the piston 232 is coupled to the friction member 212 without being fixed to the friction member 212. The first piston 232 is configured to push the friction member 212 to the rotatable member 204 without being fixed to the friction member 212. The first piston 232 is in contact with the friction member 212. The piston 234 is coupled to the friction member 212 without being fixed to the friction member 212. The second piston 234 is configured to push the friction member 212 to the rotatable member 204 without being fixed to the friction member 212. The second piston 234 is in contact with the friction member 212.

The downstream portion 226 includes a first receiving surface 226b. The first piston 232 includes a first contact surface 232a contactable with the first receiving surface 226b of the downstream portion 226. The first contact surface 232a is in contact with the first receiving surface 226b when the first piston 232 pushes the downstream portion 226. The upstream portion 224 includes a second receiving surface 224b. The second piston 234 includes a second contact surface 234a contactable with the first receiving surface 226b of the downstream portion 226. The second contact surface 234a is in contact with the second receiving surface 224b when the second piston 234 pushes the upstream portion 224.

Figure 24:
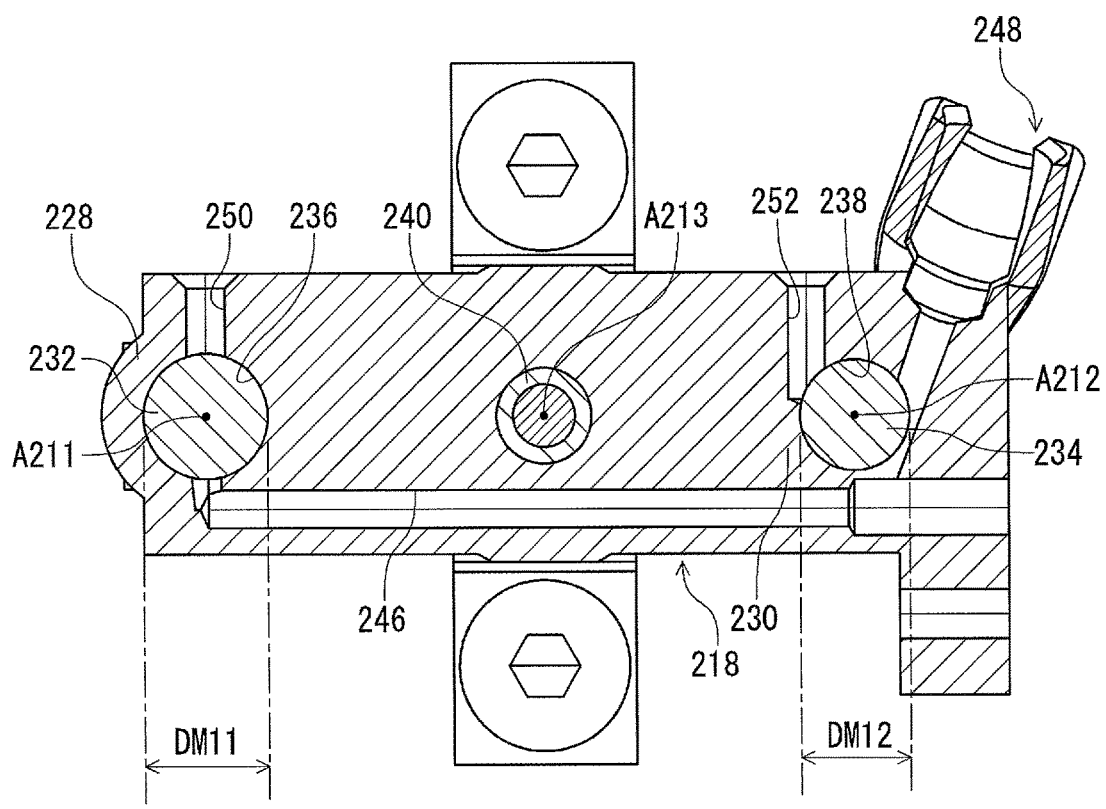
FIG. 24 is a cross-sectional view of the bicycle brake device illustrated in FIG. 22.

As seen in FIG. 24, the first piston 232 has a first diameter DM11. The second piston 234 has a second diameter DM12 different from the first diameter DM11. In the illustrated embodiment, the first diameter DM11 is larger than the second diameter DM12. However, the first diameter DM11 can be equal to or smaller than the second diameter DM12 if needed and/or desired.

In the illustrated embodiment, the first distance L11 is different from the second distance L12, and the first diameter DM11 is different from the second diameter DM12. However, the first distance L11 can be equal to the second distance L12 when the first diameter DM11 is different from the second diameter DM12. Furthermore, the first diameter DM11 can be equal to the second diameter DM12 when the first distance L11 is different from the second distance L12.

As seen in FIG. 23, a first hydraulic chamber 242 is defined by the first hydraulic cylinder 228 and the first piston 232. A second hydraulic chamber 244 is defined by the second hydraulic cylinder 230 and the second piston 234. As seen in FIG. 24, the base member 218 includes a connecting fluid passageway 246 connecting the first hydraulic chamber 242 to the second hydraulic chamber 244. An end of the connecting fluid passageway 246 is plugged with an end plug. The base member 218 includes an inlet port 248. In the illustrated embodiment, the inlet port 248 is connected to the second hydraulic chamber 244. The base member 218 includes a first bleed port 250 and a second bleed port 252. The first bleed port 250 is connected to the first hydraulic chamber 242 (FIG. 23). The second bleed port 252 is connected to the second hydraulic chamber 244 (FIG. 23). For example, a bleed nipple (not shown) is attached to each of the first bleed port 250 and the second bleed port 252.

A pressure supplied to the first hydraulic chamber 242 (FIG. 23) is substantially equal to a pressure supplied to the second hydraulic chamber 244 (FIG. 23). Since the first diameter DM11 is larger than the second diameter DM12 (FIG. 24), the first pushing force F11 is larger than the second pushing force F12 (FIG. 23). For example, the first pushing force F11 is set within the range from approximately 150% to approximately 200% of the second pushing force F12. The first and second distances L11 and L12 and/or the first and second diameters DM11 and DM12 of the first and second pistons 232 and 234 are set so that the first pushing force F11 is within the range from approximately 150% to approximately 200% of the second pushing force F12.

Figure 25:
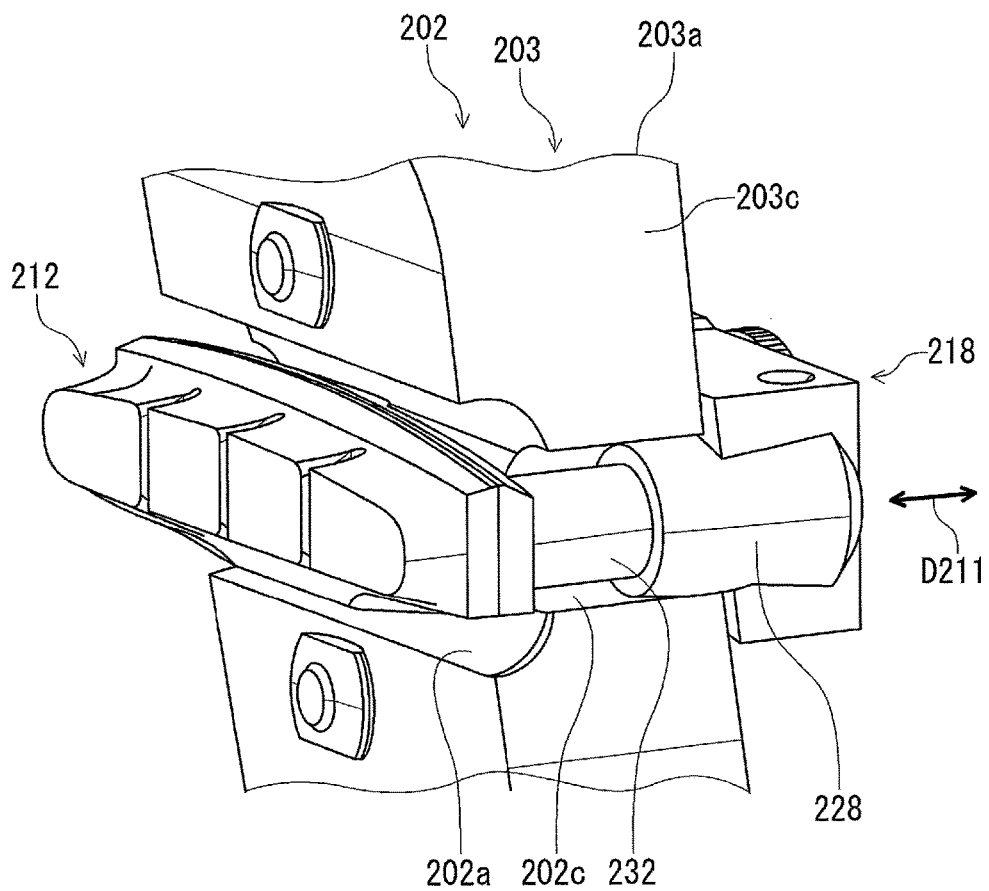
FIG. 25 is a partial perspective view of the bicycle frame provided with the bicycle brake device illustrated in FIG. 22.

As seen in FIG. 25, the first piston 232 is at least partially provided in a first recess 202c of the bicycle frame 202. The first hydraulic cylinder 228 is at least partially provided in the first recess 202c of the bicycle frame 202. In the illustrated embodiment, the first piston 232 is partially provided in the first recess 202c of the bicycle frame 202. The first hydraulic cylinder 228 is partially provided in the first recess 202c of the bicycle frame 202. The first recess 202c is provided on a front surface 203c of the first fork arm 203a of the front fork 3 and extends in the movement direction D211 of the first piston 232.

Figure 26:
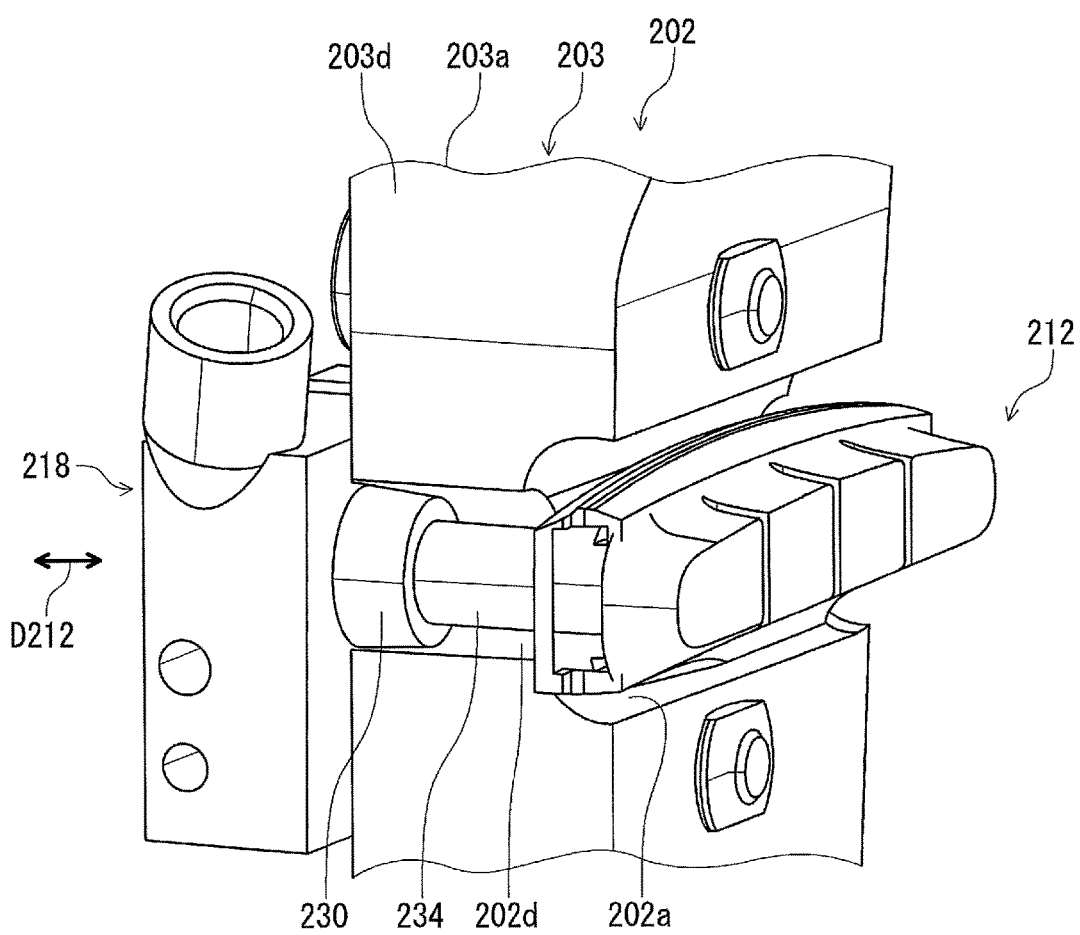
FIG. 26 is a partial perspective view of the bicycle frame provided with the bicycle brake device illustrated in FIG. 22.

As seen in FIG. 26, the second piston 234 is at least partially provided in a second recess 202d of the bicycle frame 202. The second hydraulic cylinder 230 is at least partially provided in the second recess 202d of the bicycle frame 202. In the illustrated embodiment, the second piston 234 is partially provided in the second recess 202d of the bicycle frame 202. The second hydraulic cylinder 230 is partially provided in the second recess 202d of the bicycle frame 202. The second recess 202d is provided on a rear surface 203d of the first fork arm 203a of the front fork 3 and extends in the movement direction D212 of the second piston 234.

As seen in FIG. 23, the bicycle brake device 210 further comprises a clearance adjustment member 254 configured to adjust a rest position P211 of the friction member 212 relative to the hydraulic cylinder 228. The clearance adjustment member 254 is configured to adjust a relative position between the support member 240 and the base member 218. The support member 240 includes a threaded hole 240a. The clearance adjustment member 254 is rotatable relative to the base member 218. In the illustrated embodiment, the clearance adjustment member 254 is rotatable relative to the base member 218 and the support member 240 about the support rotational axis A213. The clearance adjustment member 254 includes a thread bolt 256. The thread bolt 256 is threadedly provided in the threaded hole 240a so that rotation of the clearance adjustment member 254 relative to the base member 218 changes the relative position between the support member 240 and the base member 218.

The clearance adjustment member 254 includes an operating portion 258 configured to be operated by the user to adjust the rest position P11 of the friction member 212. In the illustrated embodiment, the operating portion 258 has a disk shape such that the operating portion 258 can be operated without any tools. In other words, the adjustment member 254 is configured as a tool-less adjustment member. The thread bolt 256 includes a first end 256a and a second end 256b opposite to the first end 256a. The operating portion 258 is provided at the first end 256a of the thread bolt 256.

As seen in FIG. 23, the bicycle brake device 210 further comprises an adjustment biasing member 260 configured to bias the friction member 212 from the braking position P212 toward the rest position P211 via the clearance adjustment member 254 and the support member 240. In the illustrated embodiment, the adjustment biasing member 260 is provided between the base member 218 and the operating portion 258 of the clearance adjustment member 254. The adjustment basing member 260 is configured to bias the clearance adjustment member 254 so that the operating portion 258 moves away from the base member 218. The clearance adjustment member 254 includes a flange 262 contactable with the base member 218. The flange 262 radially extends from the thread bolt 256 and is provided in the support hole 241. The base member 218 includes a stopper 264 contactable with the flange 262. The flange 262 is pushed against the stopper 264 by a biasing force of the adjustment biasing member 254. This can position the friction member 212 at the rest position P211.

Figure 27:
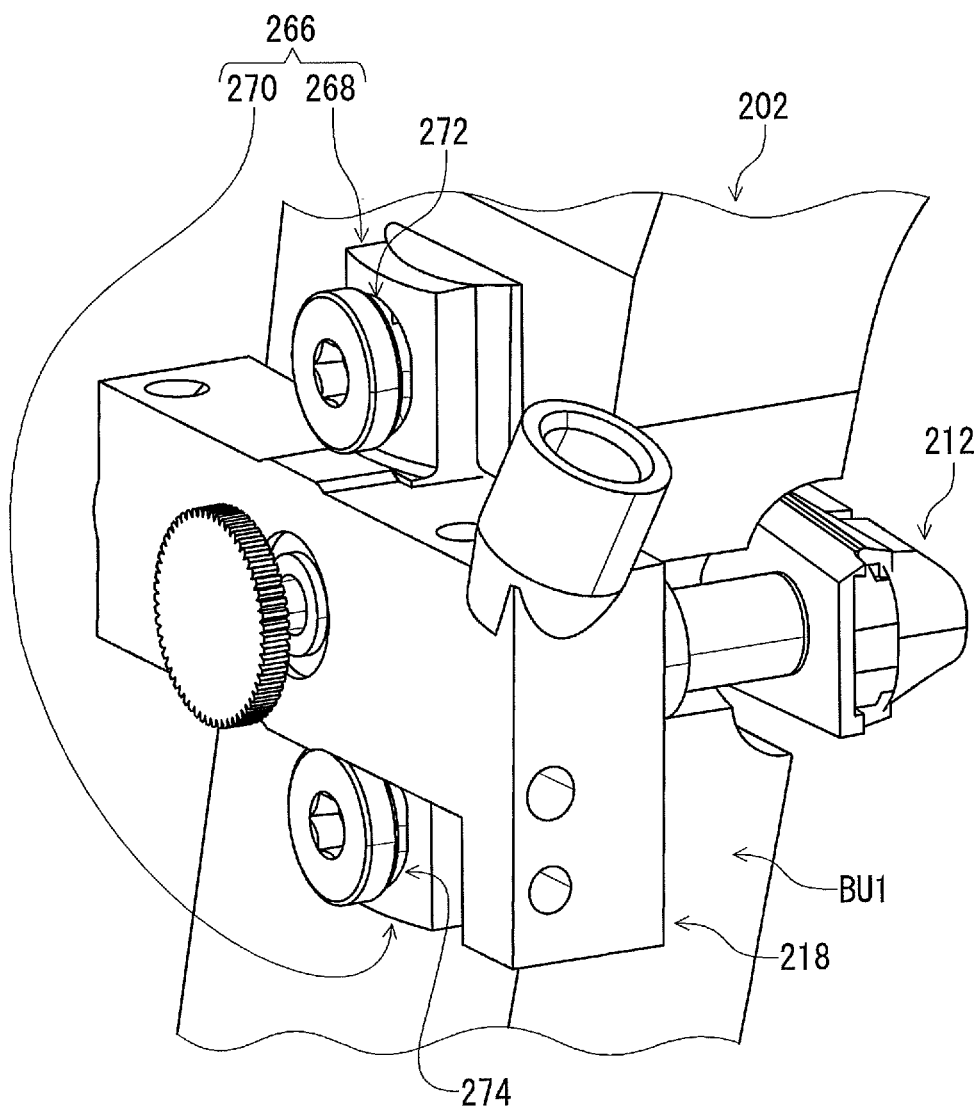
FIG. 27 is a partial perspective view of the bicycle frame provided with the bicycle brake device illustrated in FIG. 22.

As seen in FIG. 27, the base member 218 includes a securing portion 266 configured to be attached to the bicycle frame 202 so that an orientation of the friction member 212 is adjustable relative to the bicycle frame 202. In the illustrated embodiment, the securing portion 266 includes a first securing part 268 and a second securing part 270. The first securing part 268 is mounted to the base member 218 and extends from the base member 218. The second securing part 270 is mounted to the base member 218 and extends from the base member 218. The second securing part 270 is opposite to the first securing part 268.

The bicycle brake device 210 further comprises a first adjustment bolt 272 and a second adjustment bolt 274. The first adjustment bolt 272 is configured to couple the first securing part 268 to the bicycle frame 202. The second adjustment bolt 274 is configured to couple the second securing part 270 to the bicycle frame 202.

As seen in FIG. 23, a first clearance CL11 is defined between the downstream portion 226 and the rotatable member 204 in a rest state where the friction member 212 is disposed without being pushed by the pushing structure 216. A second clearance CL12 is defined between the upstream portion 224 and the rotatable member 204 in the rest state. In the illustrated embodiment, the friction member 212 is disposed at the rest position P211 in the rest state.

Figure 28:
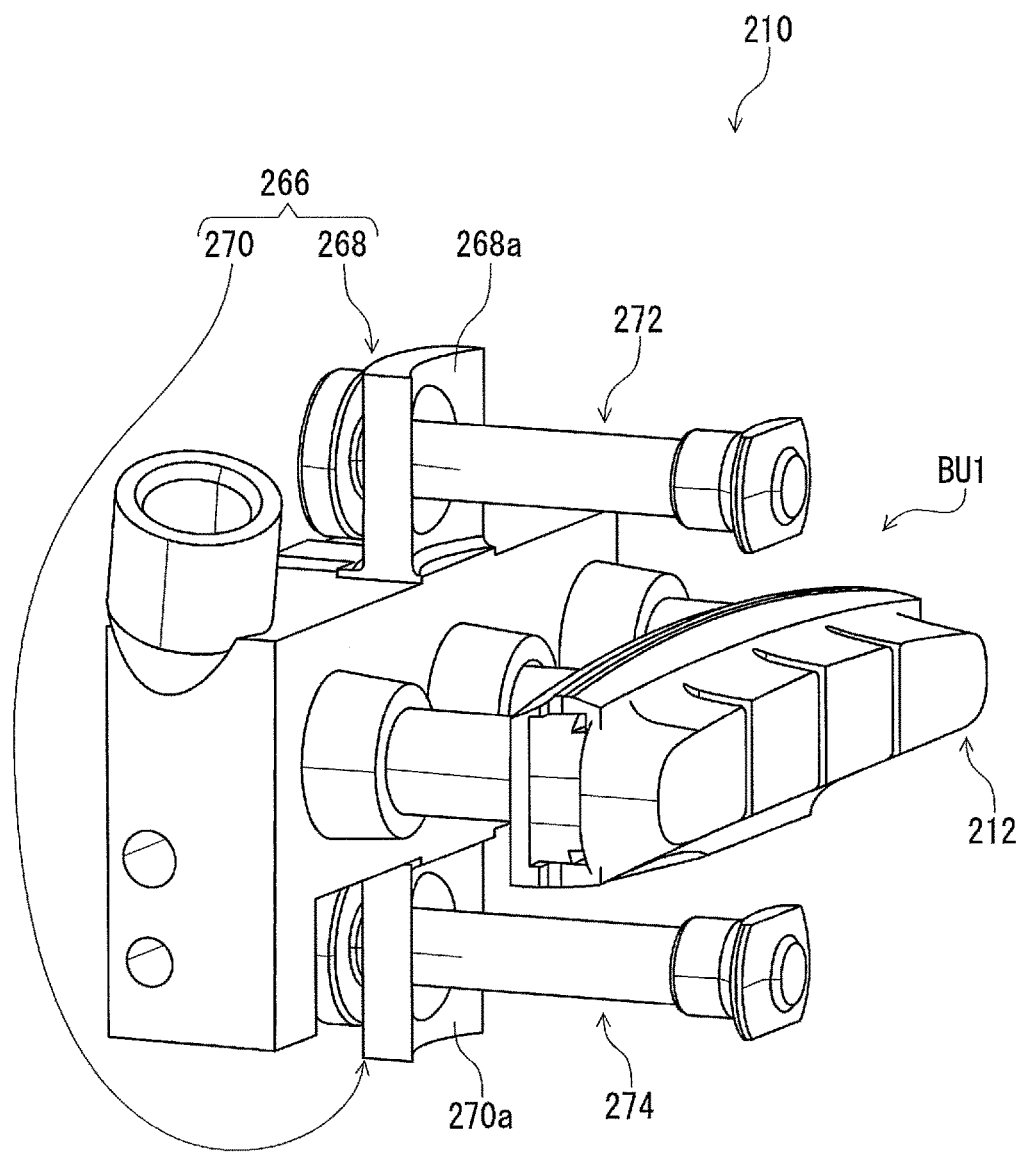
FIG. 28 is a perspective view of the bicycle brake device illustrated in FIG. 22.

As seen in FIG. 28, the securing portion 266 includes a curved surface contactable with the bicycle frame 202 so that at least one of the first clearance CL11 and the second clearance CL12 are changed. In the illustrated embodiment, the first securing part 268 includes a first curved surface 268a contactable with the bicycle frame 202 so that at least one of the first clearance CL11 and the second clearance CL12 are changed. The second securing part 270 includes a second curved surface 270a contactable with the bicycle frame 202 so that at least one of the first clearance CL11 and the second clearance CL12 are changed. Specifically, the first curved surface 268a is contactable with the bicycle frame 202 so that the first clearance CL11 and the second clearance CL12 are changed. The second curved surface 270a is contactable with the bicycle frame 202 so that the first clearance CL11 and the second clearance CL12 are changed.

Figure 29:
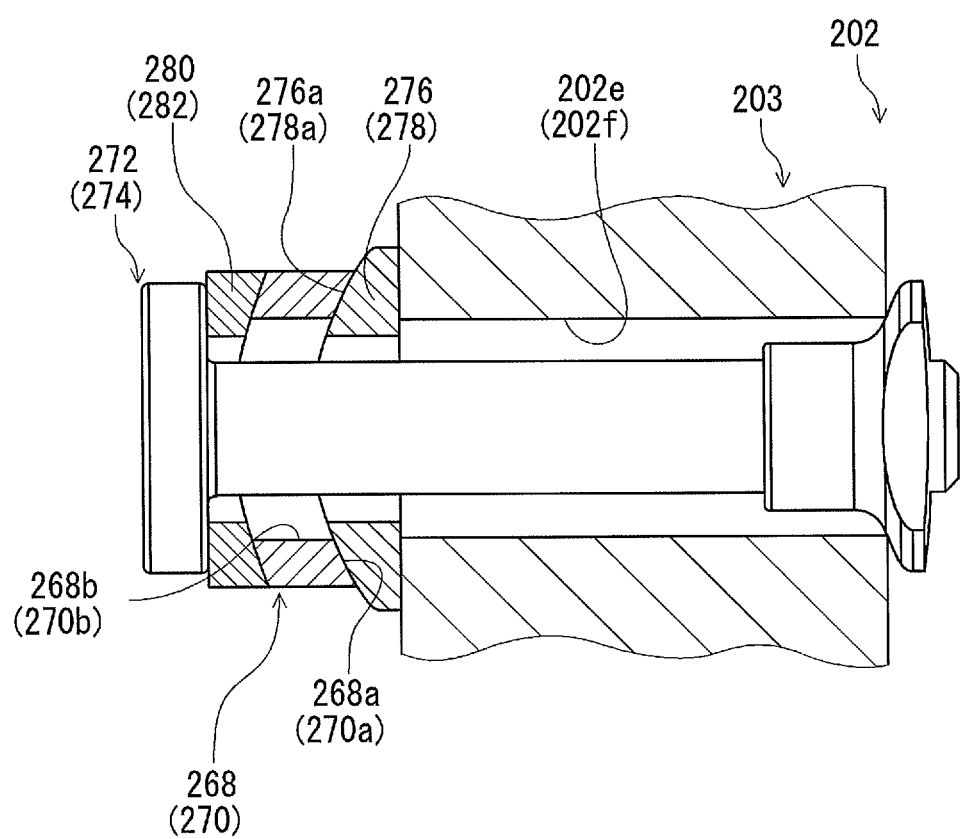
FIG. 29 is a partial cross-sectional view of the bicycle brake device illustrated in FIG. 22.

As seen in FIG. 29, the securing portion 266 includes a first adjustment washer 276 and a second adjustment washer 278. The first adjustment washer 276 includes a first curved receiving surface 276a contactable with the first curved surface 268a of the first securing part 268. The second adjustment washer 278 includes a second curved receiving surface 278a contactable with the second curved surface 270a of the second securing part 270. The first curved receiving surface 276a has a complementary shape relative to the first curved surface 268a of the first securing part 268. The second curved receiving surface 278a has a complementary shape relative to the second curved surface 270a of the second securing part 270.

The first securing part 268 includes a first opening 268b. The second securing part 270 includes a second opening 270b. The bicycle frame 202 includes a first through-hole 202e and a second through-hole 202f. The first adjustment bolt 272 extends through the first opening 268b and the first through-hole 202e. The second adjustment bolt 274 extends through the second opening 270b and the second through-hole 202f.

The securing portion 266 further includes a first sub washer 280 and a second sub washer 282. The first sub washer 280 is provided between the first securing part 268 and a first head part 272a of the first adjustment bolt 272.

The second sub washer 282 is provided between the second securing part 270 and a second head part 274a of the second adjustment bolt 274. The first adjustment washer 276 and the first sub washer 280 can keep an orientation of the first adjustment bolt 272 relative to the bicycle frame 202 regardless of an orientation of the base member 218 (FIG. 27). The second adjustment washer 278 and the second sub washer 282 can keep an orientation of the second adjustment bolt 274 relative to the bicycle frame 202 regardless of the orientation of the base member 218 (FIG. 27).

Figure 30:
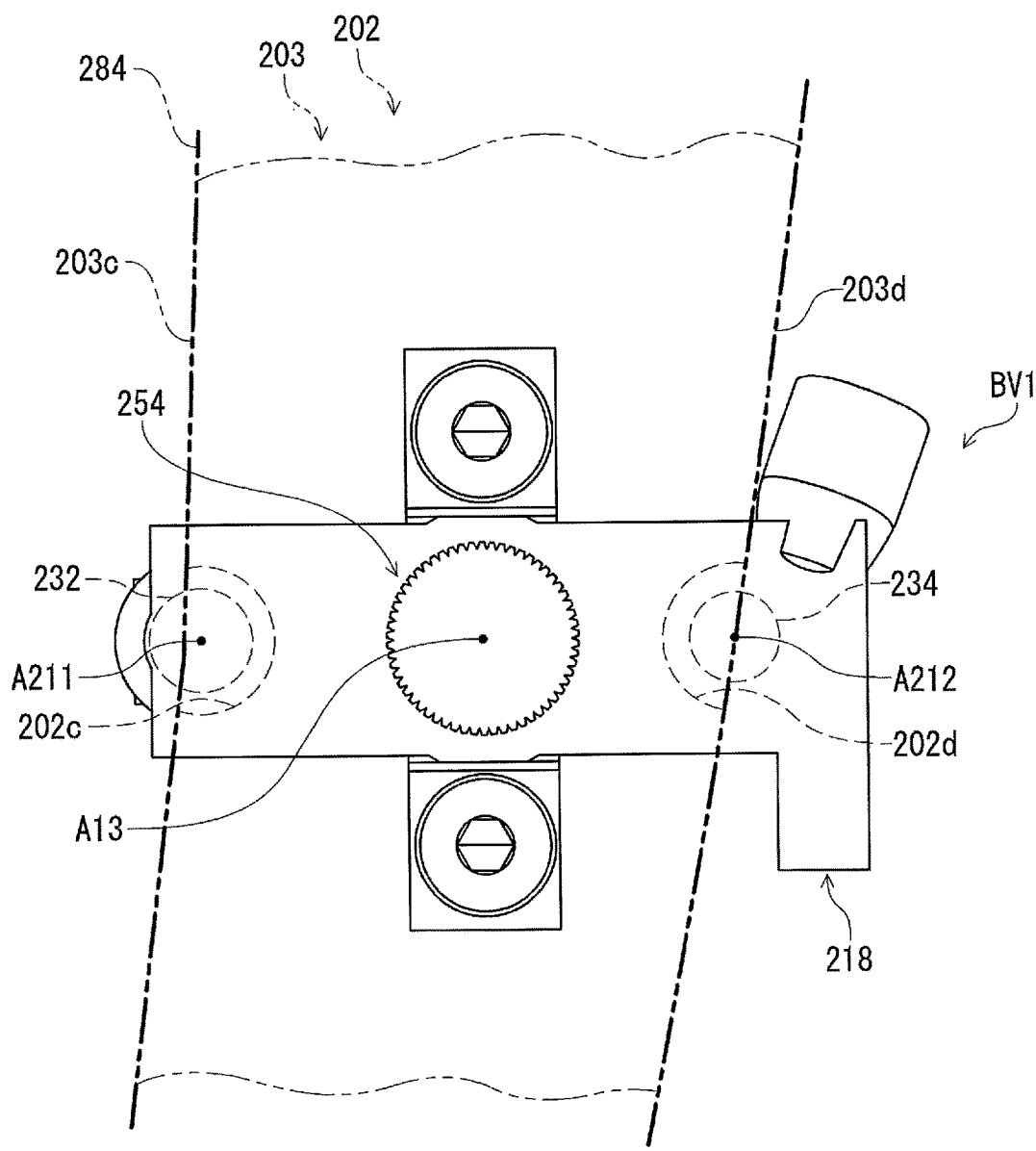
FIG. 30 is a side elevational view of the bicycle frame provided with the bicycle brake device illustrated in FIG. 22.

As seen in FIG. 30, the piston 232 is at least partially provided in a frame area 284 defined by an outline of the bicycle frame 202 when viewed from the movement direction D211 (FIG. 23) in an attachment state where the base member 218 is attached to the bicycle frame 202. The frame area 284 is defined by an outline of the front fork 203 of the bicycle frame 202 when viewed from the movement direction D211 (FIG. 23) in the attachment state.

In the illustrated embodiment, the frame area 284 is defined by the outline of the front fork 203 of the bicycle frame 202 without an opening such as the first recess 202c and the second recess 202c. In FIG. 30, for example, the frame area 284 is defined by the front surface 203c and the rear surface 203d of the first fork arm 203a of the front fork 3 so that the first recess 202c and the second recess 202d are supplemented by the front surface 203c and the rear surface 203d.

As seen in FIG. 30, the piston 232 is partially provided in the frame area 284 defined by the outline of the bicycle frame 202 when viewed from the movement direction D211 in the attachment state. However, the piston 232 can be entirely provided in the frame area 284 when viewed from the movement direction D211 in the attachment state. The center axis A211 is arranged in the frame area 284 when viewed from the movement direction D211 in the attachment state.

As seen in FIG. 30, the piston 234 is at least partially provided in the frame area 284 defined by the outline of the bicycle frame 202 when viewed from the movement direction D212 (FIG. 23) in an attachment state where the base member 218 is attached to the bicycle frame 202. The piston 234 is partially provided in the frame area 284 defined by the outline of the bicycle frame 202 when viewed from the movement direction D212 in the attachment state. However, the piston 234 can be entirely provided in the frame area 284 when viewed from the movement direction D211 in the attachment state. The center axis A212 is arranged in the frame area 284 when viewed from the movement direction D212 in the attachment state.

As seen in FIG. 30, the operating portion 258 is at least partially provided in the frame area 284 when viewed from the movement direction D213 (FIG. 23) in the attachment state. In the illustrated embodiment, the operating portion 258 is entirely provided in the frame area 284 when viewed from the movement direction D213 in the attachment state. However, the operating portion 258 can be partially provided in the frame area 284 when viewed from the movement direction D213 in the attachment state.

Figure 31:
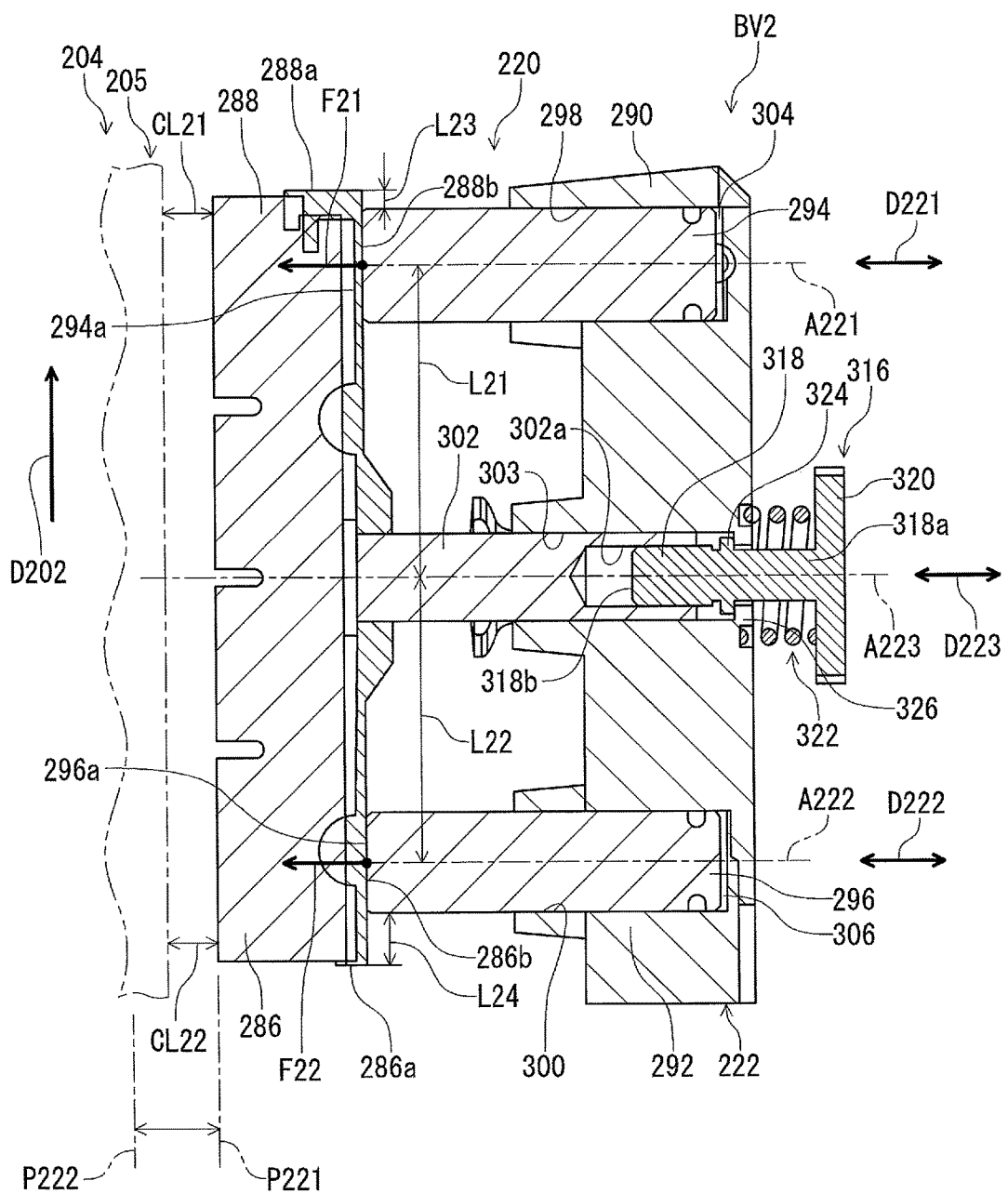
FIG. 31 is a cross-sectional view of the bicycle brake device illustrated in FIG. 22.

As seen in FIG. 31, the friction member 214 includes an upstream portion 286 and a downstream portion 288. The downstream portion 288 is opposite to the upstream portion 286 in a driving rotational direction D202 in which the bicycle rim 205 rotates when a bicycle forwardly moves.

In the illustrated embodiment, the upstream portion 286 is an upstream half portion of the friction member 214, and the downstream portion 288 is a downstream half portion of the friction member 214.

As seen in FIG. 31, the pushing structure 220 is configured to apply a first pushing force F21 to the downstream portion 288. The pushing structure 220 is configured to apply a second pushing force F22 to the upstream portion 286. The pushing structure 220 is configured to push the friction member 214 against the rotatable member 204 so that the first pushing force F21 is larger than the second pushing force F22.

As seen in FIG. 31, the base member 222 includes a first hydraulic cylinder 290 and a second hydraulic cylinder 292. Namely, the bicycle brake device 210 comprises the base member 222. The first hydraulic cylinder 290 can also be referred to as the hydraulic cylinder 290. The second hydraulic cylinder 292 can also be referred to as the hydraulic cylinder 292. The base member 222 includes the hydraulic cylinder 290 and the hydraulic cylinder 292.

The pushing structure 220 includes a first piston 294 and a second piston 296. The first piston 294 can also be referred to as the piston 294. The second piston 296 can also be referred to as the piston 296. Namely, the bicycle brake device 210 comprises the piston 294 and the piston 296. The pushing structure 220 is configured to apply the first pushing force F21 to the downstream portion 288 via the first piston 294. The pushing structure 220 is configured to apply the second pushing force F22 to the upstream portion 286 via the second piston 296.

As seen in FIG. 31, the first piston 294 is movable in the first hydraulic cylinder 290 and is closer to the downstream portion 288 than the upstream portion 286. The first piston 294 is provided to push the downstream portion 288 to the rotatable member 204. The piston 294 is movable in the hydraulic cylinder 290 in a movement direction D221 so as to move the friction member 214 toward the rotatable member 204. The first hydraulic cylinder 290 includes a first cylinder bore 298 extending in the movement direction D221. The first piston 294 is movably provided in the first cylinder bore 298.

The second piston 296 is movable in the second hydraulic cylinder 292 and is closer to the upstream portion 286 than the downstream portion 288. The second piston 296 is provided to push the upstream portion 286 to the rotatable member 204. The piston 296 is movable in the hydraulic cylinder 292 in a movement direction D222 so as to move the friction member 214 toward the rotatable member 204. The second hydraulic cylinder 292 includes a second cylinder bore 300 extending in the movement direction D222. The second piston 296 is movably provided in the second cylinder bore 300.

As seen in FIG. 31, the bicycle brake device 210 further comprises a support member 302. The support member 302 is movably mounted to the base member 222. The support member 302 is coupled to the friction member 214 to movably support the friction member 214 relative to the base member 222. The support member 302 is provided between the first piston 294 and the second piston 296.

As seen in FIG. 31, the support member 302 is movable relative to the base member 222 in a movement direction D223 parallel to the support center axis A223. Specifically, the base member 222 includes a support hole 303. The support member 302 is movably provided in the support hole 303. The base member 222 is configured to prevent the support member 302 from rotating relative to the base member 222. For example, the support hole 303 includes a guide groove (not shown). The support member 302 includes a follower (not shown) provided in the guide groove. The guide groove and the follower allow the support member 302 to move relative to the base member 222 in the movement direction with preventing the support member 302 from rotating relative to the base member 222.

The first piston 294 includes a first center axis A221. The second piston 296 includes a second center axis A222 parallel to the first center axis A221. The first center axis A221 can also be referred to as the center axis A221. The second center axis A222 can also be referred to as the center axis A222. The support member 302 includes a support center axis A223 parallel to the first and second center axes A221 and A222. A first distance L21 between the first center axis A221 and the support center axis A223 is different from a second distance L22 between the second center axis A222 and the support center axis A223. The first distance L21 is longer than the second distance L22. The first center axis A221, the second center axis A222, and the support center axis A223 can be substantially parallel to each other.

The upstream portion 286 includes an upstream end 286a. The downstream portion 288 includes a downstream end 286b opposite to the upstream end 286a in the driving rotational direction D202. A third distance L23 between the first piston 294 and the downstream end 286b is different from a fourth distance L24 between the second piston 296 and the upstream end 286a. In the illustrated embodiment, the third distance L23 is shorter than the fourth distance L24.

As seen in FIG. 31, the piston 294 is coupled to the friction member 214 without being fixed to the friction member 214. The first piston 294 is configured to push the friction member 214 to the rotatable member 204 without being fixed to the friction member 214. The first piston 294 is in contact with the friction member 214. The piston 296 is coupled to the friction member 214 without being fixed to the friction member 214. The second piston 296 is configured to push the friction member 214 to the rotatable member 204 without being fixed to the friction member 214. The second piston 296 is in contact with the friction member 214.

The downstream portion 288 includes a first receiving surface 288b. The first piston 294 includes a first contact surface 294a contactable with the first receiving surface 288b of the downstream portion 288. The first contact surface 294a is in contact with the first receiving surface 288b when the first piston 294 pushes the downstream portion 288. The upstream portion 286 includes a second receiving surface 286b. The second piston 296 includes a second contact surface 296a contactable with the first receiving surface 288b of the downstream portion 288. The second contact surface 296a is in contact with the second receiving surface 286b when the second piston 296 pushes the upstream portion 286.

Figure 32:
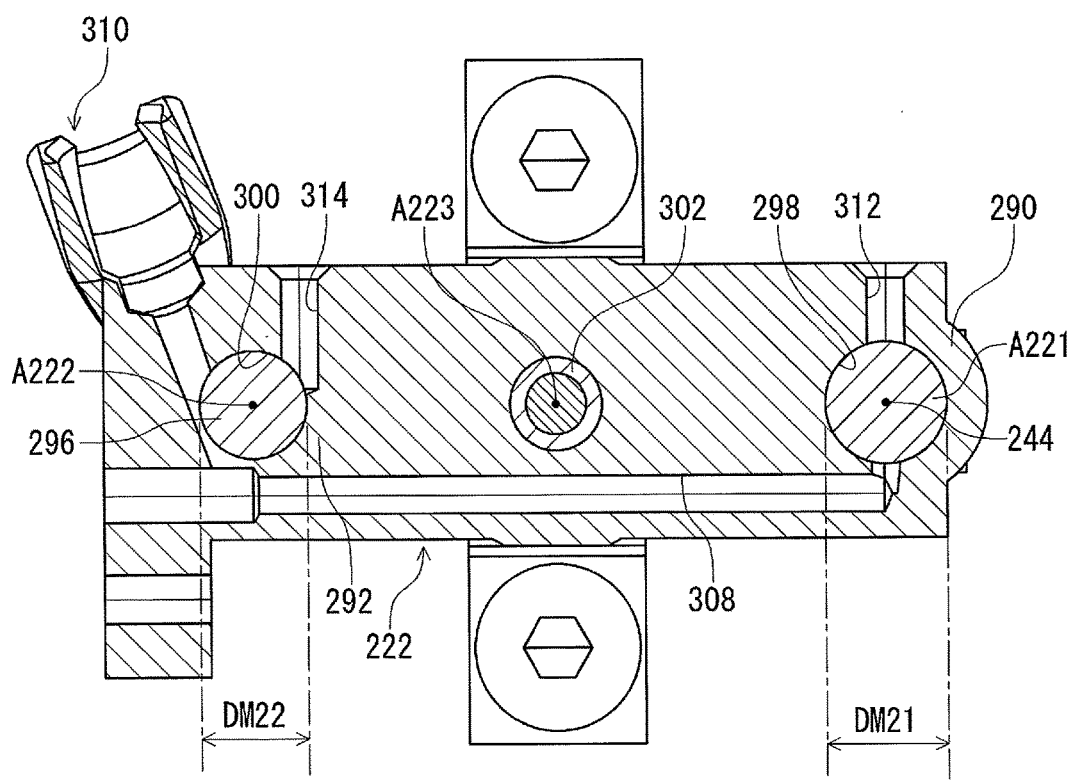
FIG. 32 is a cross-sectional view of the bicycle brake device illustrated in FIG. 22.

As seen in FIG. 32, the first piston 294 has a first diameter DM21. The second piston 296 has a second diameter DM22 different from the first diameter DM21. In the illustrated embodiment, the first diameter DM21 is larger than the second diameter DM22. However, the first diameter DM21 can be equal to or smaller than the second diameter DM22 if needed and/or desired.

In the illustrated embodiment, the first distance L21 is different from the second distance L22, and the first diameter DM21 is different from the second diameter DM22. However, the first distance L21 can be equal to the second distance L22 when the first diameter DM21 is different from the second diameter DM22. Furthermore, the first diameter DM21 can be equal to the second diameter DM22 when the first distance L21 is different from the second distance L22.

As seen in FIG. 31, a first hydraulic chamber 304 is defined by the first hydraulic cylinder 290 and the first piston 294. A second hydraulic chamber 306 is defined by the second hydraulic cylinder 292 and the second piston 296. As seen in FIG. 32, the base member 222 includes a connecting fluid passageway 308 connecting the first hydraulic chamber 304 to the second hydraulic chamber 306. An end of the connecting fluid passageway 308 is plugged with an end plug. The base member 222 includes an inlet port 310. In the illustrated embodiment, the inlet port 310 is connected to the second hydraulic chamber 306. The base member 222 includes a first bleed port 312 and a second bleed port 314. The first bleed port 312 is connected to the first hydraulic chamber 304 (FIG. 31). The second bleed port 314 is connected to the second hydraulic chamber 306 (FIG. 31). For example, a bleed nipple (not shown) is attached to each of the first bleed port 312 and the second bleed port 314.

A pressure supplied to the first hydraulic chamber 304 (FIG. 31) is substantially equal to a pressure supplied to the second hydraulic chamber 306 (FIG. 31). Since the first diameter DM21 is larger than the second diameter DM22 (FIG. 32), the first pushing force F21 is larger than the second pushing force F22 (FIG. 31). For example, the first pushing force F21 is set within the range from approximately 150% to approximately 200% of the second pushing force F22. The first and second distances L21 and L22 and/or the first and second diameters DM21 and DM22 of the first and second pistons 294 and 296 are set so that the first pushing force F21 is within the range from approximately 150% to approximately 200% of the second pushing force F22.

Figure 33:
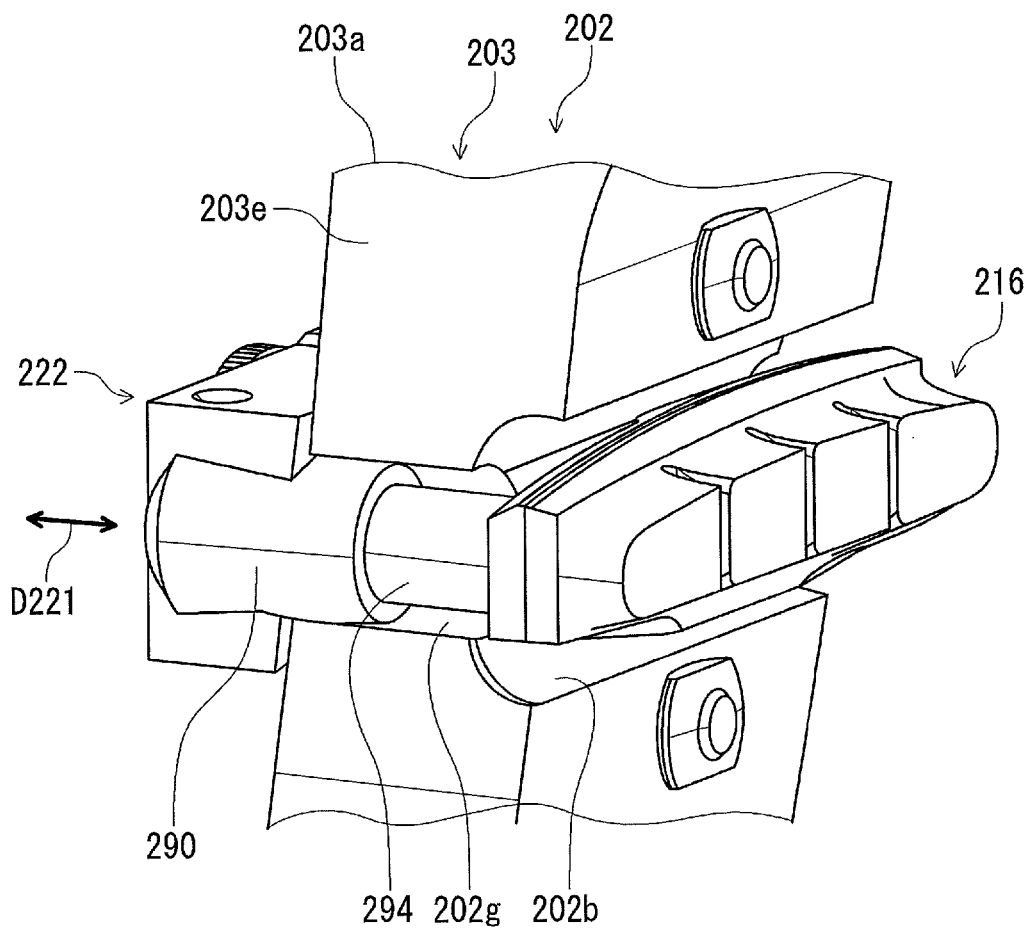
FIG. 33 is a partial perspective view of the bicycle frame provided with the bicycle brake device illustrated in FIG. 22.

As seen in FIG. 33, the first piston 294 is at least partially provided in a first recess 202g of the bicycle frame 202. The first hydraulic cylinder 290 is at least partially provided in the first recess 202g of the bicycle frame 202. In the illustrated embodiment, the first piston 294 is partially provided in the first recess 202g of the bicycle frame 202. The first hydraulic cylinder 290 is partially provided in the first recess 202g of the bicycle frame 202. The first recess 202g is provided on a front surface 203e of the first fork arm 203a of the front fork 3 and extends in the movement direction D221 of the first piston 294.

Figure 34:
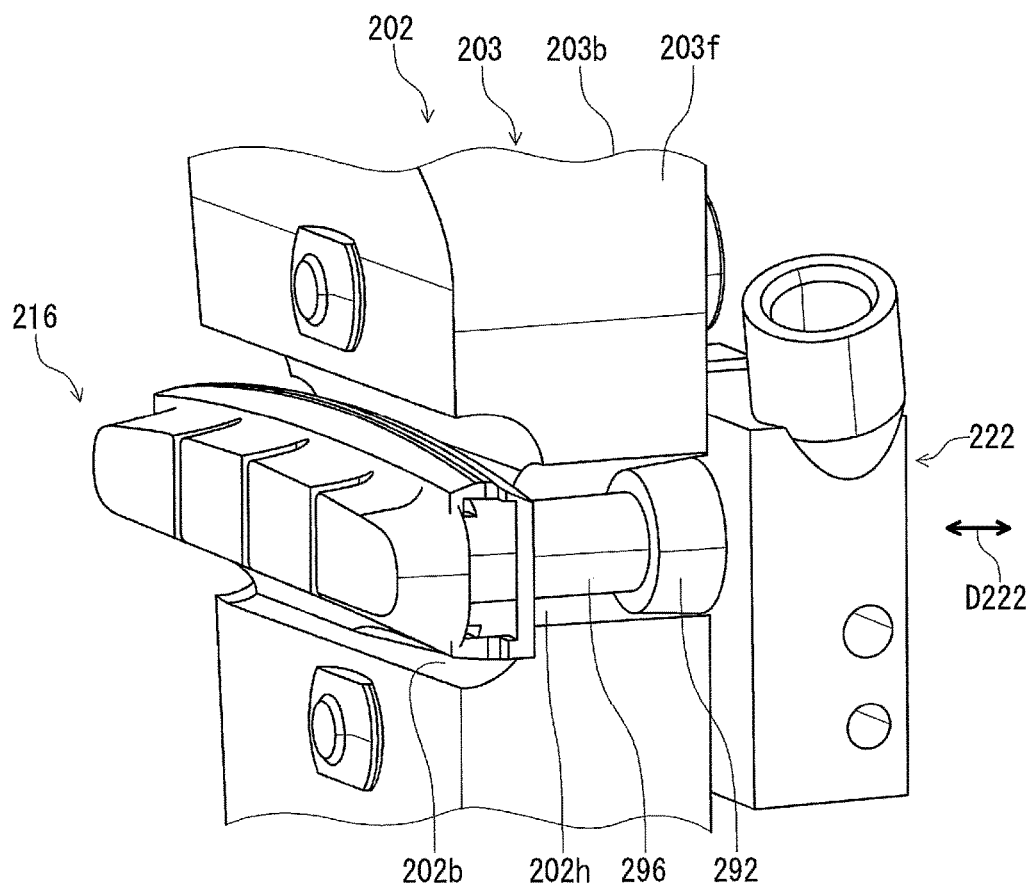
FIG. 34 is a partial perspective view of the bicycle frame provided with the bicycle brake device illustrated in FIG. 22.

As seen in FIG. 34, the second piston 296 is at least partially provided in a second recess 202h of the bicycle frame 202. The second hydraulic cylinder 292 is at least partially provided in the second recess 202h of the bicycle frame 202. In the illustrated embodiment, the second piston 296 is partially provided in the second recess 202h of the bicycle frame 202. The second hydraulic cylinder 292 is partially provided in the second recess 202h of the bicycle frame 202. The second recess 202h is provided on a rear surface 203f of the first fork arm 203a of the front fork 3 and extends in the movement direction D222 of the second piston 296.

As seen in FIG. 31, the bicycle brake device 210 further comprises a clearance adjustment member 316 configured to adjust a rest position P211 of the friction member 214 relative to the hydraulic cylinder 290. The clearance adjustment member 316 is configured to adjust a relative position between the support member 302 and the base member 222. The support member 302 includes a threaded hole 302a. The clearance adjustment member 316 is rotatable relative to the base member 222. In the illustrated embodiment, the clearance adjustment member 316 is rotatable relative to the base member 222 and the support member 302 about the support rotational axis A223. The clearance adjustment member 316 includes a thread bolt 318. The thread bolt 318 is threadedly provided in the threaded hole 302a so that rotation of the clearance adjustment member 316 relative to the base member 222 changes the relative position between the support member 302 and the base member 222.

The clearance adjustment member 316 includes an operating portion 320 configured to be operated by the user to adjust the rest position P11 of the friction member 214. In the illustrated embodiment, the operating portion 320 has a disk shape such that the operating portion 316 can be operated without any tools. In other words, the adjustment member 320 is configured as a tool-less adjustment member. The thread bolt 318 includes a first end 318a and a second end 318b opposite to the first end 318a. The operating portion 320 is provided at the first end 318a of the thread bolt 318.

As seen in FIG. 31, the bicycle brake device 210 further comprises an adjustment biasing member 322 configured to bias the friction member 214 from the braking position P214 toward the rest position P211 via the clearance adjustment member 316 and the support member 302. In the illustrated embodiment, the adjustment biasing member 322 is provided between the base member 222 and the operating portion 320 of the clearance adjustment member 316. The adjustment basing member 322 is configured to bias the clearance adjustment member 316 so that the operating portion 320 moves away from the base member 222. The clearance adjustment member 316 includes a flange 324 contactable with the base member 222. The flange 324 radially extends from the thread bolt 318 and is provided in the support hole 303. The base member 222 includes a stopper 326 contactable with the flange 324. The flange 324 is pushed against the stopper 326 by a biasing force of the adjustment biasing member 316. This can position the friction member 214 at the rest position P211.

Figure 35:
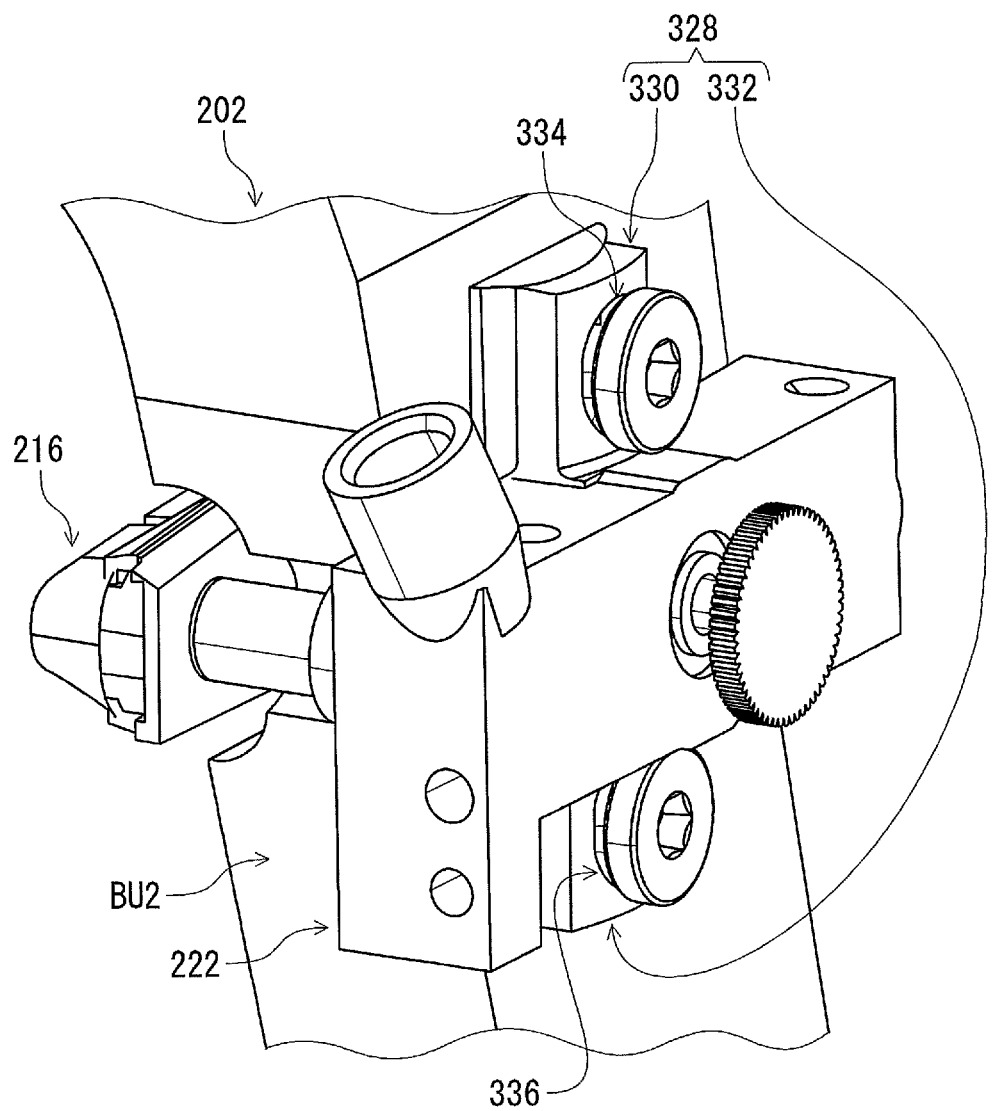
FIG. 35 is a partial perspective view of the bicycle frame provided with the bicycle brake device illustrated in FIG. 22.

As seen in FIG. 35, the base member 222 includes a securing portion 328 configured to be attached to the bicycle frame 202 so that an orientation of the friction member 214 is adjustable relative to the bicycle frame 202. In the illustrated embodiment, the securing portion 328 includes a first securing part 330 and a second securing part 332. The first securing part 330 is mounted to the base member 222 and extends from the base member 222. The second securing part 332 is mounted to the base member 222 and extends from the base member 222. The second securing part 332 is opposite to the first securing part 330.

The bicycle brake device 210 further comprises a first adjustment bolt 334 and a second adjustment bolt 336. The first adjustment bolt 334 is configured to couple the first securing part 330 to the bicycle frame 202. The second adjustment bolt 336 is configured to couple the second securing part 332 to the bicycle frame 202.

As seen in FIG. 31, a first clearance CL21 is defined between the downstream portion 288 and the rotatable member 204 in a rest state where the friction member 214 is disposed without being pushed by the pushing structure 220. A second clearance CL22 is defined between the upstream portion 286 and the rotatable member 204 in the rest state. In the illustrated embodiment, the friction member 214 is disposed at the rest position P211 in the rest state.

Figure 36:
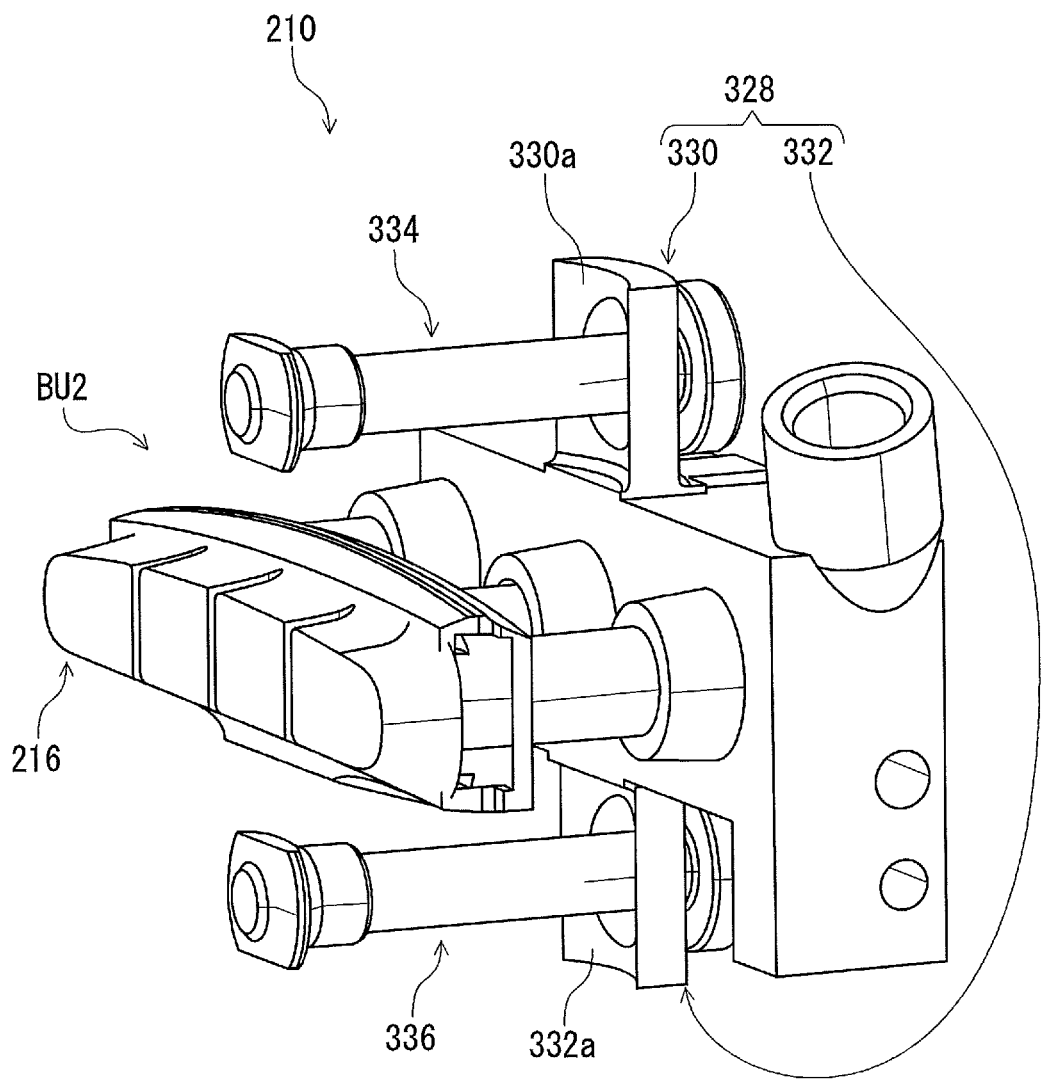
FIG. 36 is a perspective view of the bicycle brake device illustrated in FIG. 22.

As seen in FIG. 36, the securing portion 328 includes a curved surface contactable with the bicycle frame 202 so that at least one of the first clearance CL21 and the second clearance CL22 are changed. In the illustrated embodiment, the first securing part 330 includes a first curved surface 330a contactable with the bicycle frame 202 so that at least one of the first clearance CL21 and the second clearance CL22 are changed. The second securing part 332 includes a second curved surface 332a contactable with the bicycle frame 202 so that at least one of the first clearance CL21 and the second clearance CL22 are changed. Specifically, the first curved surface 330a is contactable with the bicycle frame 202 so that the first clearance CL21 and the second clearance CL22 are changed. The second curved surface 332a is contactable with the bicycle frame 202 so that the first clearance CL21 and the second clearance CL22 are changed.

Figure 37:
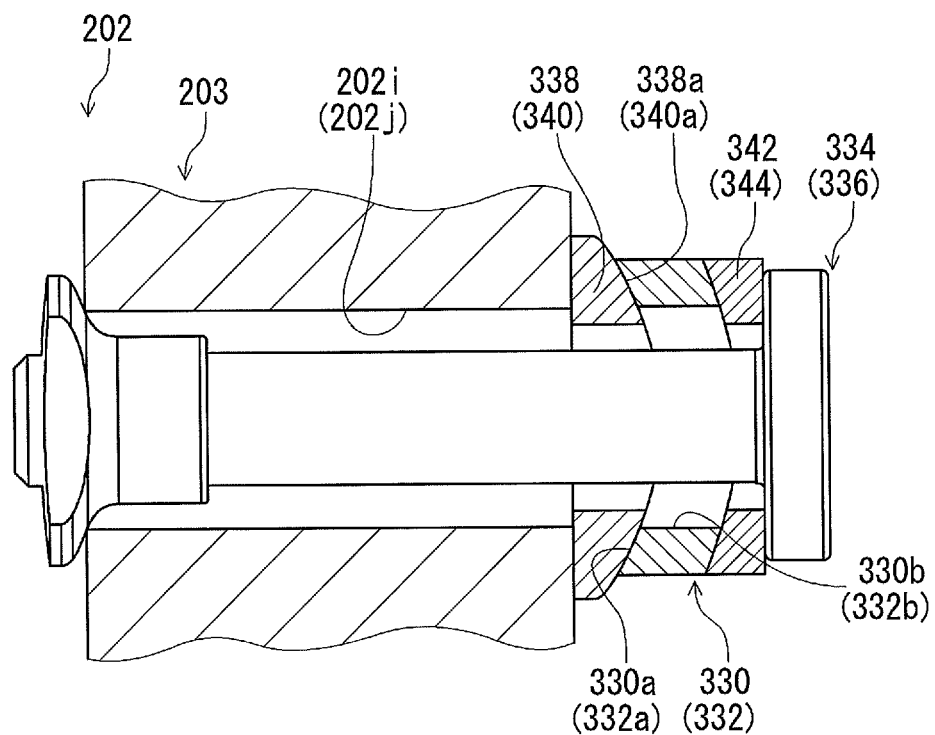
FIG. 37 is a partial cross-sectional view of the bicycle brake device illustrated in FIG. 22.

As seen in FIG. 37, the securing portion 328 includes a first adjustment washer 338 and a second adjustment washer 340. The first adjustment washer 338 includes a first curved receiving surface 338a contactable with the first curved surface 330a of the first securing part 330. The second adjustment washer 340 includes a second curved receiving surface 340a contactable with the second curved surface 332a of the second securing part 332. The first curved receiving surface 338a has a complementary shape relative to the first curved surface 330a of the first securing part 330. The second curved receiving surface 340a has a complementary shape relative to the second curved surface 332a of the second securing part 332.

The first securing part 330 includes a first opening 330b. The second securing part 332 includes a second opening 332b. The bicycle frame 202 includes a first through-hole 202i and a second through-hole 202j. The first adjustment bolt 334 extends through the first opening 330b and the first through-hole 202i. The second adjustment bolt 336 extends through the second opening 332b and the second through-hole 202j.

The securing portion 328 further includes a first sub washer 342 and a second sub washer 344. The first sub washer 342 is provided between the first securing part 330 and a first head part 334a of the first adjustment bolt 334. The second sub washer 344 is provided between the second securing part 332 and a second head part 336a of the second adjustment bolt 336. The first adjustment washer 338 and the first sub washer 342 can keep an orientation of the first adjustment bolt 334 relative to the bicycle frame 202 regardless of an orientation of the base member 222 (FIG. 35). The second adjustment washer 340 and the second sub washer 344 can keep an orientation of the second adjustment bolt 336 relative to the bicycle frame 202 regardless of the orientation of the base member 222 (FIG. 35).

Figure 38:
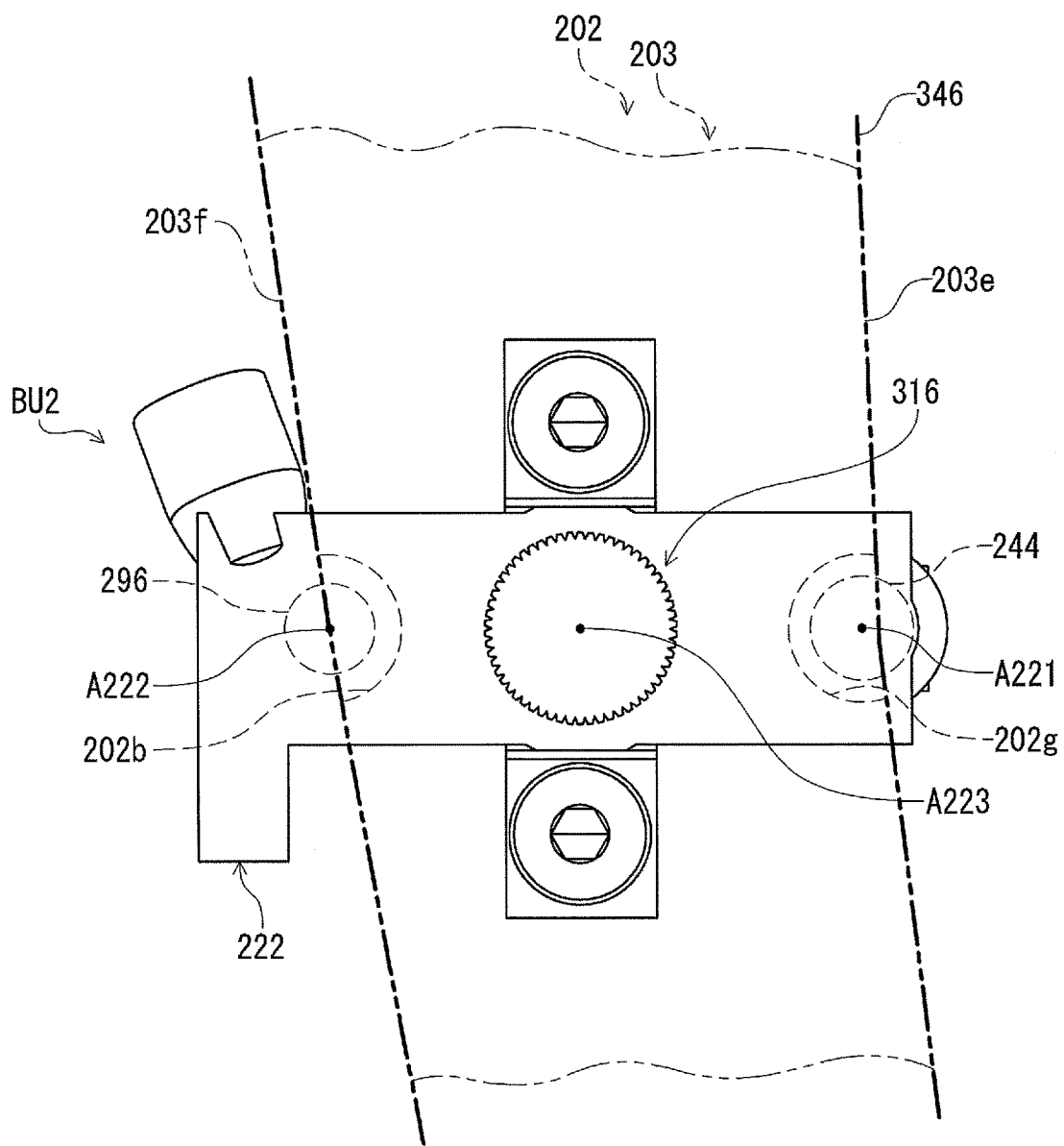
FIG. 38 is a side elevational view of the bicycle frame provided with the bicycle brake device illustrated in FIG. 22.

As seen in FIG. 38, the piston 294 is at least partially provided in a frame area 346 defined by an outline of the bicycle frame 202 when viewed from the movement direction D221 (FIG. 31) in an attachment state where the base member 222 is attached to the bicycle frame 202. The frame area 346 is defined by an outline of the front fork 203 of the bicycle frame 202 when viewed from the movement direction D221 (FIG. 31) in the attachment state.

In the illustrated embodiment, the frame area 346 is defined by the outline of the front fork 203 of the bicycle frame 202 without an opening such as the first recess 202g and the second recess 202g. In FIG. 38, for example, the frame area 346 is defined by the front surface 203e and the rear surface 203f of the first fork arm 203a of the front fork 3 so that the first recess 202g and the second recess 202h are supplemented by the front surface 203e and the rear surface 203f.

As seen in FIG. 38, the piston 294 is partially provided in the frame area 346 defined by the outline of the bicycle frame 202 when viewed from the movement direction D221 in the attachment state. However, the piston 294 can be entirely provided in the frame area 346 when viewed from the movement direction D221 in the attachment state. The center axis A221 is arranged in the frame area 346 when viewed from the movement direction D221 in the attachment state.

As seen in FIG. 38, the piston 296 is at least partially provided in the frame area 346 defined by the outline of the bicycle frame 202 when viewed from the movement direction D222 (FIG. 31) in an attachment state where the base member 222 is attached to the bicycle frame 202. The piston 296 is partially provided in the frame area 346 defined by the outline of the bicycle frame 202 when viewed from the movement direction D222 in the attachment state. However, the piston 296 can be entirely provided in the frame area 346 when viewed from the movement direction D221 in the attachment state. The center axis A222 is arranged in the frame area 346 when viewed from the movement direction D222 in the attachment state.

As seen in FIG. 38, the operating portion 320 is at least partially provided in the frame area 346 when viewed from the movement direction D223 (FIG. 31) in the attachment state. In the illustrated embodiment, the operating portion 320 is entirely provided in the frame area 346 when viewed from the movement direction D223 in the attachment state. However, the operating portion 320 can be partially provided in the frame area 346 when viewed from the movement direction D223 in the attachment state.

Figure 39:
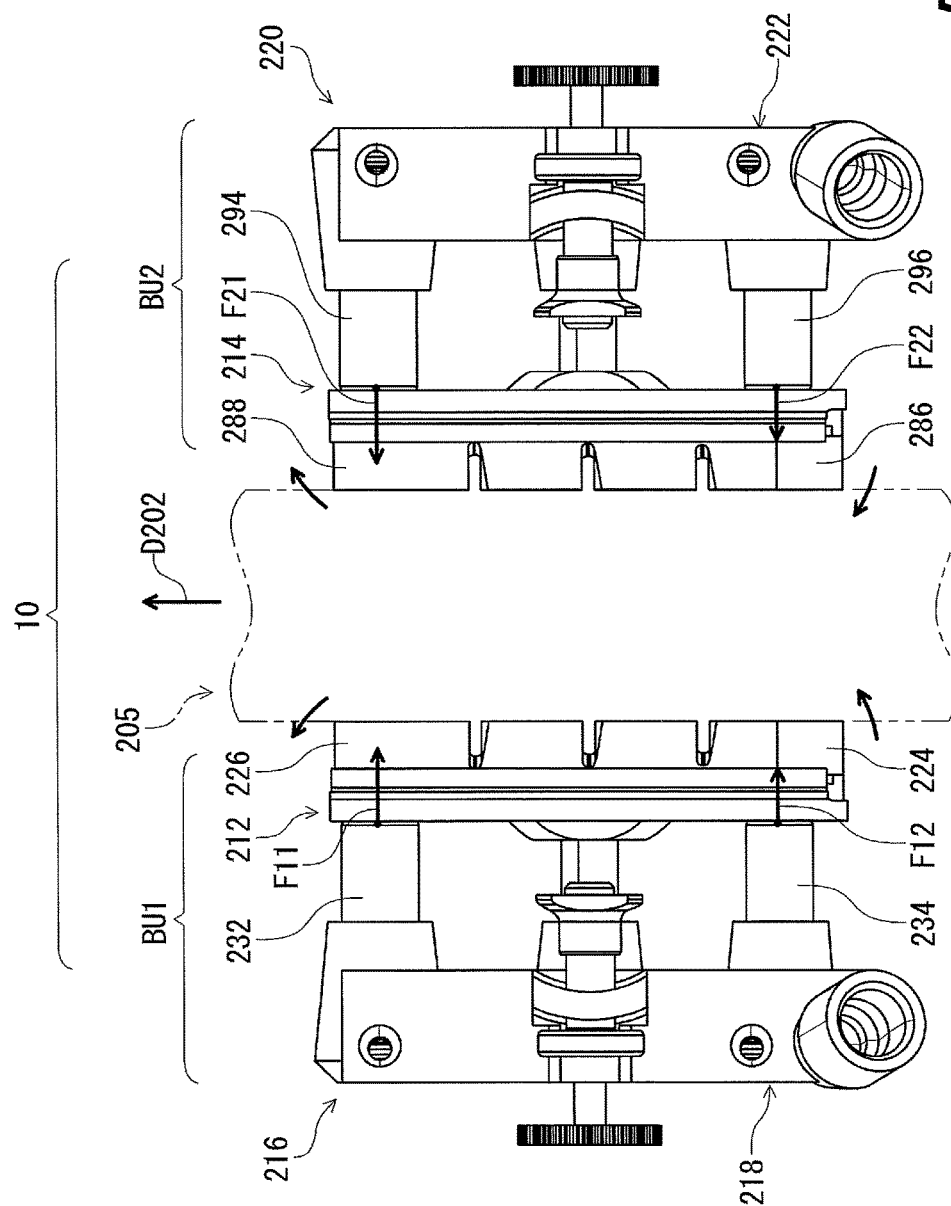
FIG. 39 shows braking operation of the bicycle brake device illustrated in FIG. 22.

As seen in FIG. 39, when the friction member 212 is pushed against the bicycle rim 5 by the pushing structure 216, the upstream portion 224 is likely to be pulled toward the bicycle rim 5 due to a friction force between the upstream portion 224 and the bicycle rim 5. This pivots the friction member 212 relative to the base member 218, causing the downstream portion 226 to move away from the bicycle rim 5.

In the illustrated embodiment, however, since the first pushing force F11 is larger than the second pushing force F12, the pivot of the friction member 212 is reduced. Namely, the pushing structure 216 is configured to push the upstream portion 224 and the downstream portion 226 against the bicycle rim 205 so that a first contact pressure between the downstream portion 226 and the bicycle rim 205 is close to a second contact pressure between the upstream portion 224 and the bicycle rim 205 during braking. The phrase "the first contact pressure is close to the second contact pressure" as used herein means that the first contact pressure is within the range from approximately 50% to approximately 100% of the second contact pressure.

Similarly, as seen in FIG. 39, when the friction member 214 is pushed against the bicycle rim 5 by the pushing structure 220, the upstream portion 286 is likely to be pulled toward the bicycle rim 5 due to a friction force between the upstream portion 286 and the bicycle rim 5. This pivots the friction member 214 relative to the base member 222, causing the downstream portion 288 to move away from the bicycle rim 5.

In the illustrated embodiment, however, since the first pushing force F21 is larger than the second pushing force F22, the pivot of the friction member 214 is reduced. Namely, the pushing structure 220 is configured to push the upstream portion 286 and the downstream portion 288 against the bicycle rim 205 so that a first contact pressure between the downstream portion 288 and the bicycle rim 205 is close to a second contact pressure between the upstream portion 286 and the bicycle rim 205 during braking.

With the bicycle brake device 210, as seen in FIG. 30, the piston 232 is at least partially provided in the frame area 284 defined by the outline of the bicycle frame 202 when viewed from the movement direction D211 in the attachment state where the base member 218 is attached to the bicycle frame 212. Accordingly, it is possible to make the bicycle brake device 210 more compact.

Similarly, as seen in FIG. 30, the piston 234 is at least partially provided in the frame area 284 defined by the outline of the bicycle frame 202 when viewed from the movement direction D212 in the attachment state where the base member 218 is attached to the bicycle frame 202. Accordingly, it is possible to make the bicycle brake device 210 more compact.

As seen in FIG. 38, the piston 294 is at least partially provided in the frame area 346 defined by the outline of the bicycle frame 202 when viewed from the movement direction D221 in the attachment state where the base member 222 is attached to the bicycle frame 202. Accordingly, it is possible to make the bicycle brake device 210 more compact.

Similarly, as seen in FIG. 38, the piston 296 is at least partially provided in the frame area 346 defined by the outline of the bicycle frame 202 when viewed from the movement direction D222 in the attachment state where the base member 222 is attached to the bicycle frame 202. Accordingly, it is possible to make the bicycle brake device 210 more compact.

Third Embodiment

A bicycle brake device 410 in accordance with a third embodiment will be described below referring to FIGS. 40 to 43. The bicycle brake device 410 has substantially the same configuration as the bicycle brake device 210 except for the arrangement of the bicycle brake device 410. Thus, elements having substantially the same function as those in the above embodiments will be numbered the same here, and will not be described and/or illustrated again in detail here for the sake of brevity.

Figure 40:
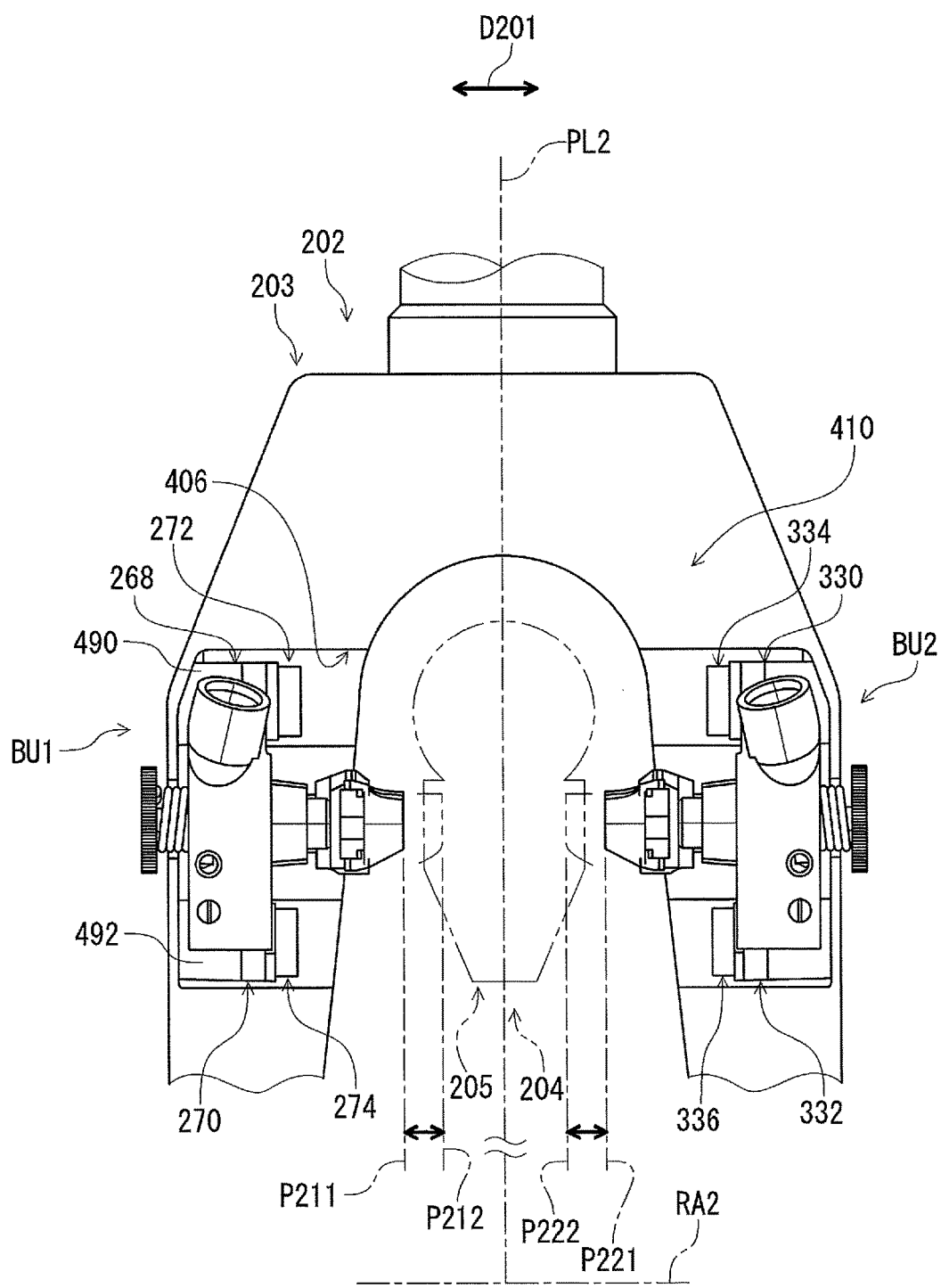
FIG. 40 is a rear elevational view of a bicycle frame provided with a bicycle brake device in accordance with a third embodiment.

As seen in FIG. 40, the bicycle brake device 410 in accordance with a third embodiment is configured to be mounted to the bicycle frame 202. Unlike the bicycle brake device 210, the bicycle brake device 410 is provided in an arrangement recess 406 of the bicycle frame 202.

Figure 41:
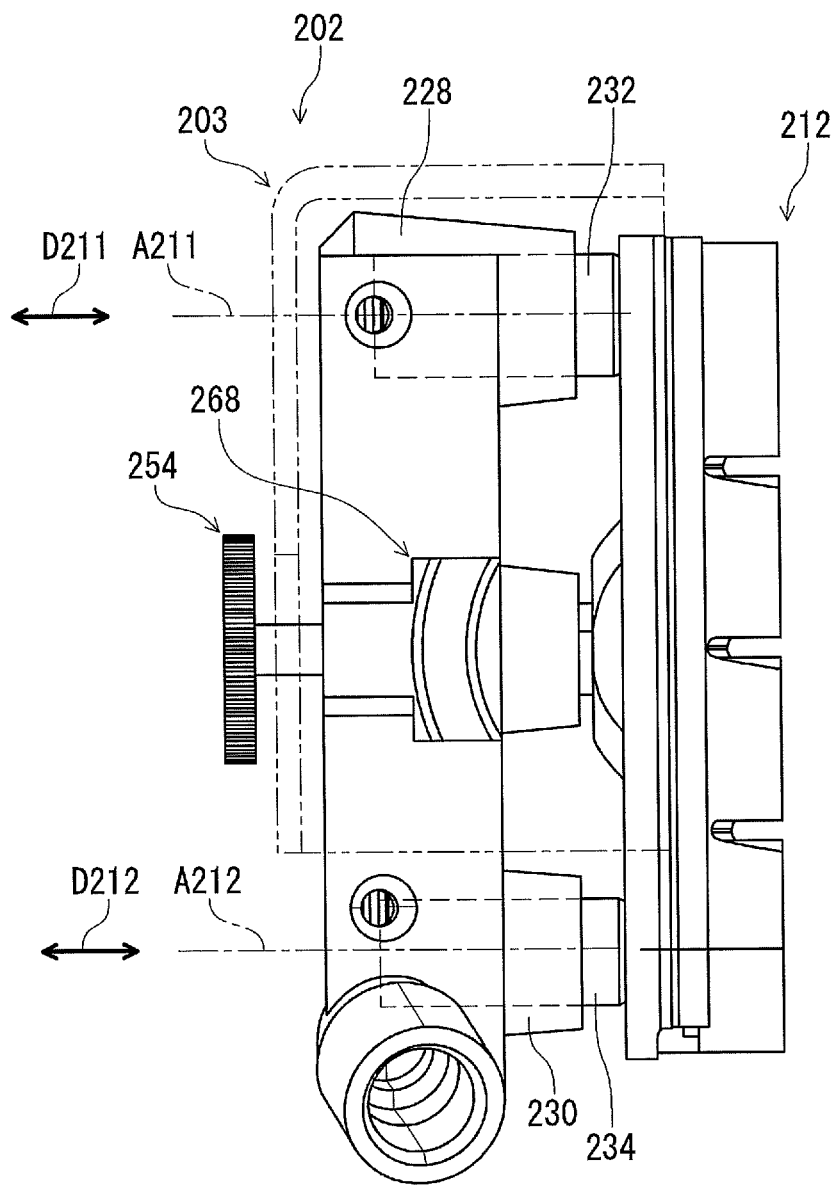
FIG. 41 is a plan elevational view of the bicycle brake device illustrated in FIG. 40.

As seen in FIG. 41, the hydraulic cylinder 228 is at least partially provided between the friction member 212 and the bicycle frame 202 in the movement direction D211 in the attachment state. In the illustrated embodiment, the hydraulic cylinder 228 is entirely provided between the friction member 212 and the bicycle frame 202 in the movement direction D211 in the attachment state. However, the hydraulic cylinder 228 can be partially provided between the friction member 212 and the bicycle frame 202 in the movement direction D211 in the attachment state.

Figure 42:
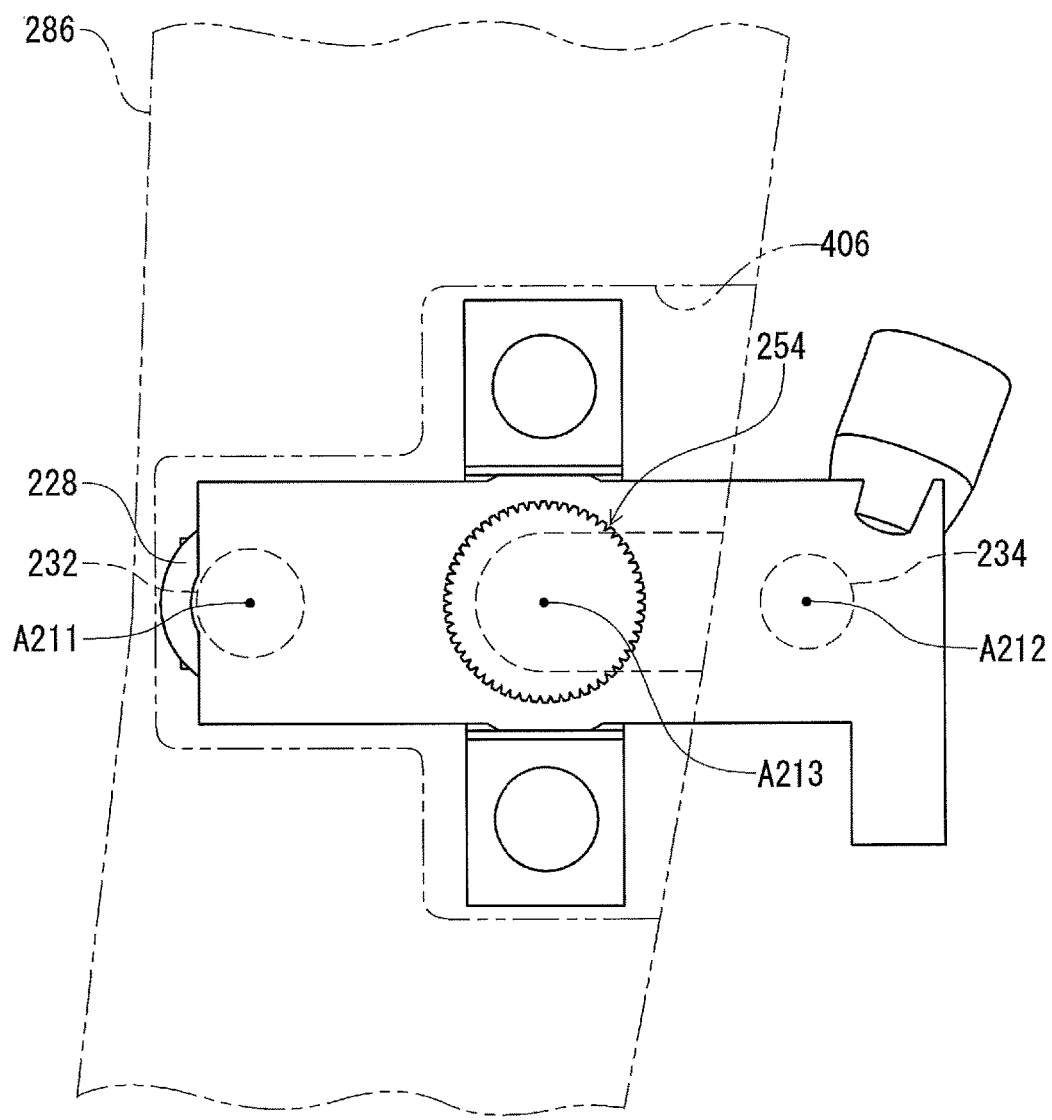
FIG. 42 is a side elevational view of the bicycle frame provided with the bicycle brake device illustrated in FIG. 40.

As seen in FIG. 42, the piston 232 is at least partially provided in the arrangement recess 406 of the bicycle frame 202 in the attachment state. In the illustrated embodiment, the piston 232 is entirely provided in the arrangement recess 406 of the bicycle frame 202 in the attachment state. However, the piston 232 is partially provided in the arrangement recess 406 of the bicycle frame 202 in the attachment state.

The hydraulic cylinder 228 is at least partially provided in the arrangement recess 406 of the bicycle frame 202 in the attachment state. In the illustrated embodiment, the hydraulic cylinder 228 is entirely provided in the arrangement recess 406 of the bicycle frame 202 in the attachment state.

However, the hydraulic cylinder 228 can be partially provided in the arrangement recess 406 of the bicycle frame 202 in the attachment state.

As seen in FIG. 42, the piston 232 is entirely provided in the internal space 407 of the bicycle frame 202 when viewed from the movement direction D211 in the attachment state. However, the piston 232 can be at least partially provided in the internal space 407 of the bicycle frame 202 when viewed from the movement direction D211 in the attachment state.

The hydraulic cylinder 228 is entirely provided in the internal space 407 of the bicycle frame 202 when viewed from the movement direction D211 in the attachment state. However, the hydraulic cylinder 228 is at least partially provided in the internal space 407 of the bicycle frame 202 when viewed from the movement direction D211 in the attachment state.

As seen in FIG. 40, the first securing part 268 is attached to a first attachment part 490 of the bicycle frame 202 via the first adjustment bolt 272. The second securing part 270 is attached to a second attachment part 492 of the bicycle frame 202 via the second adjustment bolt 274. The first attachment part 490 and the second attachment part 492 are provided in the arrangement recess 406 of the bicycle frame 202.

Figure 43:
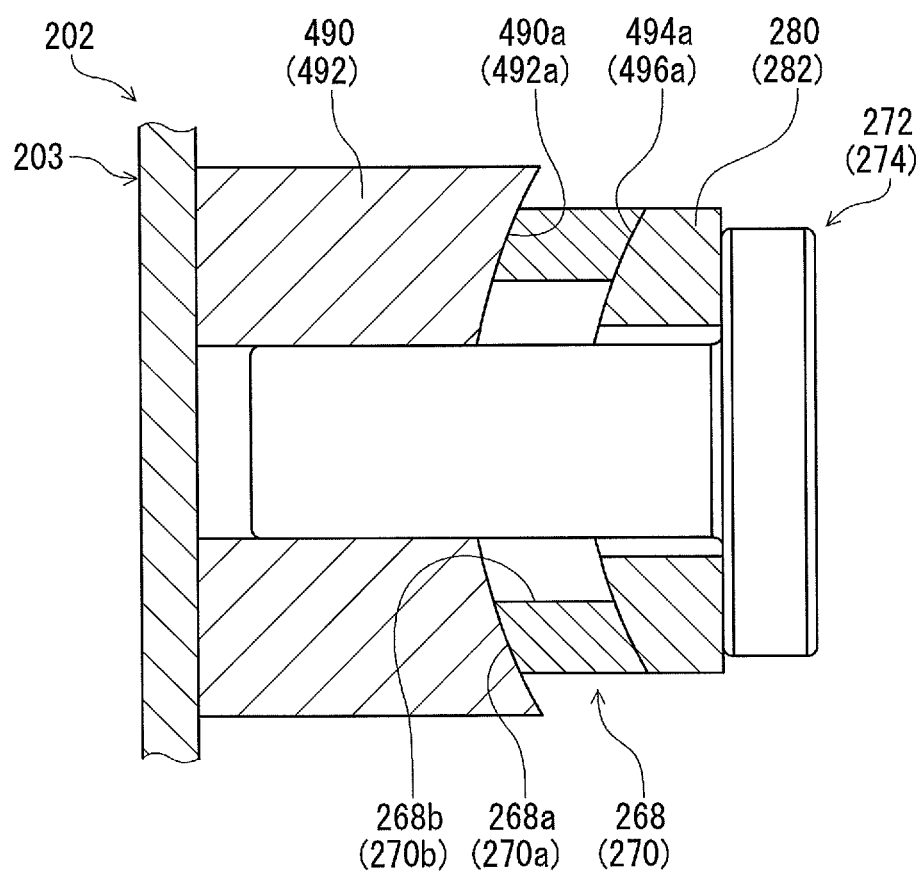
FIG. 43 is a partial cross-sectional view of the bicycle brake device illustrated in FIG. 40.

As seen in FIG. 43, the first attachment part 490 includes a first curved receiving surface 490a contactable with the first curved surface 268a of the first securing part 268. The second attachment part 492 includes a second curved receiving surface 492a contactable with the second curved surface 270a of the second securing part 270. These structures allow an orientation of the friction member 212 to be adjusted relative to the bicycle frame 202.

Since the first brake unit BU1 and the second brake unit BU2 are symmetrical with respect to the center virtual plane PL2, the structure of the second brake unit BU2 will not be described and/or illustrated in detail here for the sake of brevity.

With the bicycle brake device 410, it is possible to obtain substantially the same advantageous effect as that of the bicycle brake device 210 in accordance with the second embodiment.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle brake device comprising:
    a friction member;
    a base member including a hydraulic cylinder;
    a piston movable in the hydraulic cylinder in a movement direction so as to move the friction member toward a rotatable member, the piston being at least partially provided in a frame area defined by an outline of a bicycle frame when viewed from the movement direction in an attachment state where the base member is attached to the bicycle frame, the friction member being partially provided in the frame area when viewed from the movement direction in the attachment state; and
    a clearance adjustment member configured to adjust a rest position of the friction member relative to the hydraulic cylinder, wherein
    the clearance adjustment member includes an operating portion configured to be operated by the user to adjust the rest position of the friction member,
    the operating portion is partially provided in the frame area when viewed from the movement direction in the attachment state and the operating portion is partially provided outside of the frame area when viewed from the movement direction in the attachment state, and
    the operating portion is accessible in the attachment state where the base member is attached to the bicycle frame.

2. The bicycle brake device according to claim 1, wherein the piston has a center axis which is arranged in the frame area when viewed from the movement direction in the attachment state.

3. The bicycle brake device according to claim 2, wherein the piston is entirely provided in the frame area when viewed from the movement direction in the attachment state.

4. The bicycle brake device according to claim 1, wherein the piston is at least partially provided in an arrangement recess of the bicycle frame in the attachment state.

5. The bicycle brake device according to claim 4, wherein the piston is entirely provided in an internal space of the bicycle frame when viewed from the movement direction in the attachment state.

6. The bicycle brake device according to claim 1, wherein the hydraulic cylinder is at least partially provided in an arrangement recess of the bicycle frame in the attachment state.

7. The bicycle brake device according to claim 6, wherein the hydraulic cylinder is entirely provided in the internal space of the bicycle frame when viewed from the movement direction in the attachment state.

8. The bicycle brake device according to claim 1, wherein the hydraulic cylinder is at least partially provided between the friction member and the bicycle frame in the movement direction in the attachment state.

9. The bicycle brake device according to claim 1, wherein the piston is coupled to the friction member without being fixed to the friction member.

10. The bicycle brake device according to claim 9, further comprising:

an intermediate member provided between the piston and the friction member such that the intermediate member moves the friction member in response to movement of the piston.

11. The bicycle brake device according to claim 1, wherein
the frame area is defined by an outline of a front fork of the bicycle frame when viewed from the movement direction in the attachment state.

12. The bicycle brake device according to claim 1, wherein
the clearance adjustment member is exposed from the bicycle frame in the attachment state.

13. The bicycle brake device according to claim 1, wherein
the operating portion is disposed farther from the friction member than the base member in the movement direction.

14. The bicycle brake device according to claim 1, wherein
the piston is disposed above the friction member in the attachment state.

15. The bicycle brake device according to claim 1, wherein
the base member is configured to be attached to the bicycle frame detachably in a mounting direction different from the movement direction.

16. The bicycle brake device according to claim 1, further comprising:
a mounting structure configured to mount the base member to the bicycle frame, and
the mounting structure is exposed from the bicycle frame in the attachment state.

17. The bicycle brake device according to claim 16, wherein
the mounting structure includes a mounting opening through which a fastener extends.

18. The bicycle brake device according to claim 1, wherein
the base member is exposed from the bicycle frame in the attachment state.

19. The bicycle brake device according to claim 1, wherein
at least one of the base member and the friction member includes a curved surface to change orientation of the friction member relative to the bicycle frame.

* * * * *